US010962742B2

(12) United States Patent
Zhou et al.

(10) Patent No.: US 10,962,742 B2
(45) Date of Patent: *Mar. 30, 2021

(54) OPTICAL IMAGING LENS ASSEMBLY

(71) Applicant: ZHEJIANG SUNNY OPTICAL CO., LTD., Ningbo (CN)

(72) Inventors: Xin Zhou, Ningbo (CN); Jian Yang, Ningbo (CN); Jianke Wenren, Ningbo (CN)

(73) Assignee: ZHEJIANG SUNNY OPTICAL CO., LTD.

( * ) Notice: Subject to any disclaimer, the term of this patent is extended or adjusted under 35 U.S.C. 154(b) by 181 days.

This patent is subject to a terminal disclaimer.

(21) Appl. No.: 16/226,954

(22) Filed: Dec. 20, 2018

(65) Prior Publication Data

US 2019/0121098 A1   Apr. 25, 2019

Related U.S. Application Data

(63) Continuation of application No. PCT/CN2018/092874, filed on Jun. 26, 2018.

(30) Foreign Application Priority Data

Oct. 24, 2017  (CN) .......................... 201711000982.4
Oct. 24, 2017  (CN) .......................... 201721377058.3

(51) Int. Cl.
G02B 13/00       (2006.01)
G02B 9/64        (2006.01)

(52) U.S. Cl.
CPC ........... G02B 13/0045 (2013.01); G02B 9/64 (2013.01)

(58) Field of Classification Search
CPC ............................. G02B 13/0045; G02B 9/64
(Continued)

(56) References Cited

U.S. PATENT DOCUMENTS 9,523,841 B1 * 12/2016 Chen .................. G02B 5/208
2017/0045714 A1 * 2/2017 Huang .................. G02B 9/64
(Continued)

FOREIGN PATENT DOCUMENTS

CN    103558677 A    2/2014
CN    106443986 A    2/2017
(Continued)

OTHER PUBLICATIONS

PCT International Search Report and Written Opinion completed by the ISA/CN dated Aug. 31, 2018 and issued in connection with PCT/CN2018/092874.

Primary Examiner — James R Greece
(74) Attorney, Agent, or Firm — Barnes & Thornburg LLP

(57) ABSTRACT

The present disclosure discloses an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens is a convex surface; and an eighth lens having a refractive power. There is an air spacing between any two adjacent lenses in the first to eighth lenses. A total effective focal length f of the optical imaging lens assembly and an entrance pupil diameter EPD of the optical imaging lens assembly satisfy: $f/EPD \leq 2.0$.

18 Claims, 20 Drawing Sheets

(58) Field of Classification Search
USPC .......................................................... 359/754
See application file for complete search history.

(56) References Cited

U.S. PATENT DOCUMENTS

| | | | |
|---|---|---|---|
| 2017/0052350 | A1 | 2/2017 | Huang |
| 2019/0056568 | A1* | 2/2019 | Huang .................... G02B 9/64 |
| 2019/0204559 | A1* | 7/2019 | Jhang ................. G02B 13/0045 |
| 2019/0391365 | A1* | 12/2019 | Son ................... G02B 27/0025 |
| 2020/0201002 | A1* | 6/2020 | Xu ........................... G02B 9/64 |
| 2020/0249439 | A1* | 8/2020 | Song ...................... G02B 13/06 |

FOREIGN PATENT DOCUMENTS

| | | |
|---|---|---|
| CN | 106443987 A | 2/2017 |
| CN | 107678140 A | 2/2018 |
| CN | 207301466 U | 5/2018 |
| KR | 101287608 B1 | 7/2013 |

\* cited by examiner

Fig. 2C                      Fig. 2D

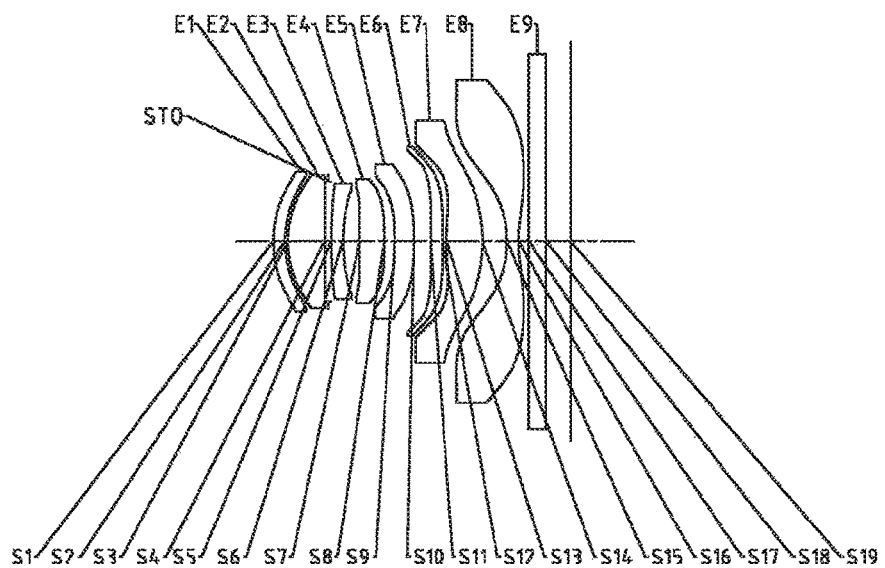
Fig. 5
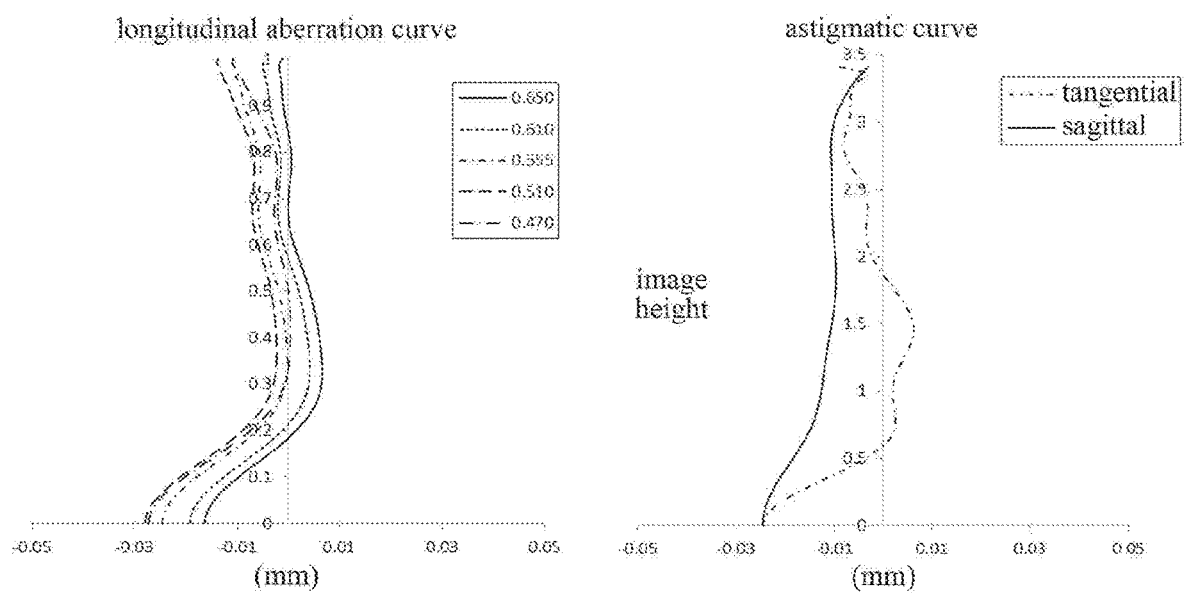
Fig. 6A
Fig. 6B

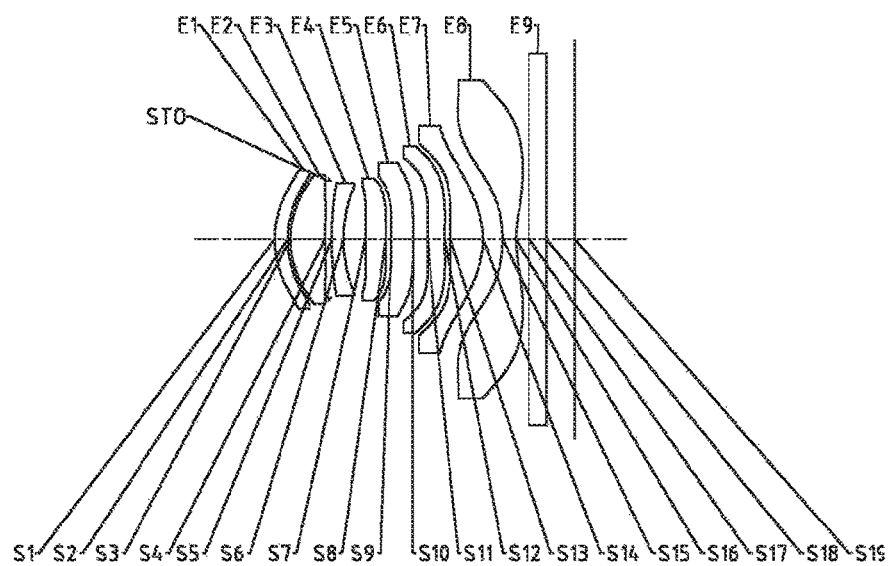
Fig. 13
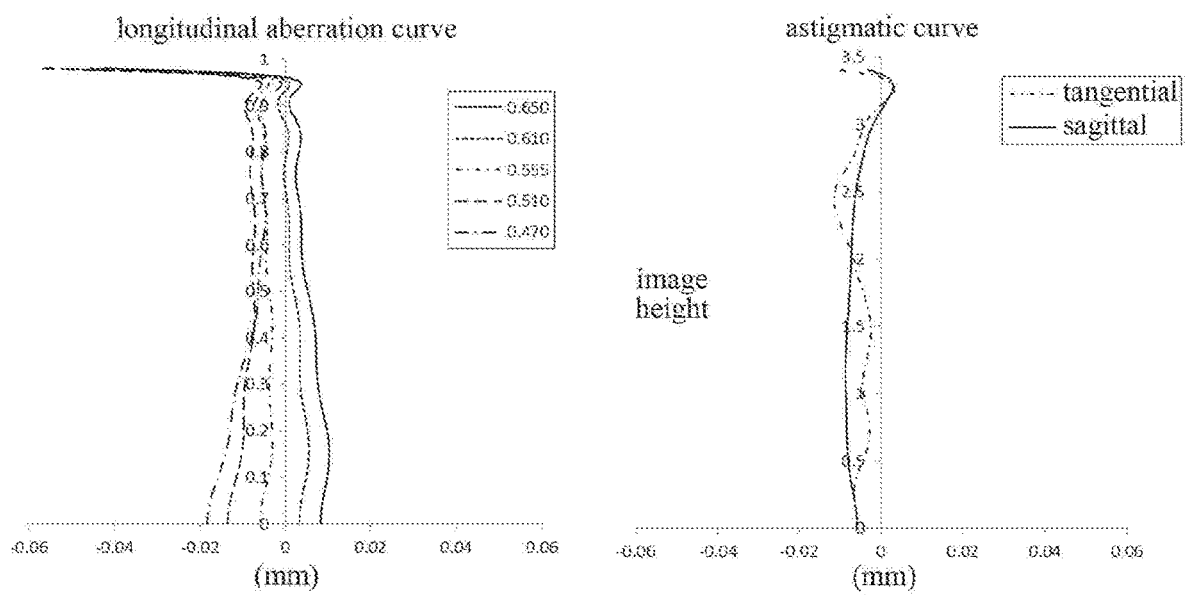
Fig. 14A
Fig. 14B

OPTICAL IMAGING LENS ASSEMBLY

CROSS-REFERENCE TO RELATED APPLICATIONS

This application is a continuation of International Application No. PCT/CN2018/092874, filed on Jun. 26, 2018, which claims the priorities and rights to Chinese Patent Application No. 201711000982.4 and Chinese Patent Application No. 201721377058.3 filed with China National Intellectual Property Administration (CNIPA) on Oct. 24, 2017. All of the aforementioned applications are hereby incorporated by reference in their entireties.

TECHNICAL FIELD

The present disclosure relates to an optical imaging lens assembly, and more specifically to an optical imaging lens assembly including eight lenses.

BACKGROUND

With the improvement in performance and reduction in size of the chips such as CCDs (charge-coupled devices) or CMOS (complementary metal-oxide semiconductor) elements, corresponding requirements on miniaturization and high imaging quality of the counterpart optical imaging lens assemblies have been brought forward.

In addition, with the popularity of portable electronic devices such as cell phones or digital cameras, the range of applications of the portable electronic products has become more and more wide, and thus, corresponding requirements on large aperture and high resolution of the counterpart optical imaging lens assemblies have also been brought forward.

SUMMARY

The present disclosure provides an optical imaging lens assembly which may be applicable to portable electronic products and may at least or partially sovle at least one of the above disadvantages in the existing technology, for example, an imaging lens assembly having a large aperture.

According to an aspect, the present disclosure provides an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power. There is an air spacing between any two adjacent lenses in the first to eighth lenses. A total effective focal length f of the optical imaging lens assembly and an entrance pupil diameter EPD of the optical imaging lens assembly may satisfy: f/EPD≤2.0.

In an implementation, the total effective focal length f of the optical imaging lens assembly and an effective focal length f2 of the second lens may satisfy: 1.0<f/f2<1.5.

In an implementation, the total effective focal length f of the optical imaging lens assembly, an effective focal length f1 of the first lens, and the effective focal length f2 of the second lens may satisfy: 1.0<|f/f1|+|f/f2|<1.5.

In an implementation, the effective focal length f2 of the second lens and a center thickness CT2 of the second lens on the optical axis may satisfy: 5.5≤f2/CT2<6.5.

In an implementation, an object-side surface of the second lens may be a convex surface. The effective focal length f2 of the second lens and a radius of curvature R3 of the object-side surface of the second lens may satisfy: 1.5<f2/R3<2.5.

In an implementation, an object-side surface of the first lens may be a convex surface. The total effective focal length f of the optical imaging lens assembly and a radius of curvature R1 of the object-side surface of the first lens may satisfy: 2<f/R1<2.5.

In an implementation, an image-side surface of the eighth lens may be a concave surface. The total effective focal length f of the optical imaging lens assembly and a radius of curvature R16 of the image-side surface of the eighth lens may satisfy: 1.5<f/R16<3.0.

In an implementation, the radius of curvature R16 of the image-side surface of the eighth lens and a radius of curvature R14 of the image-side surface of the seventh lens may satisfy: 1.0<|R16/R14|<1.5.

In an implementation, a radius of curvature R13 of an object-side surface of the seventh lens and the radius of curvature R14 of the image-side surface of the seventh lens may satisfy: −33<(R13+R14)/(R13−R14)<1.

In an implementation, an effective focal length f8 of the eighth lens and a center thickness CT8 of the eighth lens on the optical axis may satisfy: −11<f8/CT8<−7.

In an implementation, a sagittal height SAG82 of the image-side surface of the eighth lens at a maximum effective semi-diameter, and the center thickness CT8 of the eighth lens on the optical axis may satisfy: −3.0<SAG82/CT8<−1.5.

In an implementation, a total track length TTL of the optical imaging lens assembly and half of a diagonal length ImgH of an effective pixel area on an image plane of the optical imaging lens assembly may satisfy: TTL/ImgH≤1.50.

In an implementation, the center thickness CT2 of the second lens on the optical axis and a center thickness CT3 of the third lens on the optical axis may satisfy: 2.5<CT2/CT3<3.5.

In an implementation, a spacing distance T45 on the optical axis between the fourth lens and the fifth lens and a spacing distance T67 on the optical axis between the sixth lens and the seventh lens may satisfy: 1.0<T45/T67<4.5.

According to another aspect, the present disclosure provides an optical imaging lens assembly. The optical imaging lens assembly includes, sequentially along an optical axis from an object side to an image side, a first lens having a refractive power, wherein an object-side surface of the first lens may be a convex surface; a second lens having a positive refractive power, wherein an object-side surface of the second lens may be a convex surface; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power, wherein an image-side surface of the eighth lens may be a concave surface. A total effective focal length f of the optical imaging lens assembly, an effective focal length f1 of the first lens, and an effective focal length f2 of the second lens may satisfy: 1.0<|f/f1|+|f/f2|<1.5.

According to another aspect, the present disclosure provides an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power. A total effective focal length f of the optical imaging lens assembly and an effective focal length f2 of the second lens may satisfy: $1.0 < f/f2 < 1.5$.

According to another aspect, the present disclosure provides an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power. An effective focal length f2 of the second lens and a center thickness CT2 of the second lens on the optical axis may satisfy: $5.5 \leq f2/CT2 < 6.5$.

According to another aspect, the present disclosure provides an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power. An effective focal length f2 of the second lens and a radius of curvature R3 of an object-side surface of the second lens may satisfy: $1.5 < f2/R3 < 2.5$.

According to another aspect, the present disclosure provides an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power. A total effective focal length f of the optical imaging lens assembly and a radius of curvature R1 of an object-side surface of the first lens may satisfy: $2 < f/R1 < 2.5$.

According to another aspect, the present disclosure provides an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power. A total effective focal length f of the optical imaging lens assembly and a radius of curvature R16 of an image-side surface of the eighth lens may satisfy: $1.5 < f/R16 < 3.0$.

According to another aspect, the present disclosure provides an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power. A radius of curvature R16 of an image-side surface of the eighth lens and a radius of curvature R14 of the image-side surface of the seventh lens may satisfy: $1.0 < |R16/R14| < 1.5$.

According to another aspect, the present disclosure provides an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power. A radius of curvature R13 of an object-side surface of the seventh lens and a radius of curvature R14 of the image-side surface of the seventh lens may satisfy: $-33 < (R13+R14)/(R13-R14) < 1$.

According to another aspect, the present disclosure provides an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power. An effective focal length f8 of the eighth lens and a center thickness CT8 of the eighth lens on the optical axis may satisfy: $-11 < f8/CT8 < -7$.

According to another aspect, the present disclosure provides an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power. A sagittal height SAG82 of an image-side surface of the eighth lens at a maximum effective semi-diameter, and a center thickness CT8 of the eighth lens on the optical axis may satisfy: $-3.0 < SAG82/CT8 < -1.5$.

According to another aspect, the present disclosure provides an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power. A total track length TTL of the optical imaging lens assembly and half of a diagonal length ImgH of an effective pixel area on an image plane of the optical imaging lens assembly may satisfy: TTL/ImgH≤1.50.

According to another aspect, the present disclosure provides an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power. A center thickness CT2 of the second lens on the optical axis and a center thickness CT3 of the third lens on the optical axis may satisfy: 2.5<CT2/CT3<3.5.

According to another aspect, the present disclosure provides an optical imaging lens assembly. The optical imaging lens assembly includes, sequentially along an optical axis from an object side to an image side, a first lens having a refractive power; a second lens having a positive refractive power; a third lens having a refractive power; a fourth lens having a refractive power; a fifth lens having a refractive power; a sixth lens having a refractive power; a seventh lens having a refractive power, wherein an image-side surface of the seventh lens may be a convex surface; and an eighth lens having a refractive power. A spacing distance T45 on the optical axis between the fourth lens and the fifth lens and a spacing distance T67 on the optical axis between the sixth lens and the seventh lens may satisfy: 1.0<T45/T67<4.5.

The present disclose adopts a plurality of lenses (e.g., eight lenses). By reasonably allocating the refractive powers and the surface types of the lenses, the center thicknesses of the lenses, the spacing distances on the axis between the lenses, etc., the optical imaging lens assembly has at least one of the beneficial effects such as miniaturization, large aperture, low sensitivity, good processibility, and high imaging quality.

BRIEF DESCRIPTION OF THE DRAWINGS

By describing non-limiting implementations below in detail and in combination with the accompanying drawings, other features, objectives and advantages of the present disclosure will be more apparent. In the accompanying drawings:

FIGS. 2A-2D respectively illustrate a longitudinal aberration curve, an astigmatic curve, a distortion curve, and a lateral color curve of the optical imaging lens assembly according to Embodiment 1;

FIG. 5 is a schematic structural diagram illustrating an optical imaging lens assembly according to Embodiment 3 of the present disclosure;

FIGS. 6A-6D respectively illustrate a longitudinal aberration curve, an astigmatic curve, a distortion curve, and a lateral color curve of the optical imaging lens assembly according to Embodiment 3;

FIG. 13 is a schematic structural diagram illustrating an optical imaging lens assembly according to Embodiment 7 of the present disclosure;

FIGS. 14A-14D respectively illustrate a longitudinal aberration curve, an astigmatic curve, a distortion curve, and a lateral color curve of the optical imaging lens assembly according to Embodiment 7;

DETAILED DESCRIPTION

Figure 1:
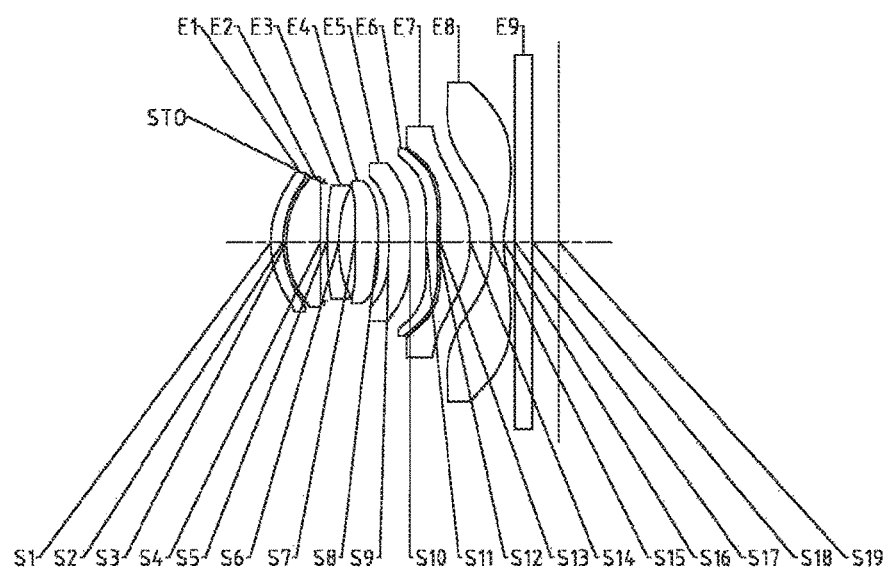
FIG. 1 is a schematic structural diagram illustrating an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second," and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area; and if a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The optical imaging lens assembly according to exemplary implementations of the present disclosure may include, for example, eight lenses (i.e., a first lens, a second lens, a third lens, a fourth lens, a fifth lens, a sixth lens, a seventh lens, and an eighth lens) having refractive powers. The eight lenses are arranged in sequence along an optical axis from an object side to an image side. There is an air spacing between any two adjacent lenses in the first to eighth lenses.

In the exemplary implementations, an object-side surface of the first lens may be a convex surface, and an image-side surface of the first lens may be a concave surface.

In the exemplary implementations, the second lens may have a positive refractive power. An object-side surface of the second lens may be a convex surface, and an image-side surface of the second lens may be a concave surface.

In the exemplary implementations, the third lens may have a negative refractive power. An object-side surface of the third lens may be a convex surface, and an image-side surface of the third lens may be a concave surface.

In the exemplary implementations, an image-side surface of the seventh lens may be a convex surface.

In the exemplary implementations, the eighth lens may have a negative refractive power. An object-side surface of the eighth lens may be a concave surface, and an image-side surface of the eighth lens may be a concave surface.

In the exemplary implementations, the optical imaging lens assembly of the present disclosure may satisfy the conditional expression $f/EPD \leq 2.0$. Here, f is the total effective focal length of the optical imaging lens assembly, and EPD is the entrance pupil diameter of the optical imaging lens assembly. More specifically, f and EPD may further satisfy: $1.67 \leq f/EPD \leq 1.90$. When the lens assembly is configured to satisfy the conditional expression $f/EPD \leq 2.0$, the lens assembly may have the advantage of large aperture, to enhance the imaging effect of the lens assembly in an environment of insufficient light. At the same time, it is also conducive to reducing the aberration of the edge field.

In the exemplary implementations, the optical imaging lens assembly of the present disclosure may satisfy the conditional expression $TTL/ImgH \leq 1.50$. Here, TTL is the total track length of the optical imaging lens assembly (i.e., the distance on the optical axis from the center of the object-side surface of the first lens to the image plane of the optical imaging lens assembly), and ImgH is the half of the diagonal length of the effective pixel area on the image plane. More specifically, TTL and ImgH may further satisfy: $1.44 \leq TTL/ImgH \leq 1.50$. When the conditional expression $TTL/ImgH \leq 1.50$ is satisfied, the size of the imaging system can be effectively compressed, which ensures that the imaging system has the characteristic of compact structure.

In the exemplary implementations, the optical imaging lens assembly of the present disclosure may satisfy the conditional expression $1.0 < |f/f1| + |f/f2| < 1.5$. Here, f is the total effective focal length of the optical imaging lens assembly, and f1 is the effective focal length of the first lens, and f2 is the effective focal length of the second lens. More specifically, f, f1, and f2 may further satisfy: $1.1<|f/f1|+|f/f2|<1.3$, for example, $1.18\le|f/f1|+|f/f2|\le1.28$. Reasonably allocating the refractive power of the first lens and the refractive power of the second lens is conducive to reducing the deflection angle of the light, thereby reducing the sensitivity of the system.

In the exemplary implementations, the optical imaging lens assembly of the present disclosure may satisfy the conditional expression $1.0<f/f2<1.5$. Here, f is the total effective focal length of the optical imaging lens assembly, and f2 is the effective focal length of the second lens. More specifically, f and f2 may further satisfy: $1.1<f/f2<1.3$, for example, $1.15\le f/f2\le1.26$. By reasonably the refractive power of the second lens, the imaging system may have a good capability to balance the field curvature.

In the exemplary implementations, the optical imaging lens assembly of the present disclosure may satisfy the conditional expression $1.5<f/R16<3.0$. Here, f is the total effective focal length of the optical imaging lens assembly, and R16 is the radius of curvature of the image-side surface of the eighth lens. More specifically, f and R16 may further satisfy: $1.7<f/R16<2.6$, for example, $1.72\le f/R16\le2.52$. Reasonably arranging the radius of curvature of the image-side surface of the eighth lens is conducive to the matching between the imaging system and commonly used chips.

In the exemplary implementations, the optical imaging lens assembly of the present disclosure may satisfy the conditional expression $2.5<CT2/CT3<3.5$. Here, CT2 is the center thickness of the second lens on the optical axis, and CT3 is the center thickness of the third lens on the optical axis. More specifically, CT2 and CT3 may further satisfy: $2.7<CT2/CT3<3.2$, for example, $2.76\le CT2/CT3\le3.17$. By reasonably the center thicknesses of the second lens and the third lens, the imaging system can have a good capability to balance the comatic aberration.

In the exemplary implementations, the optical imaging lens assembly of the present disclosure may satisfy the conditional expression $-11<f8/CT8<-7$. Here, f8 is the effective focal length of the eighth lens, and CT8 is the center thickness of the eighth lens on the optical axis. More specifically, f8 and CT8 may further satisfy: $-10.13\le f8/CT8\le-7.44$. By reasonably controlling the ratio of f8 to CT8, the size of the back end of the imaging system can be effectively reduced.

In the exemplary implementations, the optical imaging lens assembly of the present disclosure may satisfy the conditional expression $2<f/R1<2.5$. Here, f is the total effective focal length of the optical imaging lens assembly, and R1 is the radius of curvature of the object-side surface of the first lens. More specifically, f and R1 may further satisfy: $2.1<f/R1<2.4$, for example, $2.16\le f/R1\le2.38$. By reasonably arranging the radius of curvature of the object-side surface of the first lens, the aberration of the imaging system can be effectively balanced, thereby improving the optical performance of the imaging system.

In the exemplary implementations, the optical imaging lens assembly of the present disclosure may satisfy the conditional expression $1.0<|R16/R14|<1.5$. Here, R16 is the radius of curvature of the image-side surface of the eighth lens, and R14 is the radius of curvature of the image-side surface of the seventh lens. More specifically, R16 and R14 may further satisfy: $1.0<|R16/R14|<1.2$, for example, $1.01\le|R16/R14|\le1.11$. By reasonably arranging the radius of curvature of the seventh lens and the radius of curvature of the eighth lens, the field curvature and the distortion of the imaging system can be better balanced.

In the exemplary implementations, the optical imaging lens assembly of the present disclosure may satisfy the conditional expression $-3.0<SAG82/CT8<-1.5$. Here, SAG82 is the sagittal height of the image-side surface of the eighth lens at the maximum effective semi-diameter (i.e., the distance on the optical axis from the intersection of the image-side surface of the eighth lens and the optical axis to the vertex of the maximum effective semi-diameter of the image-side surface of the eighth lens). More specifically, SAG82 and CT8 may further satisfy: $-2.8<SAG82/CT8<-1.6$, for example, $-2.71\le SAG82/CT8\le-1.66$. By reasonably controlling the ratio of SAG82 to CT8, the chief ray angle of the system is reasonably adjusted, so that the relative brightness of the imaging system can be effectively improved, thereby improving the sharpness of the image plane.

In the exemplary implementations, the optical imaging lens assembly of the present disclosure may satisfy the conditional expression $5.5\le f2/CT2<6.5$. Here, f2 is the effective focal length of the second lens, and CT2 is the center thickness of the second lens on the optical axis. More specifically, f2 and CT2 may further satisfy: $5.51\le f2/CT2\le6.44$. By reasonably controlling the ratio of f2 to CT2, the deflection of light can be effectively controlled, thereby reducing the size of the front end of the optical imaging system.

In the exemplary implementations, the optical imaging lens assembly of the present disclosure may satisfy the conditional expression $1.5<f2/R3<2.5$. Here, f2 is the effective focal length of the second lens, and R3 is the radius of curvature of the object-side surface of the second lens. More specifically, f2 and R3 may further satisfy: $1.9<f2/R3<2.1$, for example, $1.95\le f2/R3\le2.02$. By reasonably arranging the radius of curvature of the object-side surface of the second lens, the imaging system can have a good capability to balance the astigmatism.

In the exemplary implementations, the optical imaging lens assembly of the present disclosure may satisfy the conditional expression $1.0<T45/T67<4.5$. Here, T45 is the spacing distance on the optical axis between the fourth lens and the fifth lens, and T67 is the spacing distance on the optical axis between the sixth lens and the seventh lens. More specifically, T45 and T67 may further satisfy: $1.0<T45/T67<4.3$, for example, $1.03\le T45/T67\le4.22$. By reasonablly controlling the ratio of T45 to T67, the imaging system can have a good capability to balance the dispersion.

In the exemplary implementations, the optical imaging lens assembly of the present disclosure may satisfy the conditional expression $-33<(R13+R14)/(R13-R14)<1$. Here, R13 is the radius of curvature of the object-side surface of the seventh lens, R14 is the radius of curvature of the image-side surface of the seventh lens. More specifically, R13 and R14 may further satisfy: $-32.33\le(R13+R14)/(R13-R14)\le0.99$. By reasonably arranging the radius of curvature of the object-side surface of the seventh lens and the radius of curvature of the image-side surface of the seventh lens, the imaging system can be better matched with the chief ray angle of the chip.

In the exemplary implementations, the optical imaging lens assembly may further include at least one diaphragm, to improve the imaging quality of the lens assembly. For example, the diaphragm may be disposed between the second lens and the third lens.

Alternatively, the optical imaging lens assembly described above may further include an optical filter for correcting color deviations and/or a protective glass for protecting a photosensitive element on the image plane.

The optical imaging lens assembly according to the above implementations of the present disclosure may use a plurality of lenses, for example, the eight lenses described above. By reasonably allocating the refractive powers and the surface types of the lenses, the center thicknesses of the lenses, the spacing distances on the axis between the lenses, etc., it is possible to effectively reduce the size of the lens assembly, reduce the sensitivity of the lens assembly and improve the processibility of the lens assembly, which makes the lens assembly more conducive to production and processing and can be applied to the portable electronic produt. At the same time, the optical imaging lens assembly with the above configurations further has characteristics of miniaturization, large aperture, and high imaging quality. When the optical imaging lens assembly is matched with the imaging chip having high resolution, the good imaging effect can be achieved.

In the implementations of the present disclosure, the surface of each lens is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having eight lenses is described as an example in the implementations, the optical imaging lens assembly is not limited to include eight lenses. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating the optical imaging lens assembly according to Embodiment 1 of the present disclosure.

As shown in FIG. 1, the optical imaging lens assembly according to the exemplary implementations of the present disclosure includes, sequentially along an optical axis from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9, and an image plane S19.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 1 shows the surface type, the radius of curvature, the thickness, the material and the conic coefficient of each lens of the optical imaging lens assembly in Embodiment 1. The radius of curvature and the thickness are both shown in millimeters (mm).

TABLE 1

| surfaces number | surface type | radius of curvature | thickness | refractive index | abbe number | conic coefficient |
|---|---|---|---|---|---|---|
| OBJ | spherical | infinite | infinite | | | |
| S1 | aspheric | 1.7514 | 0.2085 | 1.55 | 64.1 | −0.0870 |
| S2 | aspheric | 1.7298 | 0.0500 | | | −0.0484 |
| S3 | aspheric | 1.6853 | 0.5803 | 1.55 | 64.1 | 0.0223 |
| S4 | aspheric | 15.7406 | 0.0663 | | | 71.3048 |
| STO | spherical | infinite | 0.0500 | | | |
| S5 | aspheric | 4.9354 | 0.2000 | 1.67 | 20.4 | 5.0469 |
| S6 | aspheric | 2.4564 | 0.2762 | | | 0.0534 |
| S7 | aspheric | 18.7304 | 0.3945 | 1.55 | 64.1 | 99.0000 |
| S8 | aspheric | −11.8642 | 0.1853 | | | 93.6685 |
| S9 | aspheric | −9.6203 | 0.3586 | 1.67 | 20.4 | −86.9214 |
| S10 | aspheric | −32.6361 | 0.2707 | | | 99.0000 |
| S11 | aspheric | 14.5602 | 0.2045 | 1.55 | 64.1 | −99.0000 |
| S12 | aspheric | 12.5442 | 0.0500 | | | −68.4873 |

TABLE 1-continued

| surfaces number | surface type | radius of curvature | thickness | material refractive index | abbe number | conic coefficient |
|---|---|---|---|---|---|---|
| S13 | aspheric | 11.8368 | 0.5112 | 1.55 | 64.1 | −90.9432 |
| S14 | aspheric | −1.5924 | 0.3626 | | | −7.4261 |
| S15 | aspheric | −2.8760 | 0.2023 | 1.54 | 55.7 | −2.2684 |
| S16 | aspheric | 1.6619 | 0.1917 | | | −11.6039 |
| S17 | spherical | infinite | 0.3000 | 1.52 | 64.2 | |
| S18 | spherical | infinite | 0.4493 | | | |
| S19 | spherical | infinite | | | | |

As may be obtained from Table 1, the object-side surface and the image-side surface of any lens in the first to eighth lenses E1-E8 are both aspheric surfaces. In this embodiment, the surface type x of each aspheric surface may be defined using, but not limited to, the following formula:

$$x = \frac{ch^2}{1 + \sqrt{1-(k+1)c^2h^2}} + \sum A_i h^i. \quad (1)$$

Here, x is the sag—the axis—component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1); and Ai is the correction coefficient of the $i^{th}$ order of the aspheric surface. Table 2 below shows the high-order coefficients $A_4, A_6, A_8, A_{10}, A_{12}, A_{14}, A_{16}, A_{18},$ and $A_{20}$ applicable to the aspheric surfaces S1-S16 in Embodiment 1.

TABLE 2

| surface number | A4 | A6 | A8 | A10 | A12 |
|---|---|---|---|---|---|
| S1 | −2.8757E−03 | −2.6715E−02 | 7.0465E−02 | −9.4968E−02 | 5.7426E−02 |
| S2 | −2.2838E−03 | −1.8213E−01 | 9.4190E−01 | −2.6138E+00 | 4.7822E+00 |
| S3 | −8.2854E−03 | −9.6483E−02 | 4.7157E−01 | −1.1060E+00 | 1.6421E+00 |
| S4 | −7.0370E−02 | 9.3251E−02 | −3.0568E−02 | −3.8895E−01 | 1.3450E+00 |
| S5 | −1.4159E−01 | 2.6893E−01 | −2.2207E−01 | −2.1377E−01 | 1.3725E+00 |
| S6 | −9.0205E−02 | 1.8492E−01 | 1.7001E−01 | −1.9054E+00 | 6.7992E+00 |
| S7 | −7.6478E−02 | −3.8747E−02 | 4.3032E−01 | −2.8152E+00 | 9.6268E+00 |
| S8 | −1.3540E−01 | 1.0858E−01 | −4.4991E−01 | 1.0751E+00 | −1.9829E+00 |
| S9 | −2.4491E−01 | 2.6719E−01 | −8.0746E−01 | 2.0135E+00 | −3.5877E+00 |
| S10 | −2.1414E−01 | 1.6899E−01 | −2.8003E−01 | 4.9096E−01 | −6.4260E−01 |
| S11 | −9.6204E−02 | −1.3289E−02 | −9.0648E−02 | 3.0570E−01 | −4.2358E−01 |
| S12 | −9.5969E−02 | 1.3525E−02 | −1.5051E−01 | 3.7645E−01 | −4.7731E−01 |
| S13 | −1.0827E−01 | 5.1696E−02 | −1.5786E−01 | 3.0429E−01 | −3.5620E−01 |
| S14 | −7.8363E−02 | 4.5589E−02 | −4.7405E−02 | 5.6774E−02 | −3.9560E−02 |
| S15 | −2.0315E−01 | 1.5775E−01 | −7.5563E−02 | 2.9300E−02 | −8.4139E−03 |
| S16 | −1.3032E−01 | 1.0120E−01 | −5.6012E−02 | 2.1259E−02 | −5.5486E−03 |
| surface number | A14 | A16 | A18 | A20 | |
| S1 | 5.6138E−03 | −3.8444E−02 | 2.3434E−02 | −4.6951E−03 | |
| S2 | −5.7128E+00 | 4.2255E+00 | −1.7542E+00 | 3.0995E−01 | |
| S3 | −1.4981E+00 | 7.2660E−01 | −1.0704E−01 | −2.7156E−02 | |
| S4 | −2.3179E+00 | 2.2832E+00 | −1.2018E+00 | 2.5745E−01 | |
| S5 | −2.9645E+00 | 3.5857E+00 | −2.3315E+00 | 6.2558E−01 | |
| S6 | −1.4244E+01 | 1.7988E+01 | −1.2531E+01 | 3.6982E+00 | |
| S7 | −1.9848E+01 | 2.4443E+01 | −1.6568E+01 | 4.7635E+00 | |
| S8 | 2.4051E+00 | −1.7362E+00 | 6.7712E−01 | −1.1701E−01 | |
| S9 | 4.0526E+00 | −2.6395E+00 | 8.8949E−01 | −1.2006E−01 | |
| S10 | 5.4312E−01 | −2.6854E−01 | 6.9301E−02 | −7.0717E−03 | |
| S11 | 3.2724E−01 | −1.4923E−01 | 3.7584E−02 | −4.0009E−03 | |
| S12 | 3.5450E−01 | −1.5689E−01 | 3.8229E−02 | −3.9186E−03 | |
| S13 | 2.5463E−01 | −1.0980E−01 | 2.6191E−02 | −2.6315E−03 | |
| S14 | 1.6183E−02 | −3.8799E−03 | 5.0395E−04 | −2.7350E−05 | |
| S15 | 1.6247E−03 | −1.9723E−04 | 1.3613E−05 | −4.0881E−07 | |
| S16 | 9.7033E−04 | −1.0824E−04 | 6.9500E−06 | −1.9499E−07 | |

In Embodiment 1, the total effective focal length f of the optical imaging lens assembly satisfies: f=3.99 mm. The effective focal length f1 of the first lens E1 satisfies: f1=106.47 mm. The effective focal length f2 of the second lens E2 satisfies: f2=3.41 mm. The effective focal length f3 of the third lens E3 satisfies: f3=−7.59 mm. The effective focal length f4 of the fourth lens E4 satisfies: f4=13.37 mm. The effective focal length f5 of the fifth lens E5 satisfies: f5=−20.62 mm. The effective focal length f6 of the sixth lens E6 satisfies: f6=−172.11 mm. The effective focal length f7 of the seventh lens E7 satisfies: f7=2.61 mm. The effective focal length f8 of the eighth lens E8 satisfies: f8=−1.93 mm. The total track length TTL (i.e., the distance on the optical axis from the center of the object-side surface S1 of the first lens E1 to the image plane S19) of the optical imaging lens assembly satisfies: TTL=4.91 mm. The half of the diagonal length ImgH of the effective pixel area on the image plane S19 of the optical imaging lens assembly satisfies: ImgH=3.41 mm.

The optical imaging lens assembly in Embodiment 1 satisfies:

f/EPD=1.80, wherein f is the total effective focal length of the optical imaging lens assembly, and EPD is the entrance pupil diameter of the optical imaging lens assembly;

TTL/ImgH=1.44, wherein TTL is the total track length of the optical imaging lens assembly, and ImgH is the half of the diagonal length of the effective pixel area on the image plane S19;

|f/f1|+|f/f2|=1.21, wherein f is the total effective focal length of the optical imaging lens assembly, f1 is the effective focal length of the first lens E1, and f2 is the effective focal length of the second lens E2;

f/f2=1.17, wherein f is the total effective focal length of the optical imaging lens assembly, and f2 is the effective focal length of the second lens E2;

f/R16=2.40, wherein f is the total effective focal length of the optical imaging lens assembly, and R16 is the radius of curvature of the image-side surface S16 of the eighth lens E8;

CT2/CT3=2.90, wherein CT2 is the center thickness of the second lens E2 on the optical axis, and CT3 is the center thickness of the third lens E3 on the optical axis;

f8/CT8=−9.55, wherein f8 is the effective focal length of the eighth lens E8, and CT8 is the center thickness of the eighth lens E8 on the optical axis;

f/R1=2.28, wherein f is the total effective focal length of the optical imaging lens assembly, and R1 is the radius of curvature of the object-side surface S1 of the first lens E1;

|R16/R14|=1.04, wherein R16 is the radius of curvature of the image-side surface S16 of the eighth lens E8, and R14 is the radius of curvature of the image-side surface S14 of the seventh lens E7;

SAG82/CT8=−2.63, wherein SAG82 is the sagittal height SAG82 of the image-side surface S16 of the eighth lens E8 at the maximum effective semi-diameter, and CT8 is the center thickness of the eighth lens on the optical axis;

f2/CT2=5.87, wherein f2 is the effective focal length of the second lens E2, and CT2 is the center thickness of the second lens E2 on the optical axis;

f2/R3=2.02, wherein f2 is the effective focal length of the second lens E2, and R3 is the radius of curvature of the object-side surface S3 of the second lens E2;

T45/T67=3.71, wherein T45 is the spacing distance on the optical axis between the fourth lens E4 and the fifth lens E5, and T67 is the spacing distance on the optical axis between the sixth lens E6 and the seventh lens E7; and (R13+R14)/(R13−R14)=0.76, wherein R13 is the radius of curvature of the object-side surface S13 of the seventh lens E7, and R14 is the radius of curvature of the image-side surface S14 of the seventh lens E7.

Figures 2A, 2B:
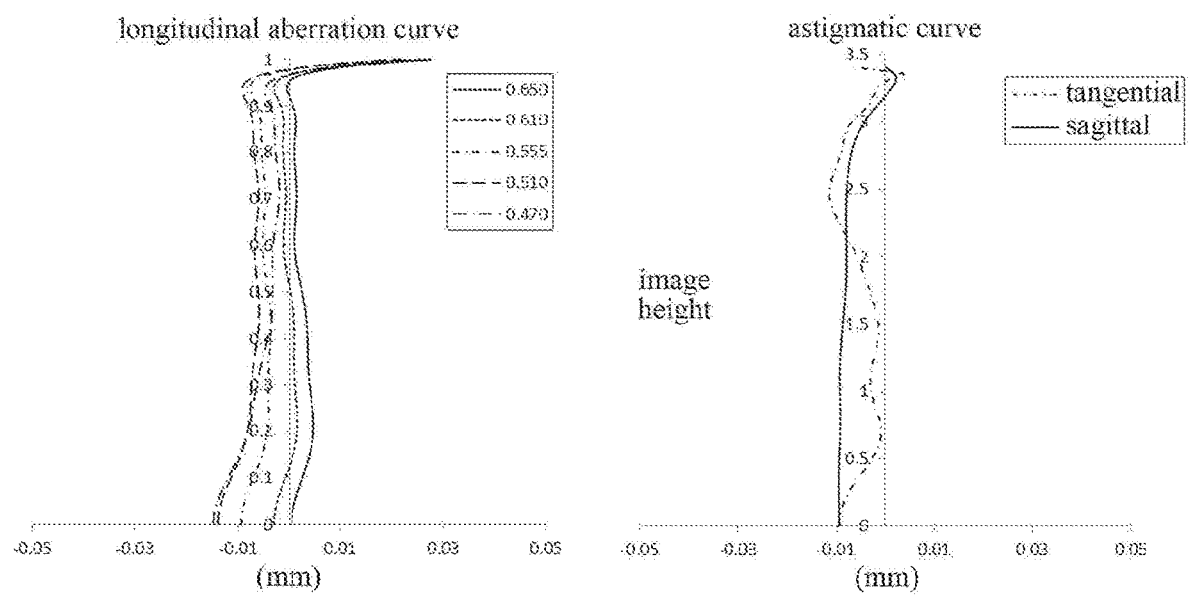

FIG. 2A illustrates the longitudinal aberration curve of the optical imaging lens assembly according to Embodiment 1, representing deviations of focal points of light of different wavelengths converged after passing through the lens assembly. FIG. 2B illustrates the astigmatic curve of the optical imaging lens assembly according to Embodiment 1, representing a curvature of the tangential image plane and a curvature of the sagittal image plane. FIG. 2C illustrates the distortion curve of the optical imaging lens assembly according to Embodiment 1, representing amounts of distortion at different viewing angles. FIG. 2D illustrates the lateral color curve of the optical imaging lens assembly according to Embodiment 1, representing deviations of different image heights on the image plane after light passes through the lens assembly. It can be seen from FIGS. 2A-2D that the optical imaging lens assembly according to Embodiment 1 can achieve a good imaging quality.

Embodiment 2

Figure 3:
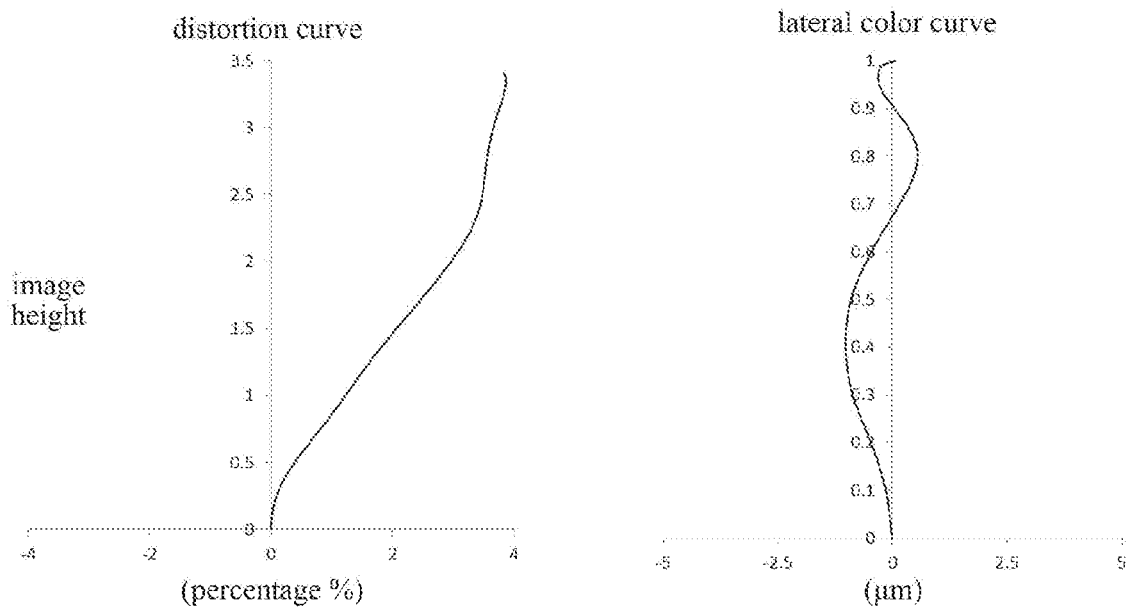
FIG. 3 is a schematic structural diagram illustrating an optical imaging lens assembly according to Embodiment 2 of the present disclosure.
Figure 3:
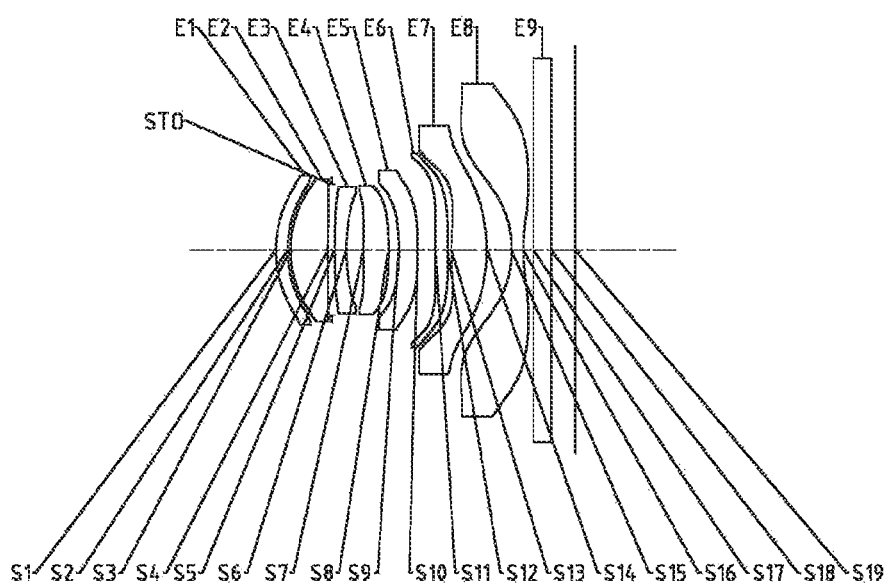

An optical imaging lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the optical imaging lens assembly according to Embodiment 2 of the present disclosure.

As shown in FIG. 3, the optical imaging lens assembly according to the exemplary implementations of the present disclosure includes, sequentially along an optical axis from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9, and an image plane S19.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 3 shows the surface type, the radius of curvature, the thickness, the material and the conic coefficient of each lens of the optical imaging lens assembly in Embodiment 2. The radius of curvature and the thickness are both shown in millimeters (mm).

TABLE 3

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.8772 | 0.2000 | 1.55 | 64.1 | −0.0525 |
| S2 | aspheric | 1.8441 | 0.0500 | | | −0.0570 |
| S3 | aspheric | 1.7967 | 0.6333 | 1.55 | 64.1 | 0.0605 |
| S4 | aspheric | 25.6286 | 0.0644 | | | 90.6150 |
| STO | spherical | infinite | 0.0500 | | | |
| S5 | aspheric | 7.6179 | 0.2000 | 1.67 | 20.4 | 14.0413 |
| S6 | aspheric | 3.0067 | 0.2945 | | | −0.5490 |
| S7 | aspheric | 20.0582 | 0.4218 | 1.55 | 64.1 | 99.0000 |
| S8 | aspheric | −9.7419 | 0.1737 | | | 58.5639 |
| S9 | aspheric | −6.9938 | 0.3254 | 1.67 | 20.4 | −99.0000 |
| S10 | aspheric | −13.2191 | 0.3031 | | | −96.9382 |
| S11 | aspheric | 16.3734 | 0.2000 | 1.55 | 64.1 | 94.1609 |
| S12 | aspheric | 14.5954 | 0.0721 | | | 35.8418 |
| S13 | aspheric | 4.9064 | 0.6047 | 1.55 | 64.1 | −48.1315 |
| S14 | aspheric | −2.3021 | 0.4184 | | | −12.8717 |
| S15 | aspheric | −2.0651 | 0.2000 | 1.54 | 55.7 | −2.4160 |
| S16 | aspheric | 2.3660 | 0.1719 | | | −17.3050 |
| S17 | spherical | infinite | 0.3000 | 1.52 | 64.2 | |
| S18 | spherical | infinite | 0.4167 | | | |
| S19 | spherical | infinite | | | | |

As may be obtained from Table 3, in Embodiment 2, the object-side surface and the image-side surface of any lens in the first to eighth lenses E1-E8 are both aspheric surfaces. Table 4 shows the high-order coefficients applicable to each aspheric surface in Embodiment 2. The surface type of each aspheric surface may be defined by the formula (1) given in Embodiment 1.

In Embodiment 2, the total effective focal length f of the optical imaging lens assembly satisfies: f=4.06 mm. The effective focal length f1 of the first lens E1 satisfies: f1=169.37 mm. The effective focal length f2 of the second lens E2 satisfies: f2=3.51 mm. The effective focal length f3 of the third lens E3 satisfies: f3=−7.58 mm. The effective focal length f4 of the fourth lens E4 satisfies: f4=12.07 mm.

TABLE 4

| surface number | A4 | A6 | A8 | A10 | A12 |
|---|---|---|---|---|---|
| S1 | −1.0986E−02 | 1.3416E−02 | −5.9978E−02 | 1.7564E−01 | −3.1039E−01 |
| S2 | −2.5269E−02 | 3.3919E−02 | −4.5690E−02 | 1.7371E−01 | −4.2270E−01 |
| S3 | −2.1968E−02 | 5.6931E−02 | −1.5586E−01 | 4.2150E−01 | −7.6254E−01 |
| S4 | −3.7321E−02 | 3.5651E−02 | 5.8630E−02 | −4.0803E−01 | 9.5364E−01 |
| S5 | −9.3311E−02 | 1.5849E−01 | −7.0679E−02 | −3.5459E−01 | 1.1719E+00 |
| S6 | −6.1789E−02 | 1.1253E−01 | 7.9954E−02 | −7.7033E−01 | 2.1120E+00 |
| S7 | −8.0342E−02 | 8.2776E−02 | −4.8266E−01 | 1.1733E+00 | −1.7006E+00 |
| S8 | −1.0771E−01 | 6.2642E−02 | −3.3207E−01 | 8.0573E−01 | −1.5634E+00 |
| S9 | −2.3470E−01 | 2.1313E−01 | −4.6656E−01 | 7.4924E−01 | −9.0053E−01 |
| S10 | −1.7715E−01 | 6.8830E−02 | 7.4420E−02 | −3.7404E−01 | 6.3665E−01 |
| S11 | −7.4997E−02 | 8.0128E−03 | 2.2727E−02 | −3.7437E−02 | −2.7954E−03 |
| S12 | −1.3713E−01 | 4.9404E−02 | −8.5346E−02 | 2.2264E−01 | −3.2583E−01 |
| S13 | −7.4819E−02 | 8.6327E−03 | −1.5165E−01 | 3.1120E−01 | −3.3514E−01 |
| S14 | −2.0690E−01 | 2.1127E−03 | −6.9187E−02 | 8.5820E−02 | −4.9790E−02 |
| S15 | −1.2986E−01 | 6.2864E−02 | −3.4212E−02 | 2.6119E−02 | −1.1544E−02 |
| S16 | −1.0110E−01 | 6.9683E−02 | −3.5212E−02 | 1.2681E−02 | −3.2228E−03 |

| surface number | A14 | A16 | A18 | A20 |
|---|---|---|---|---|
| S1 | 3.2128E−01 | −1.9534E−01 | 6.3553E−02 | −8.5205E−03 |
| S2 | 5.4675E−01 | −3.8975E−01 | 1.4006E−01 | −1.9655E−02 |
| S3 | 8.5567E−01 | −5.7584E−01 | 2.1305E−01 | −3.3807E−02 |
| S4 | −1.2397E+00 | 9.4403E−01 | −3.8996E−01 | 6.6732E−02 |
| S5 | −1.8007E+00 | 1.5731E+00 | −7.4328E−01 | 1.4651E−01 |
| S6 | −3.2753E+00 | 3.0702E+00 | −1.6086E+00 | 3.6416E−01 |
| S7 | 1.1826E+00 | −9.6908E−03 | −4.5907E−01 | 1.8287E−01 |
| S8 | 2.0668E+00 | −1.6573E+00 | 7.3560E−01 | −1.4325E−01 |
| S9 | 6.7043E−01 | −1.4052E−01 | −1.2098E−01 | 5.5998E−02 |
| S10 | −5.9936E−01 | 3.3553E−01 | −1.0617E−01 | 1.4776E−02 |
| S11 | 3.7185E−02 | −2.9448E−02 | 9.4035E−03 | −1.0876E−03 |
| S12 | 2.6496E−01 | −1.2339E−01 | 3.0807E−02 | −3.1780E−03 |
| S13 | 2.1794E−01 | −8.7105E−02 | 1.9678E−02 | −1.8983E−03 |
| S14 | 1.7027E−02 | −3.5128E−03 | 4.0268E−04 | −1.9622E−05 |
| S15 | 2.8272E−03 | −3.9418E−04 | 2.9615E−05 | −9.3691E−07 |
| S16 | 5.5360E−04 | −6.0727E−05 | 3.8340E−06 | −1.0578E−07 |

The effective focal length f5 of the fifth lens E5 satisfies: f5=−22.74 mm. The effective focal length f6 of the sixth lens E6 satisfies: f6=−256.41 mm. The effective focal length f7 of the seventh lens E7 satisfies: f7=2.96 mm. The effective focal length f8 of the eighth lens E8 satisfies: f8=−2.02 mm. The total track length TTL (i.e., the distance on the optical axis from the center of the object-side surface S1 of the first lens E1 to the image plane S19) of the optical imaging lens assembly satisfies: TTL=5.10 mm. The half of the diagonal length ImgH of the effective pixel area on the image plane S19 of the optical imaging lens assembly satisfies: ImgH=3.41 mm.

Figure 4A:
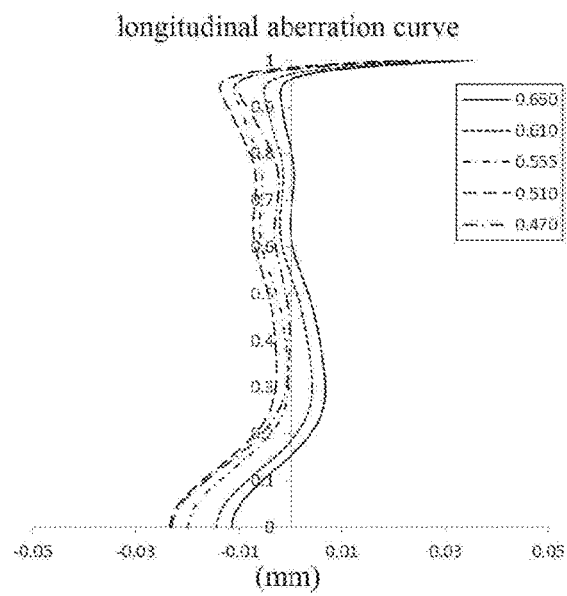
FIGS. 4A-4D respectively illustrate a longitudinal aberration curve, an astigmatic curve, a distortion curve, and a lateral color curve of the optical imaging lens assembly according to Embodiment 2.
Figure 4B:
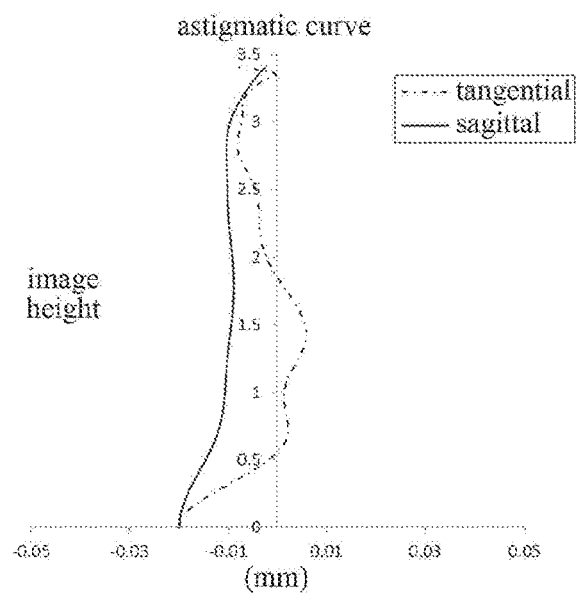
Figure 4C:
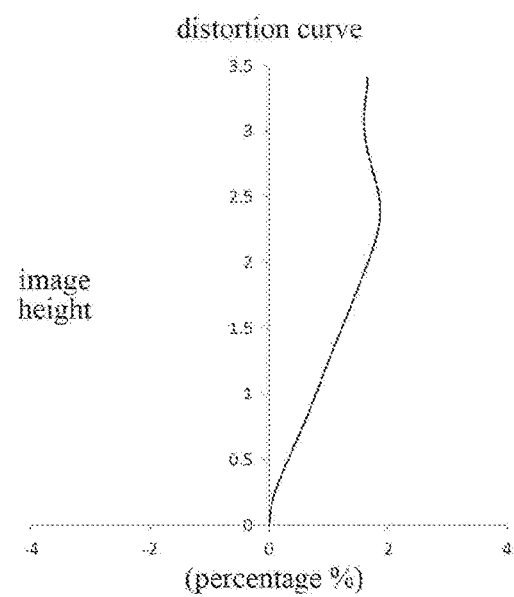
Figure 4D:
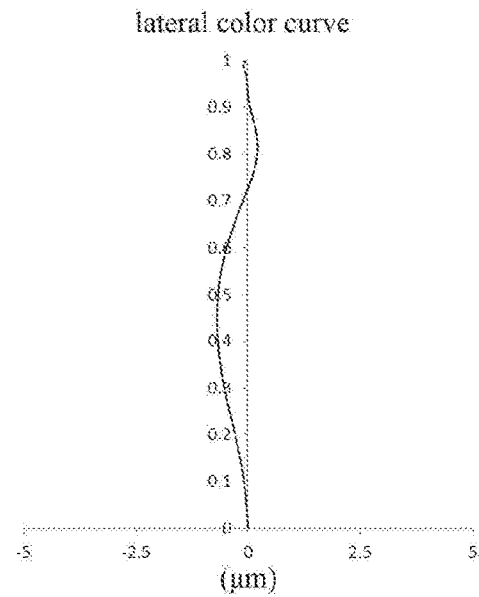

FIG. 4A illustrates the longitudinal aberration curve of the optical imaging lens assembly according to Embodiment 2, representing deviations of focal points of light of different wavelengths converged after passing through the lens assembly. FIG. 4B illustrates the astigmatic curve of the optical imaging lens assembly according to Embodiment 2, representing a curvature of the tangential image plane and a curvature of the sagittal image plane. FIG. 4C illustrates the distortion curve of the optical imaging lens assembly according to Embodiment 2, representing amounts of distortion at different viewing angles. FIG. 4D illustrates the lateral color curve of the optical imaging lens assembly according to Embodiment 2, representing deviations of different image heights on the image plane after light passes through the lens assembly. It can be seen from FIGS. 4A-4D that the optical imaging lens assembly according to Embodiment 2 can achieve a good imaging quality.

Embodiment 3

An optical imaging lens assembly according to Embodiment 3 of the present disclosure is described below with reference to FIGS. 5-6D. FIG. 5 is a schematic structural diagram illustrating the optical imaging lens assembly according to Embodiment 3 of the present disclosure.

As shown in FIG. 5, the optical imaging lens assembly according to the exemplary implementations of the present disclosure includes, sequentially along an optical axis from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9, and an image plane S19.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 5 shows the surface type, the radius of curvature, the thickness, the material and the conic coefficient of each lens of the optical imaging lens assembly in Embodiment 3. The radius of curvature and the thickness are both shown in millimeters (mm).

TABLE 5

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.8785 | 0.2000 | 1.55 | 64.1 | −0.0528 |
| S2 | aspheric | 1.8379 | 0.0500 | | | −0.0598 |
| S3 | aspheric | 1.7854 | 0.6310 | 1.55 | 64.1 | 0.0481 |
| S4 | aspheric | 26.5489 | 0.0638 | | | 99.0000 |
| STO | spherical | infinite | 0.0500 | | | |
| S5 | aspheric | 7.3900 | 0.2000 | 1.67 | 20.4 | 15.1874 |
| S6 | aspheric | 2.9466 | 0.2855 | | | −0.4210 |
| S7 | aspheric | 20.8163 | 0.4199 | 1.55 | 64.1 | 99.0000 |
| S8 | aspheric | −9.4228 | 0.1796 | | | 57.4896 |
| S9 | aspheric | −6.8574 | 0.3253 | 1.67 | 20.4 | −97.4379 |
| S10 | aspheric | −12.9211 | 0.2999 | | | −99.0000 |
| S11 | aspheric | 16.5027 | 0.2000 | 1.55 | 64.1 | 95.1716 |
| S12 | aspheric | 14.5006 | 0.0739 | | | 35.1163 |
| S13 | aspheric | 4.9880 | 0.6135 | 1.55 | 64.1 | −48.0500 |
| S14 | aspheric | −2.2795 | 0.4178 | | | −12.5594 |
| S15 | aspheric | −2.0879 | 0.2000 | 1.54 | 55.7 | −2.3948 |
| S16 | aspheric | 2.3461 | 0.1724 | | | −17.1188 |
| S17 | spherical | infinite | 0.3000 | 1.52 | 64.2 | |
| S18 | spherical | infinite | 0.4173 | | | |
| S19 | spherical | infinite | | | | |

As may be obtained from Table 5, in Embodiment 3, the object-side surface and the image-side surface of any lens in the first to eighth lenses E1-E8 are both aspheric surfaces. Table 6 shows the high-order coefficients applicable to each aspheric surface in Embodiment 3. The surface type of each aspheric surface may be defined by the formula (1) given in Embodiment 1.

distortion curve of the optical imaging lens assembly according to Embodiment 3, representing amounts of distortion at different viewing angles. FIG. 6D illustrates the lateral color curve of the optical imaging lens assembly according to Embodiment 3, representing deviations of

TABLE 6

| Surface number | A4 | A6 | A8 | A10 | A12 |
|---|---|---|---|---|---|
| S1  | −1.0724E−02 | 1.1720E−02 | −4.9906E−02 | 1.4832E−01 | −2.6819E−01 |
| S2  | −2.5359E−02 | 3.2063E−02 | −2.9240E−02 | 1.2901E−01 | −3.5495E−01 |
| S3  | −2.3209E−02 | 6.0228E−02 | −1.5941E−01 | 4.2262E−01 | −7.6659E−01 |
| S4  | −3.7630E−02 | 3.4484E−02 | 8.0420E−02 | −5.0923E−01 | 1.1938E+00 |
| S5  | −9.4811E−02 | 1.7316E−01 | −1.3406E−01 | −1.5833E−01 | 7.4666E−01 |
| S6  | −6.1583E−02 | 1.0437E−01 | 1.7748E−01 | −1.2358E+00 | 3.3682E+00 |
| S7  | −8.2319E−02 | 8.6318E−02 | −4.7441E−01 | 1.0190E+00 | −1.0350E+00 |
| S8  | −1.0685E−01 | 6.2083E−02 | −3.8852E−01 | 1.1274E+00 | −2.3941E+00 |
| S9  | −2.3805E−01 | 2.2190E−01 | −4.9431E−01 | 7.8738E−01 | −8.7300E−01 |
| S10 | −1.7713E−01 | 6.2414E−02 | 1.0177E−01 | −4.3694E−01 | 7.2889E−01 |
| S11 | −7.8279E−02 | 1.4357E−02 | 1.1917E−01 | −2.1918E−02 | −1.8049E−02 |
| S12 | −1.3670E−01 | 4.8877E−02 | −8.6033E−02 | 2.2618E−01 | −3.3175E−01 |
| S13 | −7.4964E−02 | 9.9214E−03 | −1.5158E−01 | 3.0863E−01 | −3.3146E−01 |
| S14 | −2.0912E−02 | 2.2085E−03 | −6.6556E−02 | 8.1504E−02 | −4.6421E−02 |
| S15 | −1.2918E−01 | 6.1548E−02 | −3.2958E−02 | 2.5396E−02 | −1.1309E−02 |
| S16 | −1.0013E−01 | 6.7645E−02 | −3.3516E−02 | 1.1824E−02 | −2.9467E−03 |

| Surface number | A14 | A16 | A18 | A20 |
|---|---|---|---|---|
| S1  | 2.8244E−01 | −1.7456E−01 | 5.7589E−02 | −7.8140E−03 |
| S2  | 4.8201E−01 | −3.5022E−01 | 1.2537E−01 | −1.7157E−02 |
| S3  | 8.6887E−01 | −5.9258E−01 | 2.2310E−01 | −3.6315E−02 |
| S4  | −1.5697E+00 | 1.2094E+00 | −5.0536E−01 | 8.7466E−02 |
| S5  | −1.1937E+00 | 1.0393E+00 | −4.8280E−01 | 9.2474E−02 |
| S6  | −5.3306E+00 | 5.0917E+00 | −2.7082E+00 | 6.1853E−01 |
| S7  | −2.7069E−01 | 1.7415E+00 | −1.5699E+00 | 4.7266E−01 |
| S8  | 3.2954E+00 | −2.7195E+00 | 1.2338E+00 | −2.4145E−01 |
| S9  | 5.4937E−01 | −8.8404E−03 | −1.8800E−01 | 6.9668E−02 |
| S10 | −6.8289E−01 | 3.8093E−01 | −1.1983E−01 | 1.6524E−02 |
| S11 | 4.6642E−02 | −3.3011E−02 | 1.0153E−02 | −1.1549E−03 |
| S12 | 2.7017E−01 | −1.2604E−01 | 3.1545E−02 | −3.2638E−03 |
| S13 | 2.1538E−01 | −8.6053E−02 | 1.9429E−02 | −1.8728E−03 |
| S14 | 1.5553E−02 | −3.1479E−03 | 3.5508E−04 | −1.7082E−05 |
| S15 | 2.7841E−03 | −3.8990E−04 | 2.9417E−05 | −9.3444E−07 |
| S16 | 4.9702E−04 | −5.3638E−05 | 3.3407E−06 | −9.1224E−08 |

In Embodiment 3, the total effective focal length f of the optical imaging lens assembly satisfies: f=4.06 mm. The effective focal length f1 of the first lens E1 satisfies: f1=210.66 mm. The effective focal length f2 of the second lens E2 satisfies: f2=3.48 mm. The effective focal length f3 of the third lens E3 satisfies: f3=−7.48 mm. The effective focal length f4 of the fourth lens E4 satisfies: f4=11.94 mm. The effective focal length f5 of the fifth lens E5 satisfies: f5=−22.39 mm. The effective focal length f6 of the sixth lens E6 satisfies: f6=−226.96 mm. The effective focal length f7 of the seventh lens E7 satisfies: f7=2.95 mm. The effective focal length f8 of the eighth lens E8 satisfies: f8=−2.03 mm. The total track length TTL (i.e., the distance on the optical axis from the center of the object-side surface S1 of the first lens E1 to the image plane S19) of the optical imaging lens assembly satisfies: TTL=5.10 mm. The half of the diagonal length ImgH of the effective pixel area on the image plane S19 of the optical imaging lens assembly satisfies: ImgH=3.41 mm.

Figures 6C, 6D:
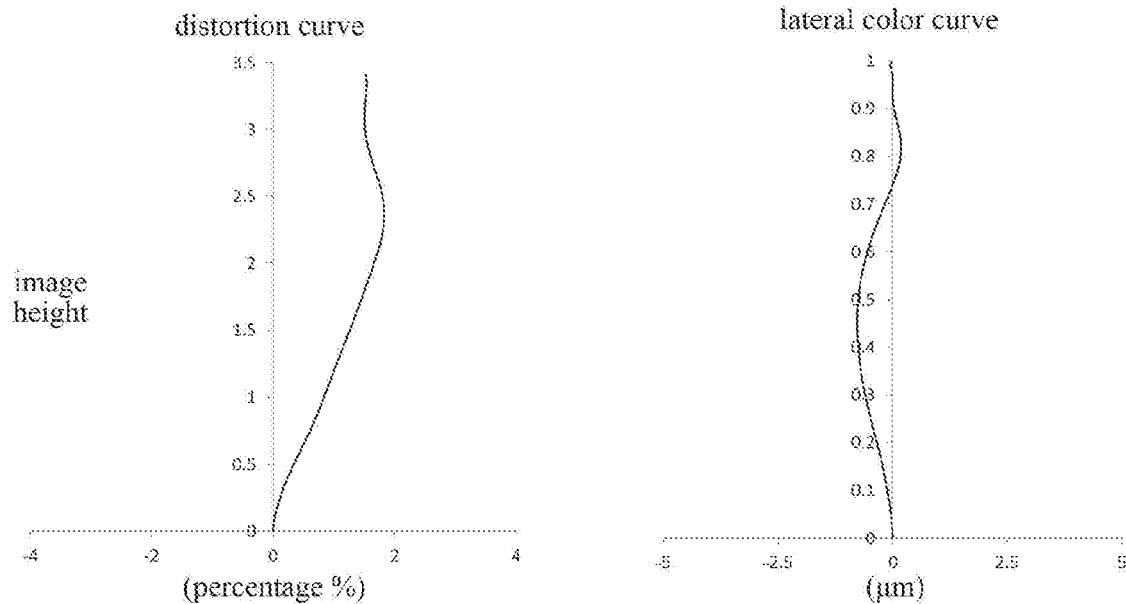

FIG. 6A illustrates the longitudinal aberration curve of the optical imaging lens assembly according to Embodiment 3, representing deviations of focal points of light of different wavelengths converged after passing through the lens assembly. FIG. 6B illustrates the astigmatic curve of the optical imaging lens assembly according to Embodiment 3, representing a curvature of the tangential image plane and a curvature of the sagittal image plane. FIG. 6C illustrates the different image heights on the image plane after light passes through the lens assembly. It can be seen from FIGS. 6A-6D that the optical imaging lens assembly according to Embodiment 3 can achieve a good imaging quality.

Embodiment 4

Figure 7:
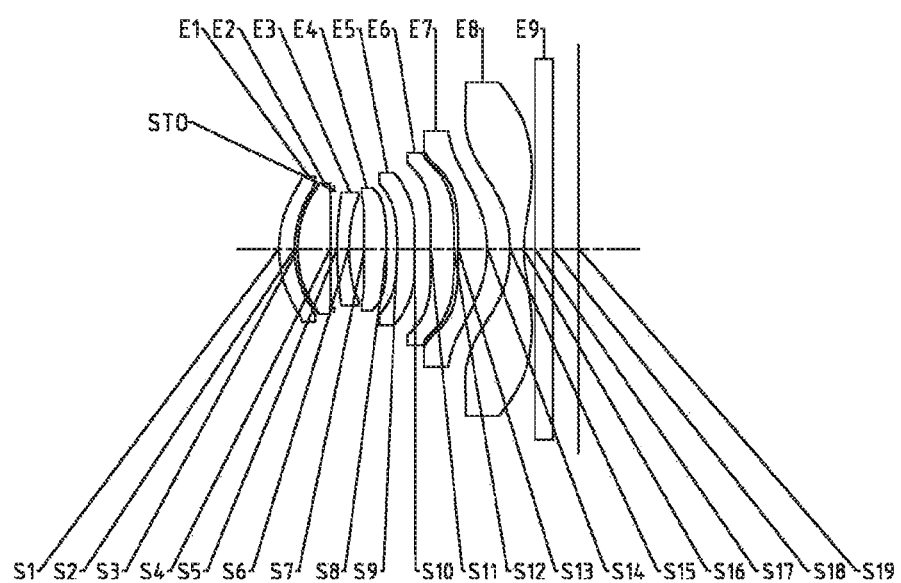
FIG. 7 is a schematic structural diagram illustrating an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram illustrating the optical imaging lens assembly according to Embodiment 4 of the present disclosure.

As shown in FIG. 7, the optical imaging lens assembly according to the exemplary implementations of the present disclosure includes, sequentially along an optical axis from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9, and an image plane S19.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 7 shows the surface type, the radius of curvature, the thickness, the material and the conic coefficient of each lens of the optical imaging lens assembly in Embodiment 4. The radius of curvature and the thickness are both shown in millimeters (mm).

TABLE 7

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.8200 | 0.2654 | 1.55 | 64.1 | −0.0977 |
| S2 | aspheric | 1.8238 | 0.0500 | | | −0.0441 |
| S3 | aspheric | 1.7870 | 0.5525 | 1.55 | 64.1 | 0.0411 |
| S4 | aspheric | 19.8177 | 0.0630 | | | 74.4507 |
| STO | spherical | infinite | 0.0500 | | | |
| S5 | aspheric | 4.8398 | 0.2000 | 1.67 | 20.4 | 5.0325 |
| S6 | aspheric | 2.4608 | 0.2598 | | | 0.0265 |
| S7 | aspheric | 22.7846 | 0.3789 | 1.55 | 64.1 | 99.0000 |
| S8 | aspheric | −11.9944 | 0.1780 | | | 94.3557 |
| S9 | aspheric | −9.6585 | 0.3005 | 1.67 | 20.4 | −86.5394 |
| S10 | aspheric | −24.1364 | 0.2600 | | | 91.1083 |
| S11 | aspheric | 16.6803 | 0.3958 | 1.55 | 64.1 | 65.3395 |
| S12 | aspheric | −79.3095 | 0.0696 | | | −99.0000 |
| S13 | aspheric | 245.6637 | 0.4949 | 1.55 | 64.1 | −99.0000 |
| S14 | aspheric | −1.6863 | 0.3797 | | | −7.0572 |
| S15 | aspheric | −2.8890 | 0.2305 | 1.54 | 55.7 | −2.3598 |
| S16 | aspheric | 1.7138 | 0.1961 | | | −11.5979 |
| S17 | spherical | infinite | 0.3000 | 1.52 | 64.2 | |
| S18 | spherical | infinite | 0.4403 | | | |
| S19 | spherical | infinite | | | | |

As may be obtained from Table 7, in Embodiment 4, the object-side surface and the image-side surface of any lens in the first to eighth lenses E1-E8 are both aspheric surfaces. Table 8 shows the high-order coefficients applicable to each aspheric surface in Embodiment 4. The surface type of each aspheric surface may be defined by the formula (1) given in Embodiment 1.

TABLE 8

| surface number | A4 | A6 | A8 | A10 | A12 |
|---|---|---|---|---|---|
| S1 | −1.1533E−02 | 3.1170E−02 | −1.2612E−01 | 3.1584E−01 | −5.0242E−01 |
| S2 | −3.0787E−02 | 5.1476E−02 | 3.6245E−02 | −3.7721E−01 | 1.1854E+00 |
| S3 | −3.3210E−02 | 9.3265E−02 | −2.6687E−01 | 7.2154E−01 | −1.2672E+00 |
| S4 | −7.4928E−02 | 1.2154E−01 | −2.2441E−01 | 4.4768E−01 | −8.5984E−01 |
| S5 | −1.3432E−01 | 2.5135E−01 | −1.8487E−01 | −3.7184E−01 | 1.8769E+00 |
| S6 | −8.2457E−02 | 1.7849E−01 | 8.7396E−02 | −1.5655E+00 | 6.0354E+00 |
| S7 | −7.7137E−02 | 6.2936E−02 | −4.9079E−01 | 1.8172E+00 | −4.8462E+00 |
| S8 | −1.3508E−01 | 1.9068E−01 | −9.6645E−01 | 2.8631E+00 | −5.9531E+00 |
| S9 | −2.3486E−01 | 1.4788E−01 | −1.6731E−01 | 6.2126E−02 | 1.2570E−01 |
| S10 | −2.0890E−01 | 5.6420E−02 | 1.4968E−01 | −3.8462E−01 | 4.5707E−01 |
| S11 | −8.4236E−02 | −1.4184E−01 | 3.4006E−01 | −4.4069E−01 | 3.5360E−01 |
| S12 | −7.3155E−02 | −7.9573E−02 | 1.4445E−01 | −1.3725E−01 | 6.6653E−02 |
| S13 | −1.0624E−01 | 3.9437E−02 | −8.9113E−02 | 1.3939E−01 | −1.3728E−01 |
| S14 | −7.4556E−02 | 5.5139E−02 | −8.0791E−02 | 9.6396E−02 | −6.5147E−02 |
| S15 | −1.9481E−01 | 1.4992E−01 | −7.2975E−02 | 2.8996E−02 | −8.4317E−03 |
| S16 | −1.1794E−01 | 8.8818E−02 | −4.7317E−02 | 1.7298E−02 | −4.3334E−03 |

TABLE 8-continued

| surface number | A14 | A16 | A18 | A20 |
|---|---|---|---|---|
| S1 | 4.8896E−01 | −2.8916E−01 | 9.4321E−02 | −1.3002E−02 |
| S2 | −2.0794E+00 | 2.0419E+00 | −1.0526E+00 | 2.1933E−01 |
| S3 | 1.3839E+00 | −9.5328E−01 | 4.0952E−01 | −8.9960E−02 |
| S4 | 1.2330E+00 | −1.1135E+00 | 5.7429E−01 | −1.3387E−01 |
| S5 | −3.9651E+00 | 4.8281E+00 | −3.2108E+00 | 8.8993E−01 |
| S6 | −1.3260E+01 | 1.7437E+01 | −1.2621E+01 | 3.8607E+00 |
| S7 | 8.3279E+00 | −8.6870E+00 | 4.9438E+00 | −1.1469E+00 |
| S8 | 7.9883E+00 | −6.5192E+00 | 2.9673E+00 | −5.8983E−01 |
| S9 | −4.7388E−01 | 8.1735E−01 | −6.1531E−01 | 1.6366E−01 |
| S10 | −3.2105E−01 | 1.4577E−01 | −4.2647E−02 | 6.1526E−03 |
| S11 | −1.7123E−01 | 4.2762E−02 | −3.0880E−03 | −3.6535E−04 |
| S12 | −7.7247E−03 | −7.9014E−03 | 3.6325E−03 | −4.6245E−04 |
| S13 | 8.4747E−02 | −3.2984E−02 | 7.4272E−03 | −7.1832E−04 |
| S14 | 2.5853E−02 | −6.0045E−03 | 7.5546E−04 | −3.9771E−05 |
| S15 | 1.6299E−03 | −1.9673E−04 | 1.3449E−05 | −3.9923E−07 |
| S16 | 7.2392E−04 | −7.6633E−05 | 4.6342E−06 | −1.2162E−07 |

In Embodiment 4, the total effective focal length f of the optical imaging lens assembly satisfies: f=4.09 mm. The effective focal length f1 of the first lens E1 satisfies: f1=62.33 mm. The effective focal length f2 of the second lens E2 satisfies: f2=3.56 mm. The effective focal length f3 of the third lens E3 satisfies: f3=−7.77 mm. The effective focal length f4 of the fourth lens E4 satisfies: f4=14.45 mm. The effective focal length f5 of the fifth lens E5 satisfies: f5=−24.35 mm. The effective focal length f6 of the sixth lens E6 satisfies: f6=25.28 mm. The effective focal length f7 of the seventh lens E7 satisfies:

f7=3.07 mm. The effective focal length f8 of the eighth lens E8 satisfies: f8=−1.97 mm. The total track length TTL (i.e., the distance on the optical axis from the center of the object-side surface S1 of the first lens E1 to the image plane S19) of the optical imaging lens assembly satisfies: TTL=5.07 mm. The half of the diagonal length ImgH of the effective pixel area on the image plane S19 of the optical imaging lens assembly satisfies: ImgH=3.41 mm.

Figure 8A:
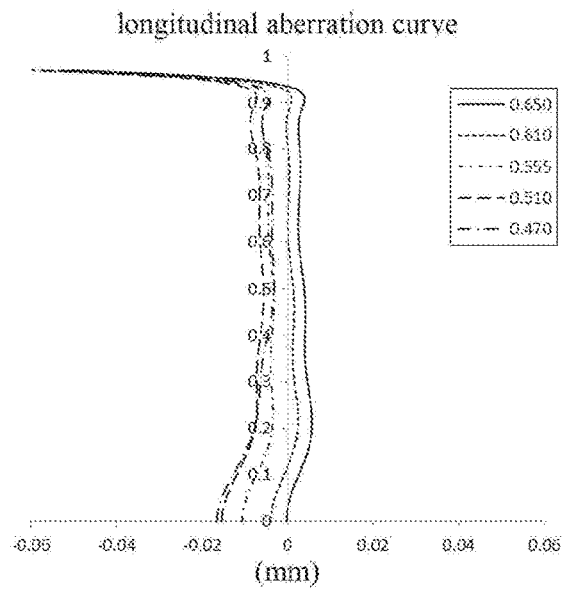
FIGS. 8A-8D respectively illustrate a longitudinal aberration curve, an astigmatic curve, a distortion curve, and a lateral color curve of the optical imaging lens assembly according to Embodiment 4.
Figure 8B:
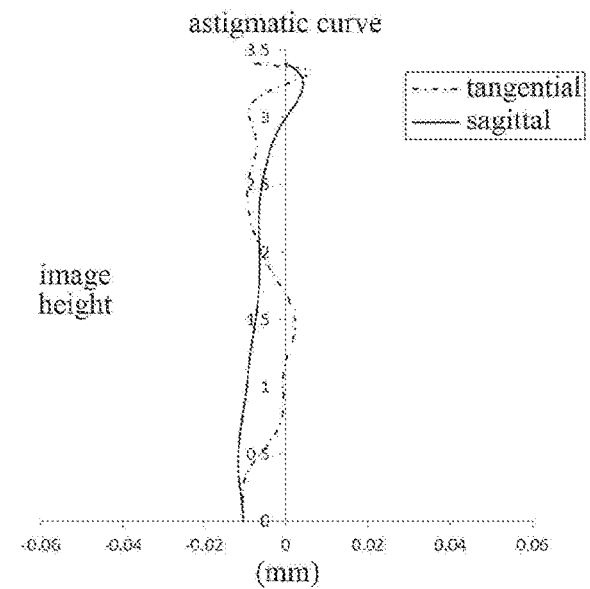
Figure 8C:
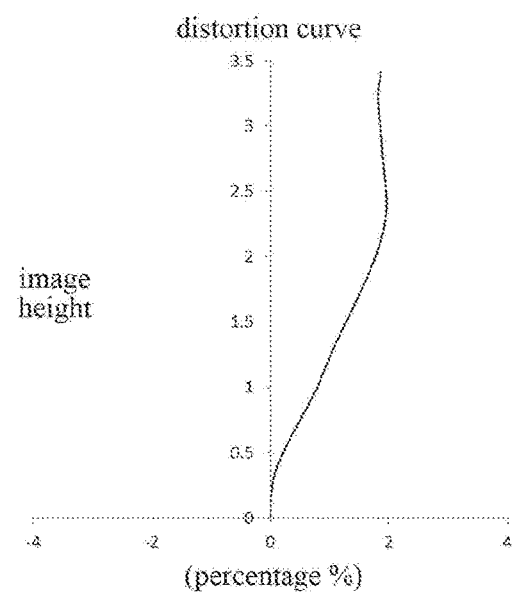
Figure 8D:
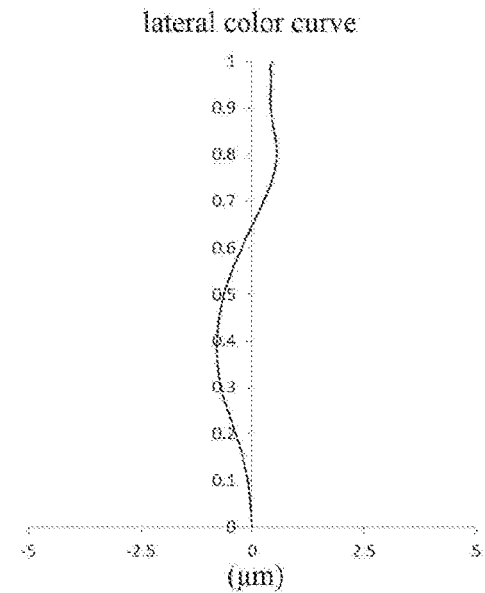

FIG. 8A illustrates the longitudinal aberration curve of the optical imaging lens assembly according to Embodiment 4, representing deviations of focal points of light of different wavelengths converged after passing through the lens assembly. FIG. 8B illustrates the astigmatic curve of the lens assembly according to Embodiment 4, representing a curvature of the tangential image plane and a curvature of the sagittal image plane. FIG. 8C illustrates the distortion curve of the optical imaging lens assembly according to Embodiment 4, representing amounts of distortion at different viewing angles. FIG. 8D illustrates the lateral color curve of the lens assembly according to Embodiment 4, representing deviations of different image heights on the image plane after light passes through the lens assembly. It can be seen from FIGS. 8A-8D that the optical imaging lens assembly according to Embodiment 4 can achieve a good imaging quality.

Embodiment 5

Figure 9:
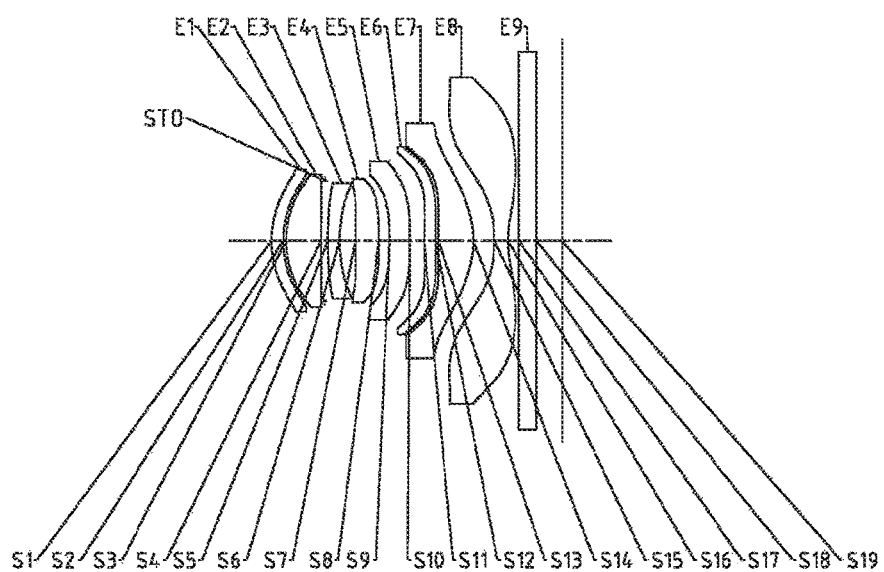
FIG. 9 is a schematic structural diagram illustrating an optical imaging lens assembly according to Embodiment 5 of the present disclosure.

An optical imaging lens assembly according to Embodiment 5 of the present disclosure is described below with reference to FIGS. 9-10D. FIG. 9 is a schematic structural diagram illustrating the optical imaging lens assembly according to Embodiment 5 of the present disclosure.

As shown in FIG. 9, the optical imaging lens assembly according to the exemplary implementations of the present disclosure includes, sequentially along an optical axis from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9, and an image plane S19.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 9 shows the surface type, the radius of curvature, the thickness, the material and the conic coefficient of each lens of the optical imaging lens assembly in Embodiment 5. The radius of curvature and the thickness are both shown in millimeters (mm).

TABLE 9

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7620 | 0.2000 | 1.55 | 64.1 | −0.0752 |
| S2 | aspheric | 1.7024 | 0.0500 | | | −0.0552 |
| S3 | aspheric | 1.6677 | 0.5979 | 1.55 | 64.1 | 0.0154 |
| S4 | aspheric | 16.2485 | 0.0665 | | | 91.6707 |
| STO | spherical | infinite | 0.0500 | | | |
| S5 | aspheric | 4.9747 | 0.2000 | 1.67 | 20.4 | 5.2899 |
| S6 | aspheric | 2.4666 | 0.2739 | | | 0.0297 |
| S7 | aspheric | 16.3972 | 0.4014 | 1.55 | 64.1 | 97.8827 |
| S8 | aspheric | −12.1270 | 0.1818 | | | 94.4900 |
| S9 | aspheric | −9.0091 | 0.3482 | 1.67 | 20.4 | −79.6849 |
| S10 | aspheric | −37.2635 | 0.2483 | | | 15.4787 |
| S11 | aspheric | 13.3014 | 0.2000 | 1.55 | 64.1 | 0.7338 |
| S12 | aspheric | 14.0601 | 0.0500 | | | −36.9280 |
| S13 | aspheric | 12.9777 | 0.5972 | 1.55 | 64.1 | −61.1370 |
| S14 | aspheric | −1.5794 | 0.3585 | | | −7.1035 |
| S15 | aspheric | −2.7435 | 0.2323 | 1.54 | 55.7 | −2.2845 |
| S16 | aspheric | 1.6527 | 0.1882 | | | −12.0166 |
| S17 | spherical | infinite | 0.3000 | 1.52 | 64.2 | |
| S18 | spherical | infinite | 0.4404 | | | |
| S19 | spherical | infinite | | | | |

As may be obtained from Table 9, in Embodiment 5, the object-side surface and the image-side surface of any lens in the first to eighth lenses E1-E8 are both aspheric surfaces. Table 10 shows the high-order coefficients applicable to each aspheric surface in Embodiment 5. The surface type of each aspheric surface may be defined by the formula (1) given in Embodiment 1.

In Embodiment 5, the total effective focal length f of the optical imaging lens assembly satisfies: f=4.03 mm. The effective focal length f1 of the first lens E1 satisfies: f1=500.00 mm. The effective focal length f2 of the second lens E2 satisfies: f2=3.36 mm. The effective focal length f3 of the third lens E3 satisfies: f3=−7.58 mm. The effective focal length f4 of the fourth lens E4 satisfies: f4=12.83 mm.

TABLE 10

| Surface number | A4 | A6 | A8 | A10 | A12 |
|---|---|---|---|---|---|
| S1 | −7.8028E−03 | 4.4916E−03 | −3.2446E−02 | 1.3448E−01 | −2.8066E−01 |
| S2 | −1.8233E−02 | −5.2813E−02 | 4.1561E−01 | −1.2097E+00 | 2.2927E+00 |
| S3 | −1.9617E−02 | −3.3731E−03 | 1.0278E−01 | −1.8240E−01 | 1.3936E−01 |
| S4 | −6.5829E−02 | 8.1194E−02 | 2.5716E−02 | −5.9664E−01 | 1.7879E+00 |
| S5 | −1.3511E−01 | 2.5992E−01 | −2.3192E−01 | −1.5742E−01 | 1.1646E+00 |
| S6 | −8.6052E−02 | 1.6446E−01 | 3.3150E+00 | −2.8902E+01 | 1.0181E+01 |
| S7 | −7.8428E−02 | 3.1224E−02 | −1.1923E−01 | −2.2855E−01 | 2.0217E+00 |
| S8 | −1.3021E−01 | 7.6995E−02 | −2.5405E−01 | 3.1331E−01 | −1.5360E−01 |
| S9 | −2.3739E−01 | 1.8260E−01 | −3.9655E−01 | 7.6198E−01 | −1.0961E+00 |
| S10 | −2.0576E−01 | 1.1058E−01 | −1.0325E−01 | 1.4953E−01 | −1.9374E−01 |
| S11 | −8.6880E−02 | −5.4044E−02 | 1.2476E−02 | 1.3233E−01 | −2.3289E−01 |
| S12 | −9.6945E−02 | 1.4911E−02 | −1.4213E−01 | 3.5224E−01 | −4.4654E−01 |
| S13 | −1.0546E−01 | 4.9200E−02 | −1.5120E−01 | 2.9043E−01 | −3.3538E−01 |
| S14 | −6.6994E−02 | 2.8398E−02 | −3.1897E−02 | 4.6006E−02 | −3.4071E−02 |
| S15 | −2.0321E−01 | 1.5670E−01 | −7.3698E−02 | 2.7936E−02 | −7.8540E−03 |
| S16 | −1.2753E−01 | 9.8025E−02 | −5.2745E−02 | 1.9325E−02 | −4.8528E−03 |

| Surface number | A14 | A16 | A18 | A20 |
|---|---|---|---|---|
| S1 | 3.2047E−01 | −2.1406E−01 | 7.6616E−02 | −1.1374E−02 |
| S2 | −2.8870E+00 | 2.2672E+00 | −1.0005E+00 | 1.8670E−01 |
| S3 | 1.7039E−02 | −1.5270E−01 | 1.4324E−01 | −4.7990E−02 |
| S4 | −2.8643E+00 | 2.6629E+00 | −1.3346E+00 | 2.7491E−01 |
| S5 | −2.4252E+00 | 2.7921E+00 | −1.7339E+00 | 4.4596E−01 |
| S6 | −2.1109E+01 | 2.6210E+01 | −1.7907E+01 | 5.1756E+00 |
| S7 | −5.7672E+00 | 8.4992E+00 | −6.4890E+00 | 2.0398E+00 |
| S8 | −3.2634E−01 | 7.0394E−01 | −5.0821E−01 | 1.2330E−01 |
| S9 | 8.5040E−01 | −1.1427E−01 | −2.1039E−01 | 8.1147E−02 |
| S10 | 1.5111E−01 | −5.3759E−02 | 3.0202E−03 | 1.6664E−03 |
| S11 | 1.9243E−01 | −9.0337E−02 | 2.3106E−02 | −2.4686E−03 |
| S12 | 3.3226E−01 | −1.4734E−01 | 3.5955E−02 | −3.6888E−03 |
| S13 | 2.3587E−01 | −1.0006E−01 | 2.3505E−02 | −2.3286E−03 |
| S14 | 1.4168E−02 | −3.3827E−03 | 4.3278E−04 | −2.2996E−05 |
| S15 | 1.4869E−03 | −1.7693E−04 | 1.1957E−05 | −3.5098E−07 |
| S16 | 8.1547E−04 | −8.7481E−05 | 5.4151E−06 | −1.4691E−07 |

The effective focal length f5 of the fifth lens E5 satisfies: f5=−17.90 mm. The effective focal length f6 of the sixth lens E6 satisfies: f6=413.11 mm. The effective focal length f7 of the seventh lens E7 satisfies: f7=2.62 mm. The effective focal length f8 of the eighth lens E8 satisfies: f8=−1.89 mm. The total track length TTL (i.e., the distance on the optical axis from the center of the object-side surface S1 of the first lens E1 to the image plane S19) of the optical imaging lens assembly satisfies: TTL=4.98 mm. The half of the diagonal length ImgH of the effective pixel area on the image plane S19 of the optical imaging lens assembly satisfies: ImgH=3.41 mm.

Figures 10A, 10B:
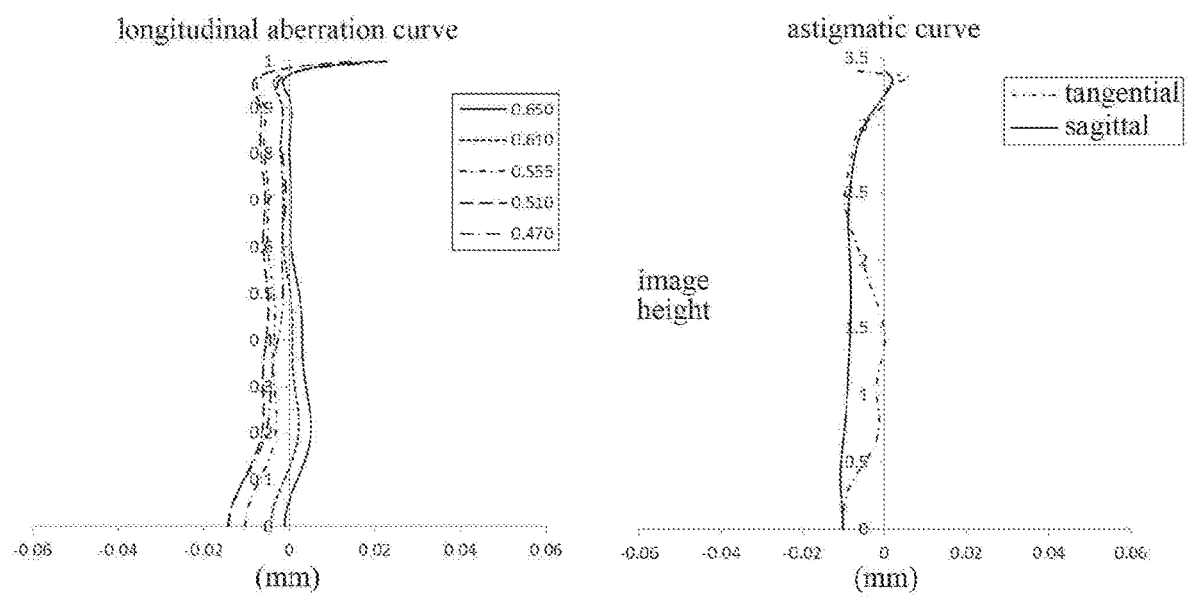
FIGS. 10A-10D respectively illustrate a longitudinal aberration curve, an astigmatic curve, a distortion curve, and a lateral color curve of the optical imaging lens assembly according to Embodiment 5.
Figures 10C, 10D:
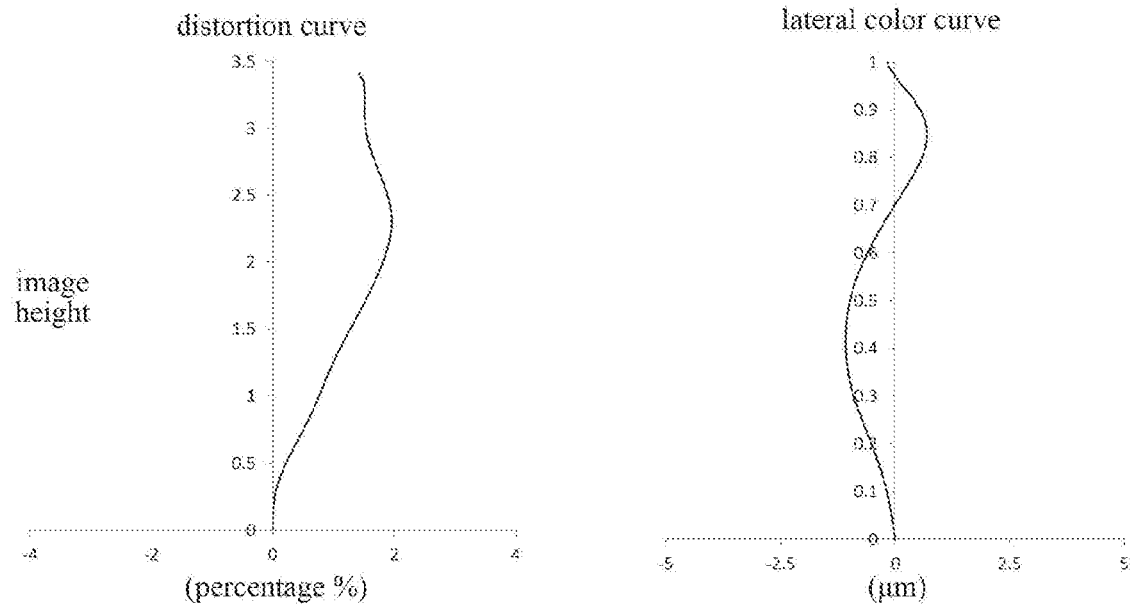

FIG. 10A illustrates the longitudinal aberration curve of the optical imaging lens assembly according to Embodiment 5, representing deviations of focal points of light of different wavelengths converged after passing through the lens assembly. FIG. 10B illustrates the astigmatic curve of the optical imaging lens assembly according to Embodiment 5, representing a curvature of the tangential image plane and a curvature of the sagittal image plane. FIG. 10C illustrates the distortion curve of the optical imaging lens assembly according to Embodiment 5, representing amounts of distortion at different viewing angles. FIG. 10D illustrates the lateral color curve of the optical imaging lens assembly according to Embodiment 5, representing deviations of different image heights on the image plane after light passes through the lens assembly. It can be seen from FIGS. 10A-10D that the optical imaging lens assembly according to Embodiment 5 can achieve a good imaging quality.

Embodiment 6

Figure 11:
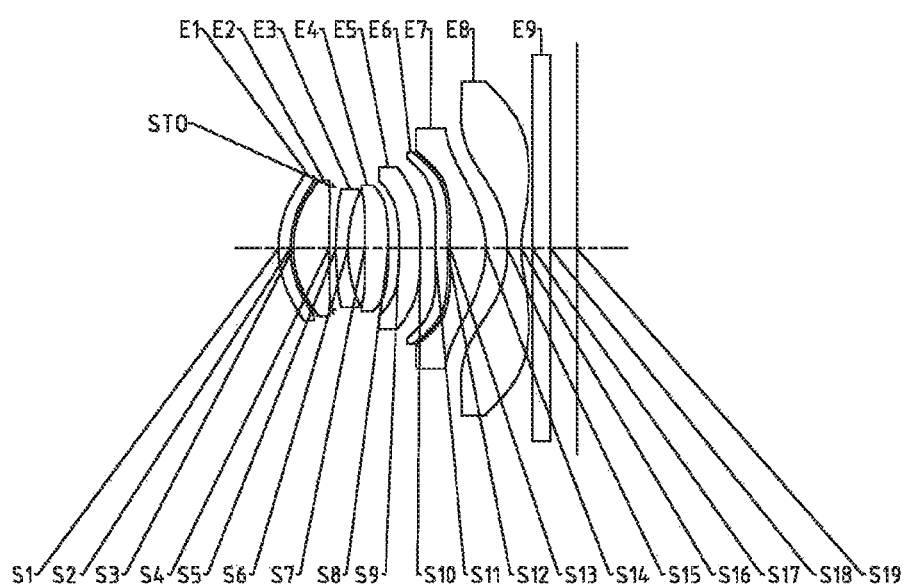
FIG. 11 is a schematic structural diagram illustrating an optical imaging lens assembly according to Embodiment 6 of the present disclosure.

An optical imaging lens assembly according to Embodiment 6 of the present disclosure is described below with reference to FIGS. 11-12D. FIG. 11 is a schematic structural diagram illustrating the optical imaging lens assembly according to Embodiment 6 of the present disclosure.

As shown in FIG. 11, the optical imaging lens assembly according to the exemplary implementations of the present disclosure includes, sequentially along an optical axis from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9, and an image plane S19.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 11 shows the surface type, the radius of curvature, the thickness, the material and the conic coefficient of each lens of the optical imaging lens assembly in Embodiment 6. The radius of curvature and the thickness are both shown in millimeters (mm).

TABLE 11

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.7700 | 0.2000 | 1.55 | 64.1 | −0.0549 |
| S2 | aspheric | 1.6933 | 0.0500 | | | −0.0620 |
| S3 | aspheric | 1.6611 | 0.5984 | 1.55 | 64.1 | 0.0035 |
| S4 | aspheric | 17.1436 | 0.0666 | | | 99.0000 |
| STO | spherical | infinite | 0.0500 | | | |
| S5 | aspheric | 5.1128 | 0.2000 | 1.67 | 20.4 | 5.7475 |
| S6 | aspheric | 2.4729 | 0.2753 | | | −0.0571 |
| S7 | aspheric | 14.9149 | 0.4023 | 1.55 | 64.1 | 99.0000 |
| S8 | aspheric | −12.4234 | 0.1934 | | | 84.3477 |
| S9 | aspheric | −7.9612 | 0.3478 | 1.67 | 20.4 | −90.4591 |
| S10 | aspheric | −26.7346 | 0.2424 | | | −99.0000 |
| S11 | aspheric | 13.6062 | 0.2586 | 1.55 | 64.1 | 22.9709 |
| S12 | aspheric | 9.5124 | 0.0500 | | | −9.4741 |
| S13 | aspheric | 8.4957 | 0.6114 | 1.55 | 64.1 | −35.3826 |
| S14 | aspheric | −1.6247 | 0.3518 | | | −6.6769 |
| S15 | aspheric | −2.7689 | 0.2427 | 1.54 | 55.7 | −2.2712 |
| S16 | aspheric | 1.6893 | 0.1913 | | | −11.9467 |
| S17 | spherical | infinite | 0.3000 | 1.52 | 64.2 | |
| S18 | spherical | infinite | 0.4410 | | | |
| S19 | spherical | infinite | | | | |

As may be obtained from Table 11, in Embodiment 6, the object-side surface and the image-side surface of any lens in the first to eighth lenses E1-E8 are both aspheric surfaces. Table 12 shows the high-order coefficients applicable to each aspheric surface in Embodiment 6. The surface type of each aspheric surface may be defined by the formula (1) given in Embodiment 1.

the distortion curve of the optical imaging lens assembly according to Embodiment 6, representing amounts of distortion at different viewing angles. FIG. 12D illustrates the lateral color curve of the optical imaging lens assembly according to Embodiment 6, representing deviations of

TABLE 12

| Surface number | A4 | A6 | A8 | A10 | A12 |
|---|---|---|---|---|---|
| S1 | −7.6417E−03 | −1.7043E−03 | 2.7390E−02 | −5.7375E−02 | 5.3084E−02 |
| S2 | −2.7363E−02 | −1.3982E−02 | 3.8157E−01 | −1.3188E+00 | 2.6396E+00 |
| S3 | −2.6338E−02 | 1.6629E−02 | 1.3546E−01 | −4.8063E−01 | 8.8924E−01 |
| S4 | −6.3051E−02 | 9.1650E−02 | −5.0828E−02 | −2.9438E−01 | 1.0513E+00 |
| S5 | −1.3118E−01 | 2.5102E−01 | −1.8531E−01 | −4.2169E−01 | 1.9700E+00 |
| S6 | −8.5710E−02 | 1.8512E−01 | 9.5673E−02 | −1.6084E+00 | 5.8464E+00 |
| S7 | −7.5607E−02 | 2.3350E−02 | −1.2638E−01 | −8.8638E−01 | 9.4410E−01 |
| S8 | −1.2194E−01 | 8.8359E−02 | −4.1538E−01 | 1.0051E+00 | −1.8327E+00 |
| S9 | −2.3527E−01 | 1.7869E−01 | −3.6300E−01 | 6.1876E−01 | −7.6204E−01 |
| S10 | −2.0779E−01 | 1.2214E−01 | −1.3388E−01 | 2.0190E−01 | −2.4581E−01 |
| S11 | −9.3463E−02 | −4.9934E−02 | 5.3353E−02 | 6.4190E−03 | −5.1870E−02 |
| S12 | −9.5375E−02 | 1.3310E−02 | −1.1281E−02 | 2.8083E−01 | −3.5738E−01 |
| S13 | −1.0404E−01 | 5.0396E−02 | −1.6245E−01 | 3.1402E−01 | −3.5903E−01 |
| S14 | −5.5756E−02 | 4.3995E−03 | −8.0585E−03 | 2.9007E−02 | −2.5054E−02 |
| S15 | −1.9892E−01 | 1.5262E−01 | −7.2451E−02 | 2.8084E−02 | −8.1137E−03 |
| S16 | −1.2295E−01 | 9.4489E−02 | −5.0586E−02 | 1.8414E−02 | −4.5805E−03 |

| Surface number | A14 | A16 | A18 | A20 |
|---|---|---|---|---|
| S1 | −2.8019E−02 | 4.0052E−03 | 1.4282E−03 | −3.9785E−04 |
| S2 | −3.3337E+00 | 2.5679E+00 | −1.1014E+00 | 1.9969E−01 |
| S3 | −9.9882E−01 | 6.4405E−01 | −2.0014E−01 | 1.5991E−02 |
| S4 | −1.7504E+00 | 1.6478E+00 | −8.2597E−01 | 1.6815E−01 |
| S5 | −3.8227E+00 | 4.1966E+00 | −2.4975E+00 | 6.2070E−01 |
| S6 | −1.1951E+01 | 1.4557E+01 | −9.7650E+00 | 2.7777E+00 |
| S7 | −3.0641E+00 | 4.7136E+00 | −3.6658E+00 | 1.1621E+00 |
| S8 | 2.1620E+00 | −1.5150E+00 | 5.8229E−01 | −1.0289E−01 |
| S9 | 4.1971E−01 | 1.9414E−01 | −3.2951E−01 | 1.0175E−01 |
| S10 | 1.8753E−01 | −7.3792E−02 | 9.9345E−03 | 7.0249E−04 |
| S11 | 4.8352E−02 | −2.4443E−02 | 6.6366E−03 | −7.0971E−04 |
| S12 | 2.6646E−01 | −1.1809E−01 | 2.8699E−02 | −2.9219E−03 |
| S13 | 2.4903E−01 | −1.0426E−01 | 2.4226E−02 | −2.3809E−03 |
| S14 | 1.0876E−02 | −2.6256E−03 | 3.3542E−04 | −1.7685E−05 |
| S15 | 1.5838E−03 | −1.9511E−04 | 1.3707E−05 | −4.1969E−07 |
| S16 | 7.6035E−04 | −8.0286E−05 | 4.8718E−06 | −1.2912E−07 |

In Embodiment 6, the total effective focal length f of the optical imaging lens assembly satisfies: f=4.11 mm. The effective focal length f1 of the first lens E1 satisfies: f1=−900.00 mm. The effective focal length f2 of the second lens E2 satisfies: f2=3.32 mm. The effective focal length f3 of the third lens E3 satisfies: f3=−7.41 mm. The effective focal length f4 of the fourth lens E4 satisfies: f4=12.48 mm. The effective focal length f5 of the fifth lens E5 satisfies: f5=−17.13 mm. The effective focal length f6 of the sixth lens E6 satisfies: f6=−59.24 mm. The effective focal length f7 of the seventh lens E7 satisfies: f7=2.55 mm. The effective focal length f8 of the eighth lens E8 satisfies: f8=−1.92 mm. The total track length TTL (i.e., the distance on the optical axis from the center of the object-side surface S1 of the first lens E1 to the image plane S19) of the optical imaging lens assembly satisfies: TTL=5.07 mm. The half of the diagonal length ImgH of the effective pixel area on the image plane S19 of the optical imaging lens assembly satisfies: ImgH=3.41 mm.

Figure 12A:
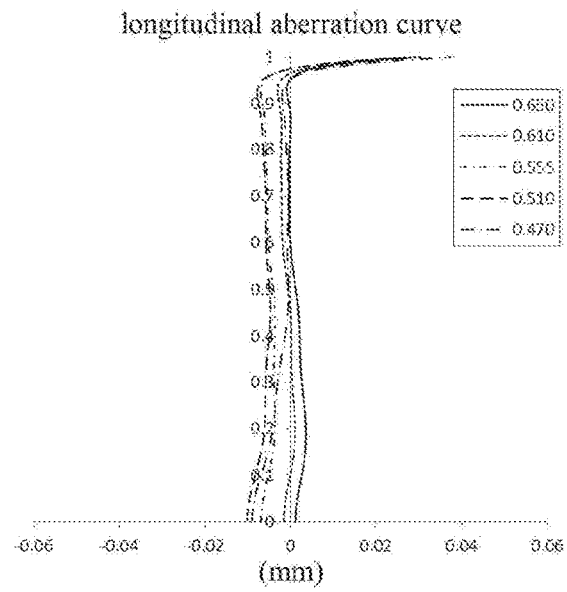
FIGS. 12A-12D respectively illustrate a longitudinal aberration curve, an astigmatic curve, a distortion curve, and a lateral color curve of the optical imaging lens assembly according to Embodiment 6.
Figure 12B:
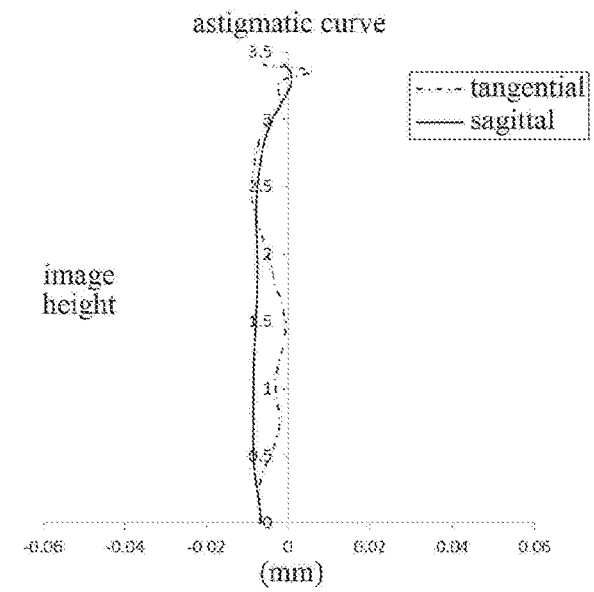
Figure 12C:
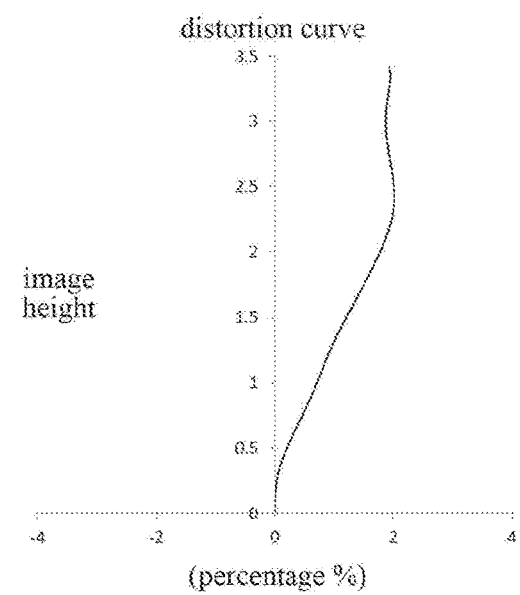
Figure 12D:
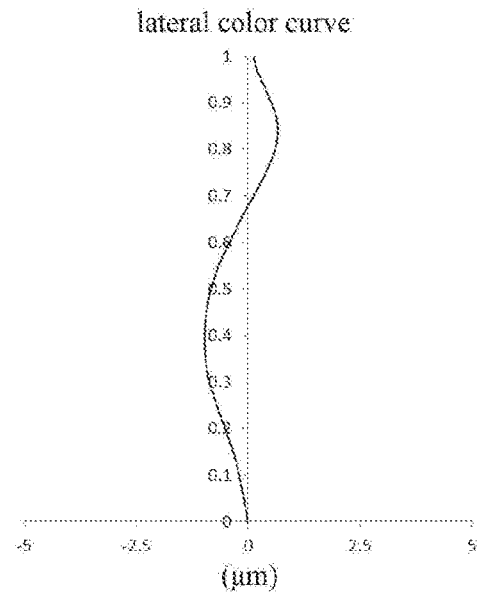

FIG. 12A illustrates the longitudinal aberration curve of the optical imaging lens assembly according to Embodiment 6, representing deviations of focal points of light of different wavelengths converged after passing through the lens assembly. FIG. 12B illustrates the astigmatic curve of the optical imaging lens assembly according to Embodiment 6, representing a curvature of the tangential image plane and a curvature of the sagittal image plane. FIG. 12C illustrates the distortion curve of the optical imaging lens assembly according to Embodiment 6, representing amounts of distortion at different viewing angles. FIG. 12D illustrates the lateral color curve of the optical imaging lens assembly according to Embodiment 6, representing deviations of different image heights on the image plane after light passes through the lens assembly. It can be seen from FIGS. 12A-12D that the optical imaging lens assembly according to Embodiment 6 can achieve a good imaging quality.

Embodiment 7

An optical imaging lens assembly according to Embodiment 7 of the present disclosure is described below with reference to FIGS. 13-14D. FIG. 13 is a schematic structural diagram illustrating the optical imaging lens assembly according to Embodiment 7 of the present disclosure.

As shown in FIG. 13, the optical imaging lens assembly according to the exemplary implementations of the present disclosure includes, sequentially along an optical axis from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9, and an image plane S19.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 13 shows the surface type, the radius of curvature, the thickness, the material and the conic coefficient of each lens of the optical imaging lens assembly in Embodiment 7. The radius of curvature and the thickness are both shown in millimeters (mm).

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7738 | 0.2165 | 1.55 | 64.1 | −0.0945 |
| S2 | aspheric | 1.7307 | 0.0500 | | | −0.0567 |
| S3 | aspheric | 1.6843 | 0.5885 | 1.55 | 64.1 | 0.0210 |
| S4 | aspheric | 19.0238 | 0.0636 | | | 85.4888 |
| STO | spherical | infinite | 0.0500 | | | |
| S5 | aspheric | 5.0112 | 0.2000 | 1.67 | 20.4 | 6.5316 |
| S6 | aspheric | 2.5406 | 0.3723 | | | 0.3443 |
| S7 | aspheric | 19.3405 | 0.3449 | 1.55 | 64.1 | 99.0000 |
| S8 | aspheric | 17.9446 | 0.0981 | | | −99.0000 |
| S9 | aspheric | 20.7784 | 0.3647 | 1.67 | 20.4 | 68.1536 |
| S10 | aspheric | 16.1918 | 0.2433 | | | 66.5864 |
| S11 | aspheric | 11.4594 | 0.3020 | 1.55 | 64.1 | 42.1702 |
| S12 | aspheric | 13.9886 | 0.0953 | | | −1.9797 |
| S13 | aspheric | 15.9201 | 0.5568 | 1.55 | 64.1 | 50.2895 |
| S14 | aspheric | −1.5083 | 0.3325 | | | −6.3136 |
| S15 | aspheric | −2.8521 | 0.2243 | 1.54 | 55.7 | −2.2898 |
| S16 | aspheric | 1.6669 | 0.2226 | | | −12.4247 |
| S17 | spherical | infinite | 0.3000 | 1.52 | 64.2 | 0.0000 |
| S18 | spherical | infinite | 0.4747 | | | 0.0000 |
| S19 | spherical | infinite | | | | |

As may be obtained from Table 13, in Embodiment 7, the object-side surface and the image-side surface of any lens in the first to eighth lenses E1-E8 are both aspheric surfaces. Table 14 shows the high-order coefficients applicable to each aspheric surface in Embodiment 7. The surface type of each aspheric surface may be defined by the formula (1) given in Embodiment 1.

TABLE 14

| Surface number | A4 | A6 | A8 | A10 | A12 |
|---|---|---|---|---|---|
| S1 | −5.0044E−03 | −1.6592E−02 | 6.3917E−02 | −1.2022E−01 | 1.3047E−01 |
| S2 | −1.4885E−02 | −1.1101E−01 | 7.5130E−01 | −2.1917E+00 | 4.0543E+00 |
| S3 | −1.8316E−02 | −5.1240E−02 | 3.6656E−01 | −8.9132E−01 | 1.2734E+00 |
| S4 | −7.1361E−02 | 9.8524E−02 | −8.5063E−02 | −9.6052E−02 | 4.7830E−01 |
| S5 | −1.2883E−01 | 2.5204E−01 | −3.3047E−01 | 5.9638E−01 | −1.4010E+00 |
| S6 | −7.2988E−02 | 1.4239E−01 | 2.3170E−01 | −1.8759E+00 | 6.1003E+00 |
| S7 | −6.3715E−02 | −3.9632E−02 | 3.1393E−01 | −1.5789E+00 | 4.1535E+00 |
| S8 | −1.8721E−01 | 1.7396E−01 | −2.9843E−01 | 2.0742E−01 | 5.3991E−02 |
| S9 | −2.5553E−01 | 1.8945E−01 | −1.3046E−01 | −1.5690E−01 | 7.6560E−01 |
| S10 | −1.9456E−01 | 5.8015E−02 | 7.7195E−02 | −1.7565E−01 | 1.7403E−01 |
| S11 | −9.8842E−02 | −6.4019E−02 | 3.5778E−02 | 1.3352E−01 | −2.9222E−01 |
| S12 | −9.3474E−02 | 1.1315E−02 | −1.1250E−01 | 2.8130E−01 | −3.5175E−01 |
| S13 | −9.3322E−02 | 3.9237E−02 | −1.1838E−01 | 2.1770E−01 | −2.3966E−01 |

TABLE 14-continued

| | | | | | |
|---|---|---|---|---|---|
| S14 | −6.1167E−02 | 1.2508E−02 | −5.3938E−03 | 2.0178E−02 | −1.9465E−02 |
| S15 | −1.9424E−01 | 1.4657E−01 | −6.7526E−02 | 2.5092E−02 | −6.9109E−03 |
| S16 | −1.2790E−01 | 9.6197E−02 | −5.1378E−02 | 1.8707E−02 | −4.6547E−03 |

| Surface number | A14 | A16 | A18 | A20 |
|---|---|---|---|---|
| S1 | −9.9866E−02 | 4.8578E−02 | −1.4158E−02 | 1.9083E−03 |
| S2 | −4.9174E+00 | 3.7175E+00 | −1.5783E+00 | 2.8420E−01 |
| S3 | −1.1017E+00 | 4.9418E−01 | −4.3300E−02 | −3.1614E−02 |
| S4 | −8.2175E−01 | 7.8154E−01 | −3.8777E−01 | 7.3483E−02 |
| S5 | 2.4960E+00 | −2.6465E+00 | 1.4936E+00 | −3.5080E−01 |
| S6 | −1.1999E+01 | 1.4519E+01 | −9.8391E+00 | 2.8386E+00 |
| S7 | −6.5953E+00 | 6.1746E+00 | −3.0847E+00 | 6.0677E−01 |
| S8 | −6.2416E−01 | 1.0342E+00 | −6.8969E−01 | 1.5589E−01 |
| S9 | −1.7814E+00 | 2.2726E+00 | −1.4097E+00 | 3.3128E−01 |
| S10 | −1.2991E−01 | 8.7146E−02 | −3.8171E−02 | 6.9020E−03 |
| S11 | 2.7767E−01 | −1.4968E−01 | 4.4366E−02 | −5.5434E−03 |
| S12 | 2.5691E−01 | −1.1174E−01 | 2.6732E−02 | −2.6865E−03 |
| S13 | 1.6040E−01 | −6.4718E−02 | 1.4451E−02 | −1.3597E−03 |
| S14 | 9.1225E−03 | −2.3169E−03 | 3.0586E−04 | −1.6484E−05 |
| S15 | 1.2798E−03 | −1.4865E−04 | 9.7827E−06 | −2.7889E−07 |
| S16 | 7.7152E−04 | −8.1177E−05 | 4.9032E−06 | −1.2941E−07 |

In Embodiment 7, the total effective focal length f of the optical imaging lens assembly satisfies: f=4.21 mm. The effective focal length f1 of the first lens E1 satisfies: f1=169.02 mm. The effective focal length f2 of the second lens E2 satisfies: f2=3.35 mm. The effective focal length f3 of the third lens E3 satisfies: f3=−7.99 mm. The effective focal length f4 of the fourth lens E4 satisfies: f4=−499.00 mm. The effective focal length f5 of the fifth lens E5 satisfies: f5=−113.60 mm. The effective focal length f6 of the sixth lens E6 satisfies: f6=111.41 mm. The effective focal length f7 of the seventh lens E7 satisfies: f7=2.55 mm. The effective focal length f8 of the eighth lens E8 satisfies: f8=−1.93 mm. The total track length TTL (i.e., the distance on the optical axis from the center of the object-side surface S1 of the first lens E1 to the image plane S19) of the optical imaging lens assembly satisfies: TTL=5.10 mm. The half of the diagonal length ImgH of the effective pixel area on the image plane S19 of the optical imaging lens assembly satisfies: ImgH=3.41 mm.

Figures 14C, 14D:
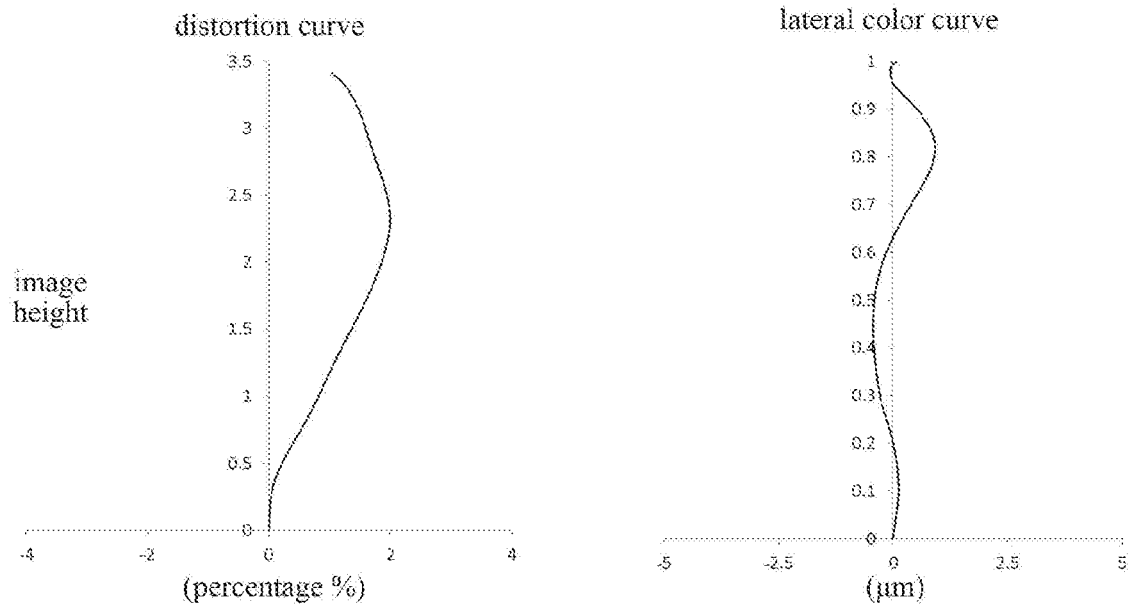

FIG. 14A illustrates the longitudinal aberration curve of the optical imaging lens assembly according to Embodiment 7, representing deviations of focal points of light of different wavelengths converged after passing through the lens assembly. FIG. 14B illustrates the astigmatic curve of the optical imaging lens assembly according to Embodiment 7, representing a curvature of the tangential image plane and a curvature of the sagittal image plane. FIG. 14C illustrates the distortion curve of the optical imaging lens assembly according to Embodiment 7, representing amounts of distortion at different viewing angles. FIG. 14D illustrates the lateral color curve of the optical imaging lens assembly according to Embodiment 7, representing deviations of different image heights on the image plane after light passes through the lens assembly. It can be seen from FIGS. 14A-14D that the optical imaging lens assembly according to Embodiment 7 can achieve a good imaging quality.

Embodiment 8

Figure 15:
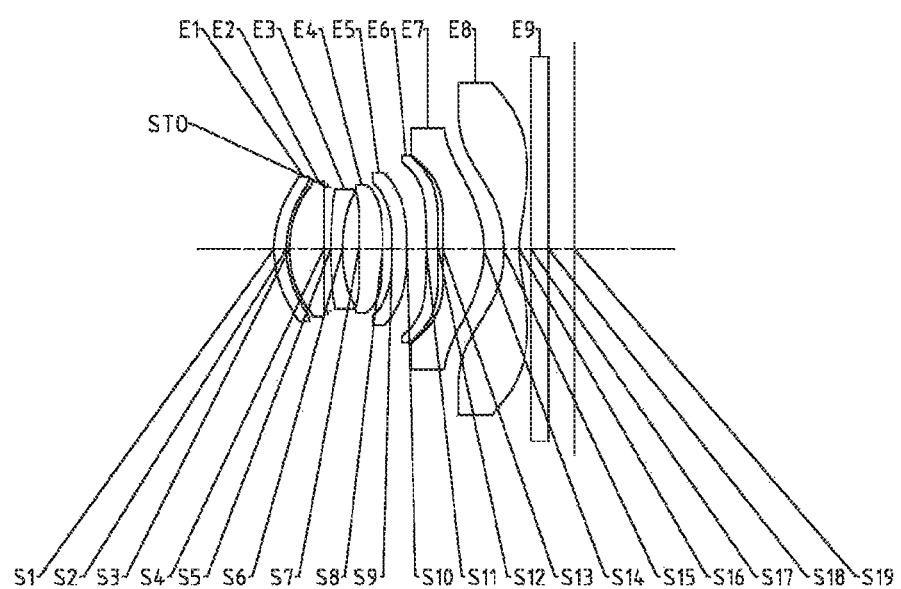
FIG. 15 is a schematic structural diagram illustrating an optical imaging lens assembly according to Embodiment 8 of the present disclosure.

An optical imaging lens assembly according to Embodiment 8 of the present disclosure is described below with reference to FIGS. 15-16D. FIG. 15 is a schematic structural diagram illustrating the optical imaging lens assembly according to Embodiment 8 of the present disclosure.

As shown in FIG. 15, the optical imaging lens assembly according to the exemplary implementations of the present disclosure includes, sequentially along an optical axis from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9, and an image plane S19.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 15 shows the surface type, the radius of curvature, the thickness, the material and the conic coefficient of each lens of the optical imaging lens assembly in Embodiment 8. The radius of curvature and the thickness are both shown in millimeters (mm).

TABLE 15

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7808 | 0.2080 | 1.55 | 64.1 | −0.0696 |
| S2 | aspheric | 1.7490 | 0.0500 | | | −0.0604 |
| S3 | aspheric | 1.7142 | 0.5852 | 1.55 | 64.1 | 0.0303 |
| S4 | aspheric | 20.4252 | 0.0642 | | | 99.0000 |
| STO | spherical | infinite | 0.0500 | | | |
| S5 | aspheric | 5.6292 | 0.2000 | 1.67 | 20.4 | 6.5766 |
| S6 | aspheric | 2.4452 | 0.2735 | | | 0.0231 |
| S7 | aspheric | 15.3755 | 0.4005 | 1.55 | 64.1 | 98.3454 |
| S8 | aspheric | −13.1324 | 0.1570 | | | 74.9744 |
| S9 | aspheric | −10.2387 | 0.2528 | 1.67 | 20.4 | −97.8714 |
| S10 | aspheric | −10.1449 | 0.3294 | | | 25.6392 |
| S11 | aspheric | 171.7591 | 0.2000 | 1.55 | 64.1 | 99.0000 |
| S12 | aspheric | 18.4505 | 0.0795 | | | 97.6607 |
| S13 | aspheric | 15.5861 | 0.6923 | 1.55 | 64.1 | −99.0000 |
| S14 | aspheric | −1.7088 | 0.3330 | | | −7.9274 |
| S15 | aspheric | −2.7455 | 0.2608 | 1.54 | 55.7 | −2.5859 |
| S16 | aspheric | 1.7447 | 0.1968 | | | −11.8602 |
| S17 | spherical | infinite | 0.3000 | 1.52 | 64.2 | |
| S18 | spherical | infinite | 0.4386 | | | |
| S19 | spherical | infinite | | | | |

As may be obtained from Table 15, in Embodiment 8, the object-side surface and the image-side surface of any lens in the first to eighth lenses E1-E8 are both aspheric surfaces. Table 16 shows the high-order coefficients applicable to each aspheric surface in Embodiment 8. The surface type of each aspheric surface may be defined by the formula (1) given in Embodiment 1.

In Embodiment 8, the total effective focal length f of the optical imaging lens assembly satisfies: f=4.17 mm. The effective focal length f1 of the first lens E1 satisfies: f1=136.91 mm. The effective focal length f2 of the second lens E2 satisfies: f2=3.39 mm. The effective focal length f3 of the third lens E3 satisfies: f3=−6.65 mm. The effective focal length f4 of the fourth lens E4 satisfies: f4=13.04 mm.

TABLE 16

| Surface number | A4 | A6 | A8 | A10 | A12 |
|---|---|---|---|---|---|
| S1 | −8.5128E−03 | −7.0011E−03 | 5.1068E−02 | −1.2080E−01 | 1.6052E−01 |
| S2 | −2.8084E−02 | −1.2943E−02 | 3.8081E−01 | −1.2998E+00 | 2.5582E+00 |
| S3 | −2.5139E−02 | 1.8013E−02 | 1.3690E−01 | −4.7441E−01 | 8.3585E−01 |
| S4 | −6.1793E−02 | 1.0060E−01 | −9.0912E−02 | −1.6481E−01 | 7.5157E−01 |
| S5 | −1.3407E−01 | 2.7224E−01 | −2.6728E−01 | −1.4123E−01 | 1.2062E+00 |
| S6 | −8.8184E−02 | 2.0895E−01 | −4.8857E−02 | −8.9730E−02 | 3.4959E+00 |
| S7 | −6.8906E−02 | −1.1623E−02 | 1.0777E−01 | −1.0762E+00 | 3.9576E+00 |
| S8 | −1.2137E−01 | 9.9026E−02 | −5.7825E−01 | 1.7243E+00 | −3.6677E+00 |
| S9 | −2.2192E−01 | 1.2659E−01 | −3.3084E−01 | 8.0432E−01 | −1.5400E+00 |
| S10 | −1.7543E−01 | 5.5148E−02 | −1.0545E−02 | −3.1566E−02 | 6.4923E−02 |
| S11 | −7.1430E−02 | −2.3944E−02 | 2.2316E−02 | −1.7007E−02 | −2.1786E−02 |
| S12 | −1.0041E−01 | −8.6677E−03 | 2.1778E−02 | 1.0563E−02 | −7.3682E−02 |
| S13 | −9.5131E−02 | −1.0958E−02 | −3.9009E−02 | 1.4594E−01 | −1.9615E−01 |
| S14 | −5.5902E−02 | 1.2405E−02 | −3.9290E−02 | 6.7148E−02 | −4.8666E−02 |
| S15 | −1.6542E−01 | 1.0633E−01 | −3.9299E−02 | 1.3200E−02 | −3.7724E−03 |
| S16 | −1.1541E−01 | 8.7190E−02 | −4.6520E−02 | 1.6914E−02 | −4.1951E−03 |

| Surface number | A14 | A16 | A18 | A20 |
|---|---|---|---|---|
| S1 | −1.4308E−01 | 8.0284E−02 | −2.6999E−02 | 4.1126E−03 |
| S2 | −3.1939E+00 | 2.4490E+00 | −1.0511E+00 | 1.9130E−01 |
| S3 | −8.9484E−01 | 5.5157E−01 | −1.6118E−01 | 1.0105E−02 |
| S4 | −1.2939E+00 | 1.2206E+00 | −6.0390E−01 | 1.1943E−01 |
| S5 | −2.4117E+00 | 2.6006E+00 | −1.5071E+00 | 3.6286E−01 |
| S6 | −7.0708E+00 | 8.4908E+00 | −5.6455E+00 | 1.6023E+00 |
| S7 | −8.3267E+00 | 1.0262E+01 | −6.9036E+00 | 1.9668E+00 |
| S8 | 5.0821E+00 | −4.3094E+00 | 2.0408E+00 | −4.2100E−01 |
| S9 | 2.0464E+00 | −1.6080E+00 | 6.5964E−01 | −1.1030E−01 |
| S10 | −1.3697E−02 | −3.9798E−02 | 2.7866E−02 | −5.2913E−03 |
| S11 | 7.1693E−02 | −6.5811E−02 | 2.5333E−02 | −3.5325E−03 |
| S12 | 9.3798E−02 | −5.6747E−02 | 1.6902E−02 | −1.9766E−03 |
| S13 | 1.4324E−01 | −6.2216E−02 | 1.5190E−02 | −1.5856E−03 |
| S14 | 1.9235E−02 | −4.3437E−03 | 5.2660E−04 | −2.6617E−05 |
| S15 | 7.6351E−04 | −9.8454E−05 | 7.2628E−06 | −2.3429E−07 |
| S16 | 6.9162E−04 | −7.2162E−05 | 4.3019E−06 | −1.1137E−07 |

The effective focal length f5 of the fifth lens E5 satisfies: f5=799.00 mm. The effective focal length f6 of the sixth lens E6 satisfies: f6=−37.89 mm. The effective focal length f7 of the seventh lens E7 satisfies: f7=2.86 mm. The effective focal length f8 of the eighth lens E8 satisfies: f8=−1.95 mm. The total track length TTL (i.e., the distance on the optical axis from the center of the object-side surface S1 of the first lens E1 to the image plane S19) of the optical imaging lens assembly satisfies: TTL=5.07 mm. The half of the diagonal length ImgH of the effective pixel area on the image plane S19 of the optical imaging lens assembly satisfies: ImgH=3.41 mm.

Figure 16A:
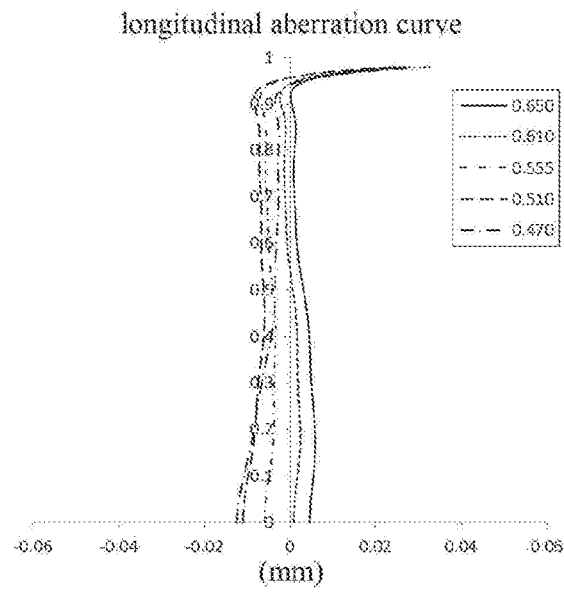
FIGS. 16A-16D respectively illustrate a longitudinal aberration curve, an astigmatic curve, a distortion curve, and a lateral color curve of the optical imaging lens assembly according to Embodiment 8.
Figure 16B:
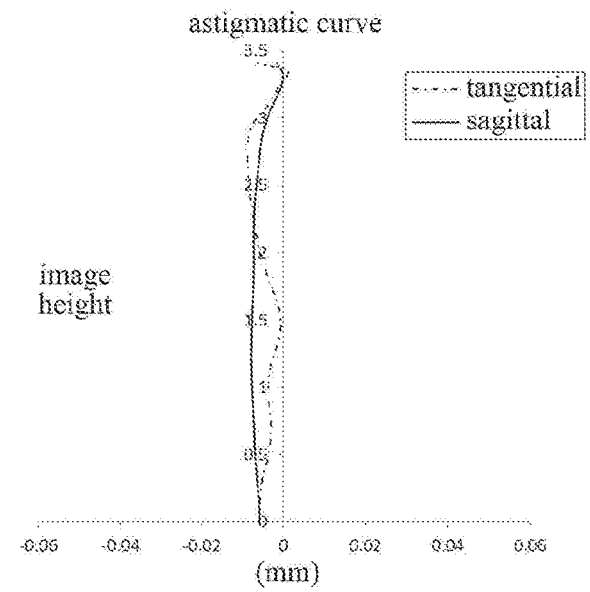
Figure 16C:
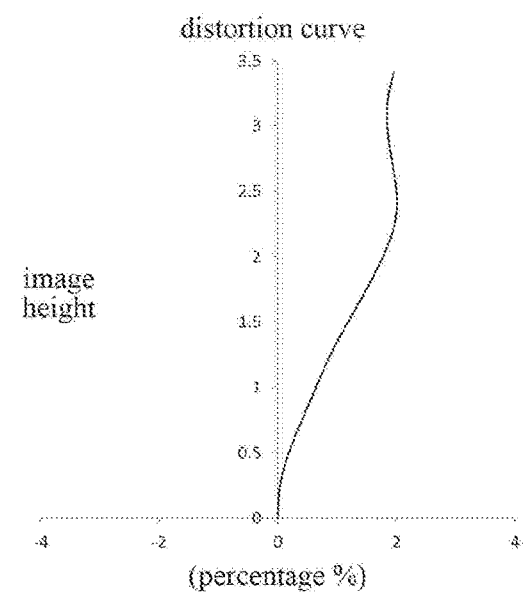
Figure 16D:
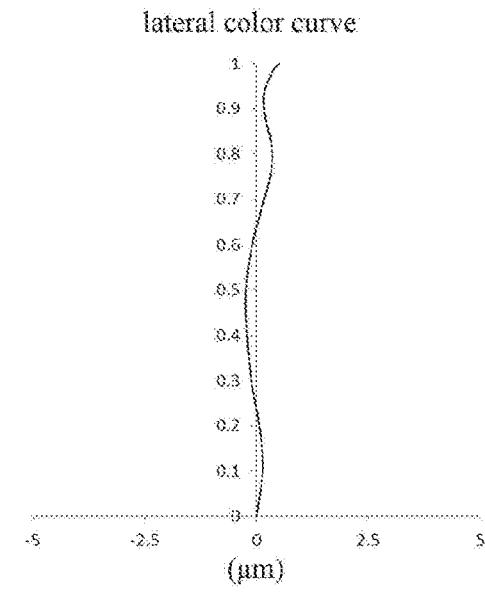

FIG. 16A illustrates the longitudinal aberration curve of the optical imaging lens assembly according to Embodiment 8, representing deviations of focal points of light of different wavelengths converged after passing through the lens assembly. FIG. 16B illustrates the astigmatic curve of the optical imaging lens assembly according to Embodiment 8, representing a curvature of the tangential image plane and a curvature of the sagittal image plane. FIG. 16C illustrates the distortion curve of the optical imaging lens assembly according to Embodiment 8, representing amounts of distortion at different viewing angles. FIG. 16D illustrates the lateral color curve of the optical imaging lens assembly according to Embodiment 8, representing deviations of different image heights on the image plane after light passes through the lens assembly. It can be seen from FIGS. 16A-16D that the optical imaging lens assembly according to Embodiment 8 can achieve a good imaging quality.

Embodiment 9

Figure 17:
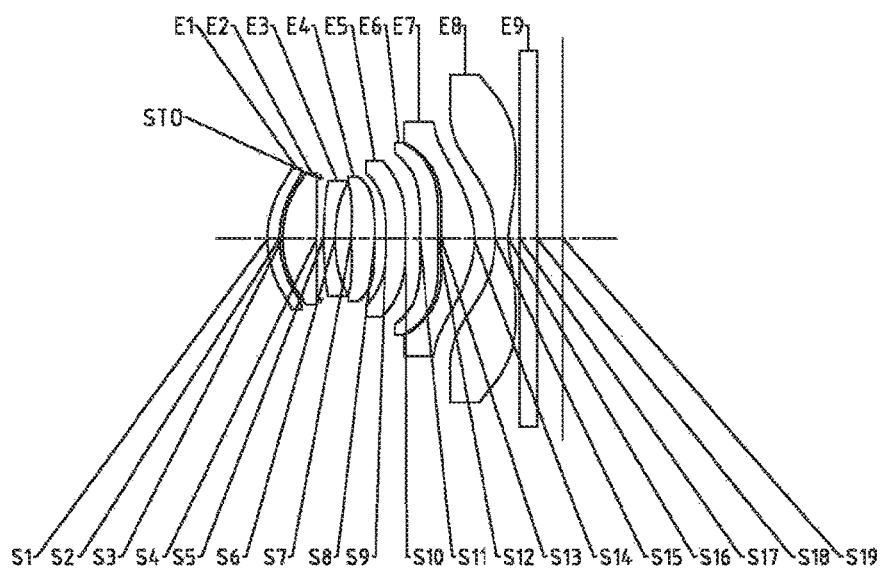
FIG. 17 is a schematic structural diagram illustrating an optical imaging lens assembly according to Embodiment 9 of the present disclosure.

An optical imaging lens assembly according to Embodiment 9 of the present disclosure is described below with reference to FIGS. 17-18D. FIG. 17 is a schematic structural diagram illustrating the optical imaging lens assembly according to Embodiment 9 of the present disclosure.

As shown in FIG. 17, the optical imaging lens assembly according to the exemplary implementations of the present disclosure includes, sequentially along an optical axis from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9, and an image plane S19.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 17 shows the surface type, the radius of curvature, the thickness, the material and the conic coefficient of each lens of the optical imaging lens assembly in Embodiment 9. The radius of curvature and the thickness are both shown in millimeters (mm).

TABLE 17

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7762 | 0.2061 | 1.55 | 64.1 | −0.0627 |
| S2 | aspheric | 1.7430 | 0.0503 | | | −0.0543 |
| S3 | aspheric | 1.7069 | 0.5858 | 1.55 | 64.1 | 0.0157 |
| S4 | aspheric | 17.8791 | 0.0658 | | | 99.0000 |
| STO | spherical | infinite | 0.0500 | | | |
| S5 | aspheric | 5.0934 | 0.2000 | 1.67 | 20.4 | 5.7415 |
| S6 | aspheric | 2.4674 | 0.2785 | | | −0.0795 |
| S7 | aspheric | 15.2804 | 0.4018 | 1.55 | 64.1 | 99.0000 |
| S8 | aspheric | −12.3607 | 0.1945 | | | 79.3765 |
| S9 | aspheric | −8.1872 | 0.3310 | 1.67 | 20.4 | −98.6857 |
| S10 | aspheric | −23.9715 | 0.2442 | | | 29.4471 |
| S11 | aspheric | 14.0502 | 0.3247 | 1.55 | 64.1 | 26.3521 |
| S12 | aspheric | 15.4113 | 0.0544 | | | 69.2577 |
| S13 | aspheric | 14.0897 | 0.5702 | 1.55 | 64.1 | 0.5464 |
| S14 | aspheric | −1.6111 | 0.3480 | | | −6.6194 |
| S15 | aspheric | −2.7567 | 0.2296 | 1.54 | 55.7 | −2.2497 |
| S16 | aspheric | 1.6734 | 0.1914 | | | −11.9584 |
| S17 | spherical | infinite | 0.3000 | 1.52 | 64.2 | |
| S18 | spherical | infinite | 0.4404 | | | |
| S19 | spherical | infinite | | | | |

As may be obtained from Table 17, in Embodiment 9, the object-side surface and the image-side surface of any lens in the first to eighth lenses E1-E8 are both aspheric surfaces. Table 18 shows the high-order coefficients applicable to each aspheric surface in Embodiment 9. The surface type of each aspheric surface may be defined by the formula (1) given in Embodiment 1.

TABLE 18

| Surface number | A4 | A6 | A8 | A10 | A12 |
|---|---|---|---|---|---|
| S1 | −7.6648E−03 | −6.9500E−04 | 1.7788E−02 | −2.9720E−02 | 7.0366E−03 |
| S2 | −2.6127E−02 | −2.1729E−02 | 4.1641E−01 | −1.4328E+00 | 2.8799E+00 |
| S3 | −2.5635E−02 | 1.1796E−02 | 1.6038E−01 | −5.5944E−01 | 1.0459E+00 |
| S4 | −6.3416E−02 | 9.6005E−02 | −6.2621E−02 | −2.7825E−01 | 1.0504E+00 |
| S5 | −1.3124E−01 | 2.5495E−01 | −1.9371E−01 | −4.3532E−01 | 2.0669E+00 |
| S6 | −8.5701E−02 | 1.8852E−01 | 7.0437E−02 | −1.4898E+00 | 5.4373E+00 |
| S7 | −7.5344E−02 | 1.8735E−02 | −1.1846E−01 | 3.1969E−02 | 6.8286E−01 |
| S8 | −1.1940E−01 | 9.4580E−02 | −5.3987E−01 | 1.5689E+00 | −3.2296E+00 |
| S9 | −2.2613E−01 | 1.6879E−01 | −4.2148E−01 | 9.2256E−01 | −1.5053E+00 |
| S10 | −1.9878E−01 | 1.0202E−01 | −1.0051E−01 | 1.6004E−01 | −2.1529E−01 |
| S11 | −9.7394E−02 | −4.1693E−02 | 4.9839E−02 | −2.5352E−03 | −3.5172E−02 |
| S12 | −9.6851E−02 | 1.9596E−02 | −1.2108E−01 | 2.8521E−01 | −3.5597E−01 |
| S13 | −1.0494E−01 | 4.7429E−02 | −1.5888E−01 | 3.1433E−01 | −3.6433E−01 |
| S14 | −5.3538E−02 | −2.6443E−03 | 3.6251E−03 | 1.8348E−02 | −1.9628E−02 |
| S15 | −2.0007E−01 | 1.5376E−01 | −7.3407E−02 | 2.8791E−02 | −8.4532E−03 |
| S16 | −1.2482E−01 | 9.6648E−02 | −5.2244E−02 | 1.9255E−02 | −4.8559E−03 |

| Surface number | A14 | A16 | A18 | A20 |
|---|---|---|---|---|
| S1 | 2.1093E−02 | −2.8886E−02 | 1.3876E−02 | −2.4257E−03 |
| S2 | −3.6415E+00 | 2.8004E+00 | −1.1967E+00 | 2.1595E−01 |
| S3 | −1.1866E+00 | 7.7385E−01 | −2.4616E−01 | 2.2018E−02 |
| S4 | −1.7810E+00 | 1.6914E+00 | −8.5050E−01 | 1.7288E−01 |
| S5 | −4.0218E+00 | 4.3988E+00 | −2.5984E+00 | 6.3955E−01 |
| S6 | −1.1023E+01 | 1.3266E+01 | −8.7791E+00 | 2.4601E+00 |
| S7 | −2.3478E+00 | 3.6338E+00 | −2.8005E+00 | 8.7237E−01 |
| S8 | 4.2787E+00 | −3.4567E+00 | 1.5711E+00 | −3.1744E−01 |
| S9 | 1.5107E+00 | −7.6934E−01 | 1.3991E−01 | 5.2139E−03 |
| S10 | 1.8170E−01 | −8.1592E−02 | 1.5557E−02 | −4.3577E−04 |
| S11 | 3.4920E−02 | −1.8774E−02 | 5.4492E−03 | −6.1459E−04 |
| S12 | 2.6263E−01 | −1.1551E−01 | 2.7884E−02 | −2.8213E−03 |
| S13 | 2.5519E−01 | −1.0773E−01 | 2.5223E−02 | −2.4955E−03 |
| S14 | 9.2916E−03 | −2.3635E−03 | 3.1279E−04 | −1.6908E−05 |
| S15 | 1.6815E−03 | −2.1153E−04 | 1.5194E−05 | −4.7595E−07 |
| S16 | 8.1725E−04 | −8.7417E−05 | 5.3659E−06 | −1.4364E−07 |

In Embodiment 9, the total effective focal length f of the optical imaging lens assembly satisfies: f=4.12 mm. The effective focal length f1 of the first lens E1 satisfies: f1=143.26 mm. The effective focal length f2 of the second lens E2 satisfies: f2=3.41 mm. The effective focal length f3 of the third lens E3 satisfies: f3=−7.40 mm. The effective focal length f4 of the fourth lens E4 satisfies: f4=12.58 mm. The effective focal length f5 of the fifth lens E5 satisfies: f5=−18.80 mm. The effective focal length f6 of the sixth lens E6 satisfies: f6=268.81 mm. The effective focal length f7 of the seventh lens E7 satisfies: f7=2.68 mm. The effective focal length f8 of the eighth lens E8 satisfies: f8=−1.91 mm. The total track length TTL (i.e., the distance on the optical axis from the center of the object-side surface S1 of the first lens E1 to the image plane S19) of the optical imaging lens assembly satisfies: TTL=5.07 mm. The half of the diagonal length ImgH of the effective pixel area on the image plane S19 of the optical imaging lens assembly satisfies: ImgH=3.41 mm.

Figures 18A, 18B:
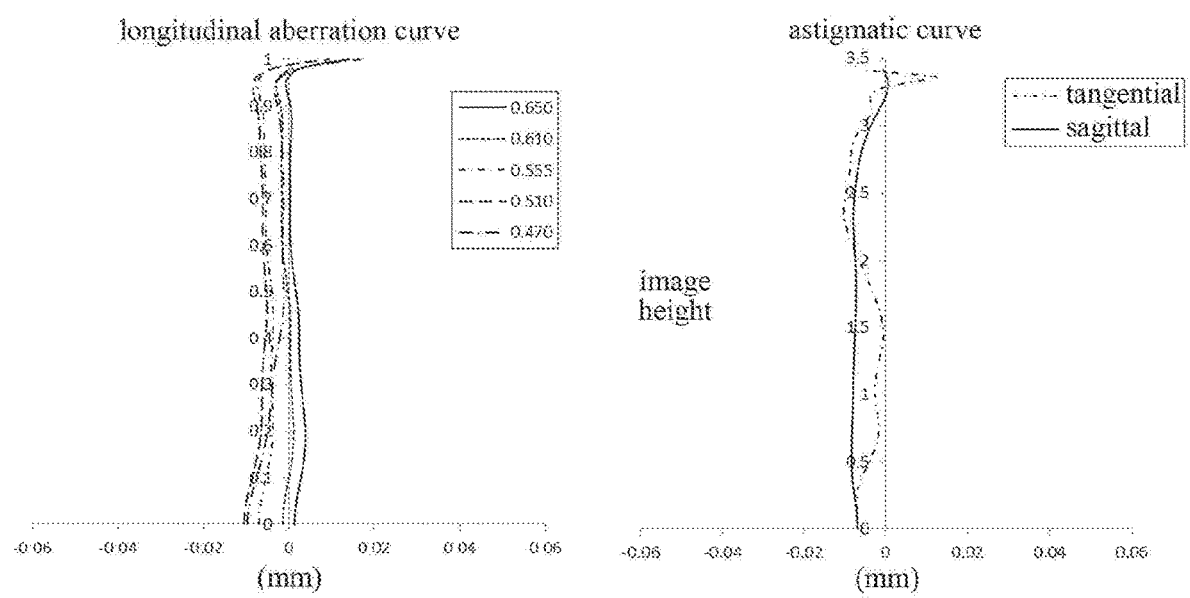
FIGS. 18A-18D respectively illustrate a longitudinal aberration curve, an astigmatic curve, a distortion curve, and a lateral color curve of the optical imaging lens assembly according to Embodiment 9.
Figures 18C, 18D:
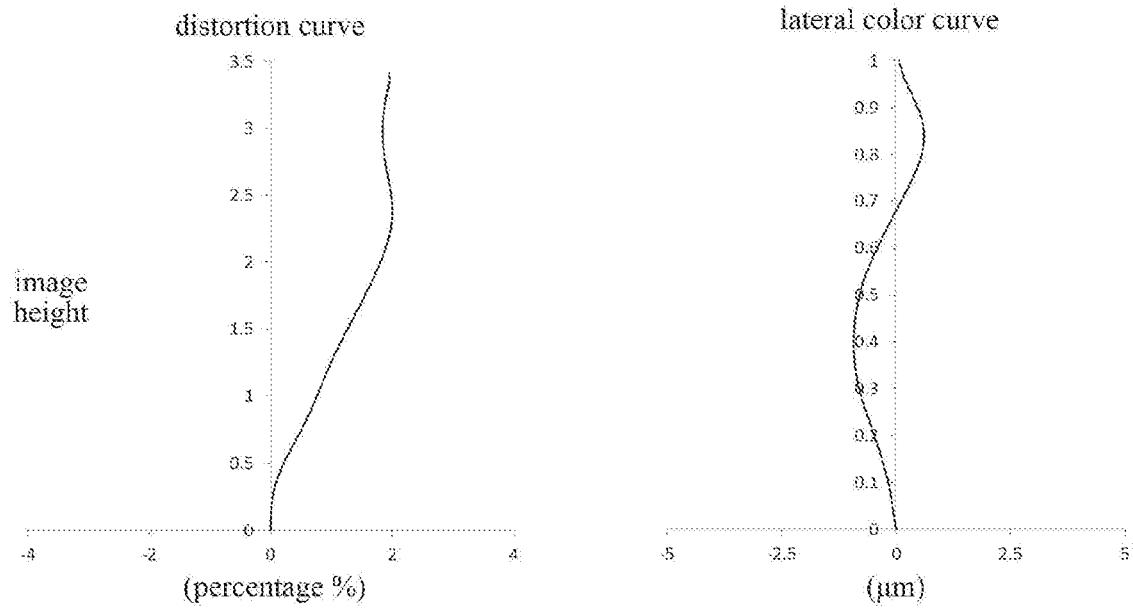

FIG. 18A illustrates the longitudinal aberration curve of the optical imaging lens assembly according to Embodiment 9, representing deviations of focal points of light of different wavelengths converged after passing through the lens assembly. FIG. 18B illustrates the astigmatic curve of the optical imaging lens assembly according to Embodiment 9, representing a curvature of the tangential image plane and a curvature of the sagittal image plane. FIG. 18C illustrates the distortion curve of the optical imaging lens assembly according to Embodiment 9, representing amounts of distortion at different viewing angles. FIG. 18D illustrates the lateral color curve of the optical imaging lens assembly according to Embodiment 9, representing deviations of different image heights on the image plane after light passes through the lens assembly. It can be seen from FIGS. 18A-18D that the optical imaging lens assembly according to Embodiment 9 can achieve a good imaging quality.

Embodiment 10

Figure 19:
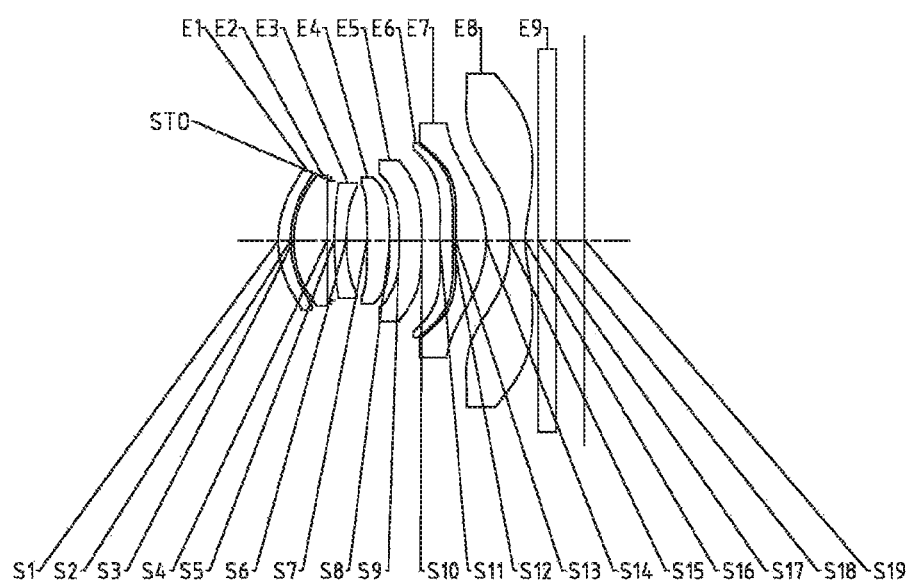
FIG. 19 is a schematic structural diagram illustrating an optical imaging lens assembly according to Embodiment 10 of the present disclosure.

An optical imaging lens assembly according to Embodiment 10 of the present disclosure is described below with reference to FIGS. 19-20D. FIG. 19 is a schematic structural diagram illustrating the optical imaging lens assembly according to Embodiment 10 of the present disclosure.

As shown in FIG. 19, the optical imaging lens assembly according to the exemplary implementations of the present disclosure includes, sequentially along an optical axis from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9, and an image plane S19.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 19 shows the surface type, the radius of curvature, the thickness, the material and the conic coefficient of each lens of the optical imaging lens assembly in Embodiment 10. The radius of curvature and the thickness are both shown in millimeters (mm).

TABLE 19

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7689 | 0.2038 | 1.55 | 64.1 | −0.0581 |
| S2 | aspheric | 1.7601 | 0.0500 | | | −0.0675 |
| S3 | aspheric | 1.7128 | 0.5602 | 1.55 | 64.1 | 0.0115 |
| S4 | aspheric | 17.6833 | 0.0656 | | | 99.0000 |
| STO | spherical | infinite | 0.0500 | | | |
| S5 | aspheric | 5.1013 | 0.2000 | 1.67 | 20.4 | 5.6790 |
| S6 | aspheric | 2.5067 | 0.3446 | | | 0.1137 |
| S7 | aspheric | −500.0000 | 0.3839 | 1.55 | 64.1 | 74.2500 |
| S8 | aspheric | −10.5326 | 0.1596 | | | 79.1909 |
| S9 | aspheric | −10.3754 | 0.3715 | 1.67 | 20.4 | −73.4435 |
| S10 | aspheric | −30.4900 | 0.3022 | | | 40.9350 |
| S11 | aspheric | 14.9963 | 0.2139 | 1.55 | 64.1 | 64.2164 |
| S12 | aspheric | 15.0111 | 0.0500 | | | −23.7754 |
| S13 | aspheric | 13.9566 | 0.5044 | 1.55 | 64.1 | −62.5966 |
| S14 | aspheric | −1.6826 | 0.3961 | | | −7.2484 |
| S15 | aspheric | −3.0476 | 0.2556 | 1.54 | 55.7 | −2.2456 |
| S16 | aspheric | 1.7386 | 0.2157 | | | −12.0585 |
| S17 | spherical | infinite | 0.3000 | 1.52 | 64.2 | |
| S18 | spherical | infinite | 0.4730 | | | |
| S19 | spherical | infinite | | | | |

As may be obtained from Table 19, in Embodiment 10, the object-side surface and the image-side surface of any lens in the first to eighth lenses E1-E8 are both aspheric surfaces. Table 20 shows the high-order coefficients applicable to each aspheric surface in Embodiment 10. The surface type of each aspheric surface may be defined by the formula (1) given in Embodiment 1.

TABLE 20

| Surface number | A4 | A6 | A8 | A10 | A12 |
|---|---|---|---|---|---|
| S1 | −7.5939E−03 | −1.5620E−03 | 4.1373E−02 | −1.2403E−01 | 2.0563E−01 |
| S2 | −3.2417E−02 | 1.7106E−02 | 2.8467E−01 | −1.1699E+00 | 2.6249E+00 |
| S3 | −3.0245E−02 | 4.0885E−02 | 5.1687E−02 | −2.9704E−01 | 6.5400E−01 |
| S4 | −6.5033E−02 | 9.7241E−02 | −7.8264E−02 | −1.9851E−01 | 8.7668E−01 |
| S5 | −1.2888E−01 | 2.3872E−01 | −1.7744E−01 | −3.5562E−01 | 1.7691E+00 |
| S6 | −7.9534E−02 | 1.7440E−01 | 4.8223E−02 | −1.2475E+00 | 4.7280E+00 |
| S7 | −7.5321E−02 | −1.3155E−02 | 1.0146E−01 | −8.2857E−01 | 2.6545E+00 |
| S8 | −1.5058E−01 | 1.0081E−01 | −2.0321E−01 | 1.1401E−01 | 1.9249E−01 |
| S9 | −2.4373E−01 | 1.5236E−01 | −1.1339E−01 | −1.0912E−01 | 5.4519E−01 |
| S10 | −1.9766E−01 | 8.5895E−02 | −6.3566E−03 | −4.1289E−02 | 4.1509E−02 |
| S11 | −7.3754E−02 | −9.3252E−02 | 1.3365E−01 | −1.0583E−01 | 6.2682E−02 |
| S12 | −9.5812E−02 | 1.3972E−02 | −1.2660E−01 | 3.1394E−01 | −3.9472E−01 |
| S13 | −1.0499E−01 | 4.8221E−02 | −1.5047E−01 | 2.8818E−01 | −3.3116E−01 |

TABLE 20-continued

| | | | | |
|---|---|---|---|---|
| S14 | −6.3157E−02 | 1.6749E−02 | −1.6581E−02 | 2.6957E−02 | −1.9063E−02 |
| S15 | −1.9954E−01 | 1.5708E−01 | −7.9219E−02 | 3.2743E−02 | −9.8968E−03 |
| S16 | −1.2520E−01 | 9.4655E−02 | −5.0480E−02 | 1.8399E−02 | −4.5929E−03 |

| Surface number | A14 | A16 | A18 | A20 |
|---|---|---|---|---|
| S1 | −2.2441E−01 | 1.4861E−01 | −5.5964E−02 | 9.1102E−03 |
| S2 | −3.6351E+00 | 3.0198E+00 | −1.3794E+00 | 2.6388E−01 |
| S3 | −8.3070E−01 | 5.8023E−01 | −1.8139E−01 | 9.0032E−03 |
| S4 | −1.5950E+00 | 1.6123E+00 | −8.5992E−01 | 1.8421E−01 |
| S5 | −3.5826E+00 | 4.1210E+00 | −2.5768E+00 | 6.7229E−01 |
| S6 | −9.9696E+00 | 1.2530E+01 | −8.6659E+00 | 2.5349E+00 |
| S7 | −5.0746E+00 | 5.8358E+00 | −3.7303E+00 | 1.0267E+00 |
| S8 | −7.0988E−01 | 9.9228E−01 | −6.4410E−01 | 1.5556E−01 |
| S9 | −1.1423E+00 | 1.3589E+00 | −8.1119E−01 | 1.8616E−01 |
| S10 | −3.7198E−02 | 3.6202E−02 | −1.9376E−02 | 3.8296E−03 |
| S11 | −3.3321E−02 | 1.3556E−02 | −3.2803E−03 | 3.4694E−04 |
| S12 | 2.9004E−01 | −1.2673E−01 | 3.0428E−02 | −3.0676E−03 |
| S13 | 2.3201E−01 | −9.8231E−02 | 2.3062E−02 | −2.2839E−03 |
| S14 | 7.6494E−03 | −1.8345E−03 | 2.4307E−04 | −1.3593E−05 |
| S15 | 1.9865E−03 | −2.4858E−04 | 1.7574E−05 | −5.3744E−07 |
| S16 | 7.6614E−04 | −8.1347E−05 | 4.9662E−06 | −1.3254E−07 |

In Embodiment 10, the total effective focal length f of the optical imaging lens assembly satisfies: f=4.21 mm. The effective focal length f1 of the first lens E1 satisfies: f1=90.38 mm. The effective focal length f2 of the second lens E2 satisfies: f2=3.43 mm. The effective focal length f3 of the third lens E3 satisfies: f3=−7.63 mm. The effective focal length f4 of the fourth lens E4 satisfies: f4=19.70 mm. The effective focal length f5 of the fifth lens E5 satisfies: f5=−23.76 mm. The effective focal length f6 of the sixth lens E6 satisfies: f6=4564.87 mm. The effective focal length f7 of the seventh lens E7 satisfies: f7=2.78 mm. The effective focal length f8 of the eighth lens E8 satisfies: f8=−2.02 mm. The total track length TTL (i.e., the distance on the optical axis from the center of the object-side surface S1 of the first lens E1 to the image plane S19) of the optical imaging lens assembly satisfies: TTL=5.10 mm. The half of the diagonal length ImgH of the effective pixel area on the image plane S19 of the optical imaging lens assembly satisfies: ImgH=3.41 mm.

Figure 20A:
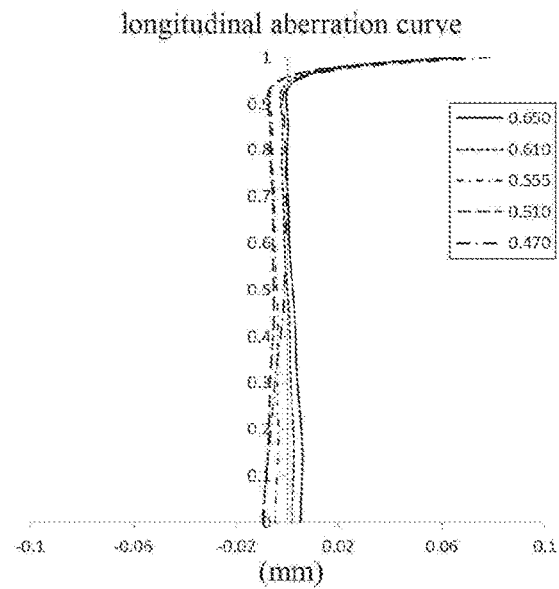
FIGS. 20A-20D respectively illustrate a longitudinal aberration curve, an astigmatic curve, a distortion curve, and a lateral color curve of the optical imaging lens assembly according to Embodiment 10.
Figure 20B:
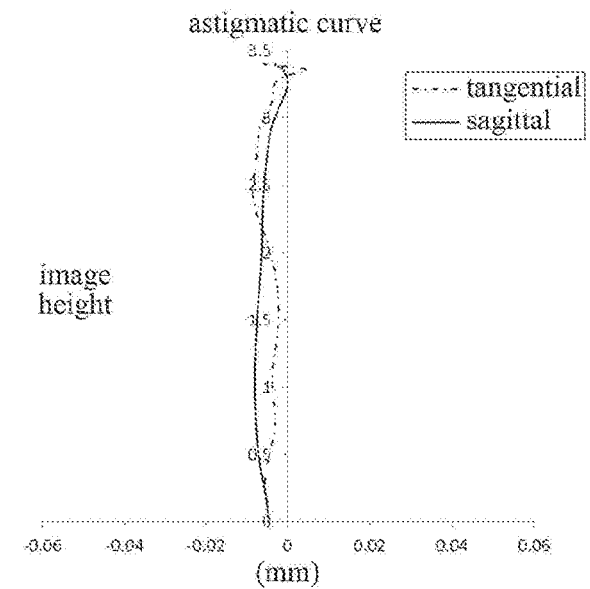
Figure 20C:
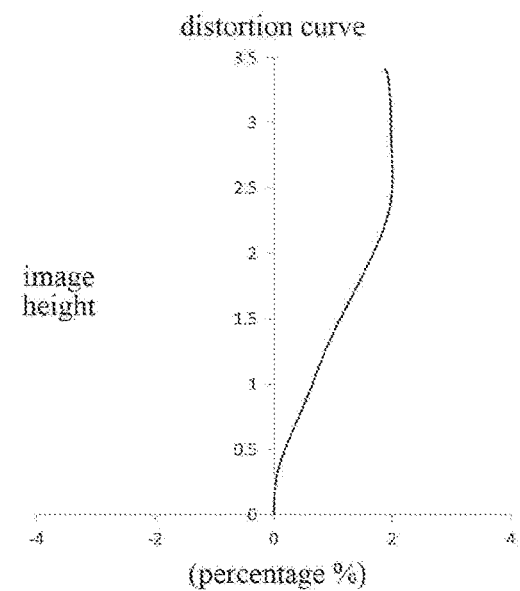
Figure 20D:
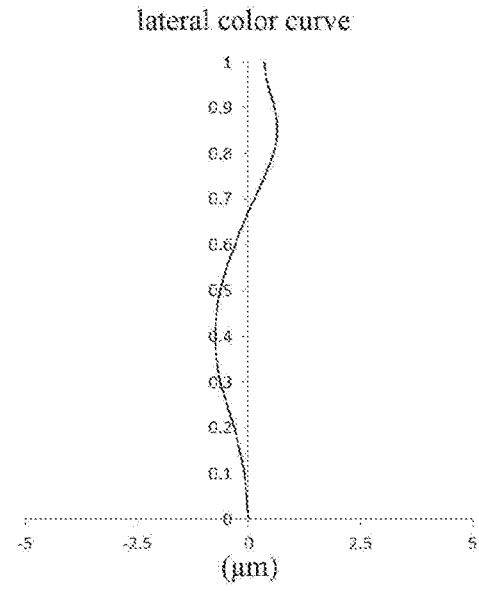

FIG. 20A illustrates the longitudinal aberration curve of the optical imaging lens assembly according to Embodiment 10, representing deviations of focal points of light of different wavelengths converged after passing through the lens assembly. FIG. 20B illustrates the astigmatic curve of the optical imaging lens assembly according to Embodiment 10, representing a curvature of the tangential image plane and a curvature of the sagittal image plane. FIG. 20C illustrates the distortion curve of the optical imaging lens assembly according to Embodiment 10, representing amounts of distortion at different viewing angles. FIG. 20D illustrates the lateral color curve of the optical imaging lens assembly according to Embodiment 10, representing deviations of different image heights on the image plane after light passes through the lens assembly. It can be seen from FIGS. 20A-20D that the optical imaging lens assembly according to Embodiment 10 can achieve a good imaging quality.

Embodiment 11

Figure 21:
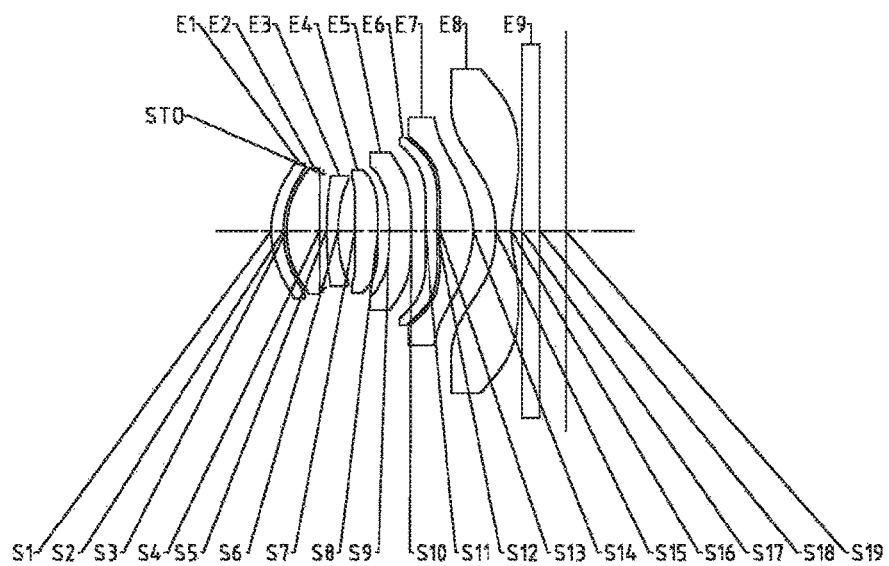
FIG. 21 is a schematic structural diagram illustrating an optical imaging lens assembly according to Embodiment 11 of the present disclosure.

An optical imaging lens assembly according to Embodiment 11 of the present disclosure is described below with reference to FIGS. 21-22D. FIG. 21 is a schematic structural diagram illustrating the optical imaging lens assembly according to Embodiment 11 of the present disclosure.

As shown in FIG. 21, the optical imaging lens assembly according to the exemplary implementations of the present disclosure includes, sequentially along an optical axis from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9, and an image plane S19.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a negative refractive power, an object-side surface S11 of the sixth lens E6 is a convex surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 21 shows the surface type, the radius of curvature, the thickness, the material and the conic coefficient of each lens of the optical imaging lens assembly in Embodiment 11. The radius of curvature and the thickness are both shown in millimeters (mm).

TABLE 21

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7594 | 0.2077 | 1.55 | 64.1 | −0.0793 |
| S2 | aspheric | 1.7336 | 0.0527 | | | −0.0550 |
| S3 | aspheric | 1.6890 | 0.5610 | 1.55 | 64.1 | 0.0196 |
| S4 | aspheric | 16.1595 | 0.0666 | | | 90.3198 |
| STO | spherical | infinite | 0.0500 | | | |
| S5 | aspheric | 4.9357 | 0.2000 | 1.67 | 20.4 | 5.5720 |
| S6 | aspheric | 2.4549 | 0.2869 | | | 0.0630 |
| S7 | aspheric | 17.5367 | 0.3912 | 1.55 | 64.1 | 99.0000 |
| S8 | aspheric | −12.9680 | 0.1952 | | | 86.3201 |
| S9 | aspheric | −10.0411 | 0.3739 | 1.67 | 20.4 | −99.0000 |
| S10 | aspheric | 500.0000 | 0.2393 | | | 99.0000 |
| S11 | aspheric | 11.2142 | 0.2096 | 1.55 | 64.1 | −99.0000 |
| S12 | aspheric | 11.0721 | 0.0500 | | | 19.2592 |
| S13 | aspheric | 10.4637 | 0.5658 | 1.55 | 64.1 | 7.3877 |
| S14 | aspheric | −1.6744 | 0.3813 | | | −6.7291 |
| S15 | aspheric | −2.8245 | 0.2665 | 1.54 | 55.7 | −2.2983 |
| S16 | aspheric | 1.7625 | 0.1854 | | | −12.0649 |
| S17 | spherical | infinite | 0.3000 | 1.52 | 64.2 | |
| S18 | spherical | infinite | 0.4402 | | | |
| S19 | spherical | infinite | | | | |

As may be obtained from Table 21, in Embodiment 11, the object-side surface and the image-side surface of any lens in the first to eighth lenses E1-E8 are both aspheric surfaces. Table 22 shows the high-order coefficients applicable to each aspheric surface in Embodiment 11. The surface type of each aspheric surface may be defined by the formula (1) given in Embodiment 1.

In Embodiment 11, the total effective focal length f of the optical imaging lens assembly satisfies: f=4.10 mm. The effective focal length f1 of the first lens E1 satisfies: f1=117.69 mm. The effective focal length f2 of the second lens E2 satisfies: f2=3.41 mm. The effective focal length f3 of the third lens E3 satisfies: f3=−7.57 mm. The effective focal length f4 of the fourth lens E4 satisfies: f4=13.72 mm.

TABLE 22

| surface number | A4 | A6 | A8 | A10 | A12 |
|---|---|---|---|---|---|
| S1 | −7.7994E−03 | −6.9172E−03 | 5.8674E−02 | −1.5310E−01 | 2.2235E−01 |
| S2 | −2.9490E−02 | −1.5191E−02 | 4.5414E−01 | −1.6530E+00 | 3.4466E+00 |
| S3 | −2.7659E−02 | 1.5065E−02 | 1.8825E−01 | −6.8538E−01 | 1.3009E+00 |
| S4 | −6.9048E−02 | 1.0908E−01 | −1.2607E−01 | −4.0372E−02 | 4.9584E−01 |
| S5 | −1.3496E−01 | 2.6276E−01 | −2.2339E−01 | −3.2235E−01 | 1.8962E+00 |
| S6 | −8.6471E−02 | 2.0053E−01 | −1.5688E−02 | −1.0861E+00 | 4.3743E+00 |
| S7 | −7.6081E−02 | 1.7673E−02 | −3.1945E−02 | −4.9226E−01 | 2.2271E+00 |
| S8 | −1.3355E−01 | 1.1681E−01 | −4.6434E−01 | 1.1589E+00 | −2.3435E+00 |
| S9 | −2.3853E−01 | 1.9566E−01 | −3.5566E−01 | 6.0689E−01 | −8.3689E−01 |
| S10 | −2.2003E−01 | 1.3468E−01 | −1.1397E−01 | 1.4833E−01 | −1.8969E−01 |
| S11 | −8.7259E−02 | −6.6469E−02 | 6.7134E−02 | 2.4686E−02 | −8.3335E−02 |
| S12 | −9.5884E−02 | 1.5377E−02 | −1.4772E−01 | 3.6202E−01 | −4.5407E−01 |
| S13 | −1.0805E−01 | 4.9954E−02 | −1.5333E−01 | 2.9680E−01 | −3.4658E−01 |
| S14 | −6.0352E−02 | 9.6833E−03 | −9.8298E−03 | 3.0086E−02 | −2.6517E−02 |
| S15 | −2.0133E−01 | 1.5698E−01 | −7.6891E−02 | 3.0850E−02 | −9.1703E−03 |
| S16 | −1.2388E−01 | 9.5690E−02 | −5.2141E−02 | 1.9385E−02 | −4.9238E−03 |

| surface number | A14 | A16 | A18 | A20 |
|---|---|---|---|---|
| S1 | −2.1219E−01 | 1.2495E−01 | −4.2623E−02 | 6.4211E−03 |
| S2 | −4.5059E+00 | 3.5886E+00 | −1.5881E+00 | 2.9634E−01 |
| S3 | −1.4791E+00 | 9.5764E−01 | −2.9201E−01 | 1.9193E−02 |
| S4 | −1.0017E+00 | 1.0533E+00 | −5.7190E−01 | 1.2192E−01 |
| S5 | −4.0980E+00 | 4.9666E+00 | −3.2547E+00 | 8.8833E−01 |
| S6 | −9.4338E+00 | 1.2045E+01 | −8.4393E+00 | 2.4957E+00 |
| S7 | −4.9976E+00 | 6.3008E+00 | −4.2427E+00 | 1.1938E+00 |
| S8 | 3.1367E+00 | −2.5477E+00 | 1.1649E+00 | −2.4052E−01 |
| S9 | 5.4232E−01 | 1.3443E−01 | −3.2325E−01 | 1.0243E−01 |
| S10 | 1.3840E−01 | −3.8164E−02 | −4.5352E−03 | 2.9599E−03 |
| S11 | 5.7093E−02 | −1.6818E−02 | 1.5599E−03 | 1.3088E−04 |
| S12 | 3.3478E−01 | −1.4741E−01 | 3.5783E−02 | −3.6565E−03 |
| S13 | 2.4639E−01 | −1.0555E−01 | 2.5009E−02 | −2.4957E−03 |
| S14 | 1.1947E−02 | −3.0195E−03 | 4.0608E−04 | −2.2610E−05 |
| S15 | 1.8308E−03 | −2.2967E−04 | 1.6374E−05 | −5.0745E−07 |
| S16 | 8.3353E−04 | −8.9652E−05 | 5.5361E−06 | −1.4919E−07 |

The effective focal length f5 of the fifth lens E5 satisfies: f5=−14.76 mm. The effective focal length f6 of the sixth lens E6 satisfies: f6=−3340.96 mm. The effective focal length f7 of the seventh lens E7 satisfies: f7=2.69 mm. The effective focal length f8 of the eighth lens E8 satisfies: f8=−1.98 mm. The total track length TTL (i.e., the distance on the optical axis from the center of the object-side surface S1 of the first lens E1 to the image plane S19) of the optical imaging lens assembly satisfies: TTL=5.02 mm. The half of the diagonal length ImgH of the effective pixel area on the image plane S19 of the optical imaging lens assembly satisfies: ImgH=3.41 mm.

Figures 22A, 22B:
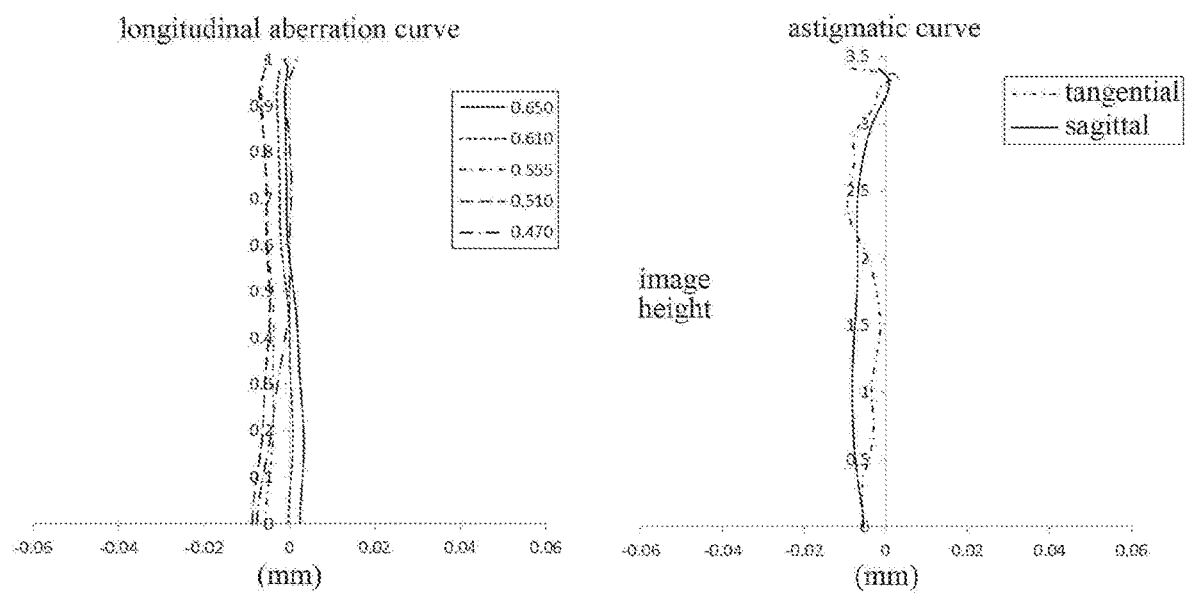
FIGS. 22A-22D respectively illustrate a longitudinal aberration curve, an astigmatic curve, a distortion curve, and a lateral color curve of the optical imaging lens assembly according to Embodiment 11.
Figures 22C, 22D:
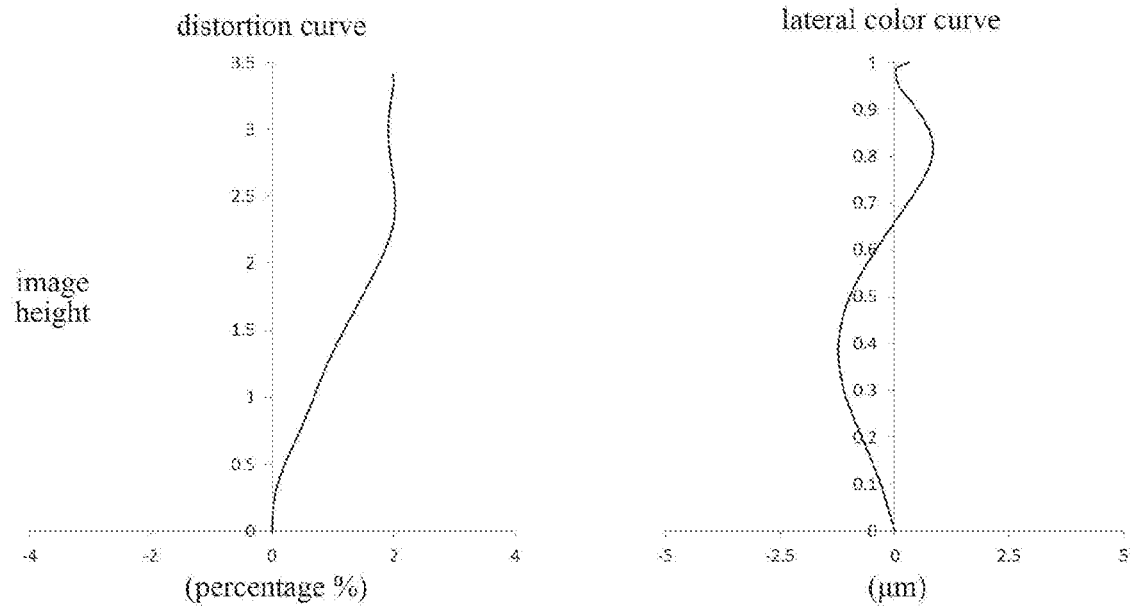

FIG. 22A illustrates the longitudinal aberration curve of the optical imaging lens assembly according to Embodiment 11, representing deviations of focal points of light of different wavelengths converged after passing through the lens assembly. FIG. 22B illustrates the astigmatic curve of the optical imaging lens assembly according to Embodiment 11, representing a curvature of the tangential image plane and a curvature of the sagittal image plane. FIG. 22C illustrates the distortion curve of the optical imaging lens assembly according to Embodiment 11, representing amounts of distortion at different viewing angles. FIG. 22D illustrates the lateral color curve of the optical imaging lens assembly according to Embodiment 11, representing deviations of different image heights on the image plane after light passes through the lens assembly. It can be seen from FIGS. 22A-22D that the optical imaging lens assembly according to Embodiment 11 can achieve a good imaging quality.

Embodiment 12

Figure 23:
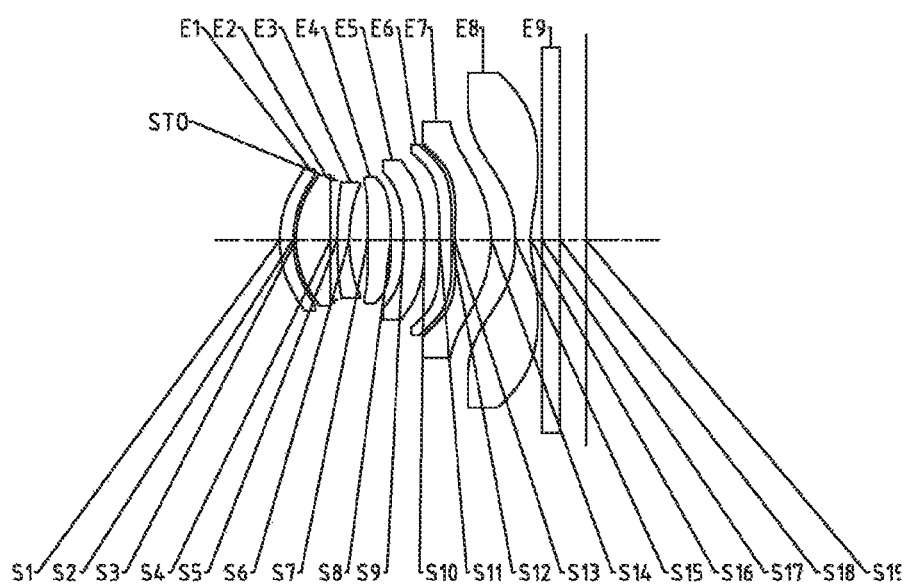
FIG. 23 is a schematic structural diagram illustrating an optical imaging lens assembly according to Embodiment 12 of the present disclosure.

An optical imaging lens assembly according to Embodiment 12 of the present disclosure is described below with reference to FIGS. 23-24D. FIG. 23 is a schematic structural diagram illustrating the optical imaging lens assembly according to Embodiment 12 of the present disclosure.

As shown in FIG. 23, the optical imaging lens assembly according to the exemplary implementations of the present disclosure includes, sequentially along an optical axis from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9, and an image plane S19.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 23 shows the surface type, the radius of curvature, the thickness, the material and the conic coefficient of each lens of the optical imaging lens assembly in Embodiment 12. The radius of curvature and the thickness are both shown in millimeters (mm).

TABLE 23

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 1.7793 | 0.2244 | 1.55 | 64.1 | −0.0604 |
| S2 | aspheric | 1.7371 | 0.0500 | | | −0.0665 |
| S3 | aspheric | 1.6984 | 0.5721 | 1.55 | 64.1 | 0.0191 |
| S4 | aspheric | 21.3959 | 0.0642 | | | 98.7495 |
| STO | spherical | infinite | 0.0500 | | | |
| S5 | aspheric | 5.7021 | 0.2000 | 1.67 | 20.4 | 8.0219 |
| S6 | aspheric | 2.5662 | 0.3054 | | | 0.1035 |
| S7 | aspheric | 18.9991 | 0.3873 | 1.55 | 64.1 | 70.1254 |
| S8 | aspheric | −10.8082 | 0.2112 | | | 74.3551 |
| S9 | aspheric | −6.8633 | 0.3417 | 1.67 | 20.4 | −87.8758 |
| S10 | aspheric | −13.6114 | 0.2565 | | | −94.7243 |
| S11 | aspheric | −500.0000 | 0.2000 | 1.55 | 64.1 | 99.0000 |
| S12 | aspheric | 23.4649 | 0.0500 | | | 99.0000 |
| S13 | aspheric | 9.2040 | 0.6101 | 1.55 | 64.1 | −75.0119 |
| S14 | aspheric | −1.8288 | 0.3967 | | | −7.2838 |
| S15 | aspheric | −2.8381 | 0.2592 | 1.54 | 55.7 | −2.2222 |
| S16 | aspheric | 1.8494 | 0.1857 | | | −12.5334 |
| S17 | spherical | infinite | 0.3000 | 1.52 | 64.2 | |
| S18 | spherical | infinite | 0.4356 | | | |
| S19 | spherical | infinite | | | | |

As may be obtained from Table 23, in Embodiment 12, the object-side surface and the image-side surface of any lens in the first to eighth lenses E1-E8 are both aspheric surfaces. Table 24 shows the high-order coefficients applicable to each aspheric surface in Embodiment 12. The surface type of each aspheric surface may be defined by the formula (1) given in Embodiment 1.

TABLE 24

| surface number | A4 | A6 | A8 | A10 | A12 |
|---|---|---|---|---|---|
| S1 | −7.3297E−03 | −5.1919E−03 | 3.7373E−02 | −8.5491E−02 | 1.0807E−01 |
| S2 | −2.8331E−02 | −1.2888E−04 | 3.0141E−01 | −1.0920E+00 | 2.2942E+00 |
| S3 | −2.6126E−02 | 2.2198E−02 | 1.0825E−01 | −4.1286E−01 | 8.2650E−01 |
| S4 | −5.6455E−02 | 8.2575E−02 | −3.9511E−02 | −2.7835E−01 | 9.6512E−01 |
| S5 | −1.2074E−01 | 2.3127E−01 | −1.7132E−01 | −3.6986E−01 | 1.7409E+00 |
| S6 | −7.8980E−02 | 1.8633E−01 | −6.0054E−02 | −7.1492E−01 | 3.0265E+00 |
| S7 | −7.9087E−02 | 4.2650E−02 | −3.0161E−01 | 8.7400E−01 | −1.8010E+00 |
| S8 | −1.1791E−01 | 6.1124E−02 | −2.6166E−01 | 4.5370E−01 | −5.2320E−01 |
| S9 | −2.3086E−01 | 1.3372E−01 | −1.7440E−01 | 1.6117E−01 | −4.3107E−02 |
| S10 | −1.9140E−01 | 6.6853E−02 | 1.9703E−02 | −1.1833E−01 | 2.0180E−01 |
| S11 | −7.7124E−02 | −6.9030E−02 | 1.1975E−01 | −1.3143E−01 | 8.2010E−02 |
| S12 | −1.0412E−01 | 1.7874E−02 | −9.3696E−02 | 2.5261E−01 | −3.5260E−01 |
| S13 | −9.9714E−02 | 4.0385E−02 | −1.7030E−01 | 3.4781E−01 | −3.9642E−01 |
| S14 | −3.7073E−02 | −1.1660E−02 | −1.4712E−02 | 4.3820E−02 | −3.5183E−02 |
| S15 | −1.8130E−01 | 1.3044E−01 | −5.9857E−02 | 2.3615E−02 | −7.0257E−03 |
| S16 | −1.1911E−01 | 8.9871E−02 | −4.7710E−02 | 1.7295E−02 | −4.2878E−03 |

| surface number | A14 | A16 | A18 | A20 |
|---|---|---|---|---|
| S1 | −9.3605E−02 | 5.0296E−02 | −1.6240E−02 | 2.4039E−03 |
| S2 | −3.0556E+00 | 2.4777E+00 | −1.1157E+00 | 2.1169E−01 |
| S3 | −1.0248E+00 | 7.4321E−01 | −2.7291E−01 | 3.3310E−02 |
| S4 | −1.6143E+00 | 1.5509E+00 | −8.0102E−01 | 1.6893E−01 |
| S5 | −3.4085E+00 | 3.8118E+00 | −2.3279E+00 | 5.9646E−01 |
| S6 | −6.5842E+00 | 8.4936E+00 | −6.0398E+00 | 1.8247E+00 |
| S7 | 2.2536E+00 | −1.4966E+00 | 3.2482E−01 | 8.4217E−02 |
| S8 | 2.2602E−01 | 2.2173E−01 | −2.9816E−01 | 9.4233E−02 |
| S9 | −2.1076E−01 | 4.3407E−01 | −3.2952E−01 | 8.6742E−02 |
| S10 | −1.9912E−01 | 1.2266E−01 | −4.4221E−02 | 7.0160E−03 |
| S11 | −8.7063E−03 | −2.1728E−02 | 1.1801E−02 | −1.8284E−03 |
| S12 | 2.8369E−01 | −1.3352E−01 | 3.3996E−02 | −3.5888E−03 |
| S13 | 2.6982E−01 | −1.1045E−01 | 2.5132E−02 | −2.4264E−03 |
| S14 | 1.4849E−02 | −3.5503E−03 | 4.5276E−04 | −2.3915E−05 |
| S15 | 1.3974E−03 | −1.7333E−04 | 1.2148E−05 | −3.6857E−07 |
| S16 | 7.0867E−04 | −7.4338E−05 | 4.4670E−06 | −1.1687E−07 |

In Embodiment 12, the total effective focal length f of the optical imaging lens assembly satisfies: f=4.20 mm. The effective focal length f1 of the first lens E1 satisfies: f1=152.71 mm. The effective focal length f2 of the second lens E2 satisfies: f2=3.35 mm. The effective focal length f3 of the third lens E3 satisfies: f3=−7.18 mm. The effective focal length f4 of the fourth lens E4 satisfies: f4=12.68 mm. The effective focal length f5 of the fifth lens E5 satisfies: f5=−21.19 mm. The effective focal length f6 of the sixth lens E6 satisfies: f6=−41.05 mm. The effective focal length f7 of the seventh lens E7 satisfies: f7=2.85 mm. The effective focal length f8 of the eighth lens E8 satisfies: f8=−2.05 mm. The total track length TTL (i.e., the distance on the optical axis from the center of the object-side surface S1 of the first lens E1 to the image plane S19) of the optical imaging lens assembly satisfies: TTL=5.10 mm. The half of the diagonal length ImgH of the effective pixel area on the image plane S19 of the optical imaging lens assembly satisfies: ImgH=3.41 mm.

Figure 24A:
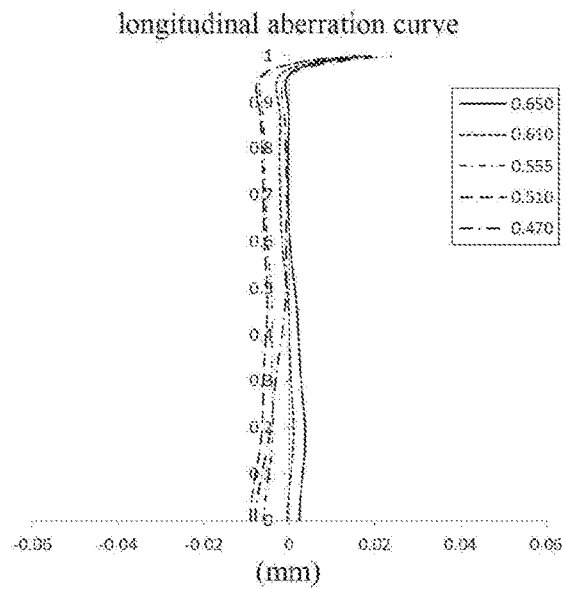
FIGS. 24A-24D respectively illustrate a longitudinal aberration curve, an astigmatic curve, a distortion curve, and a lateral color curve of the optical imaging lens assembly according to Embodiment 12.
Figure 24B:
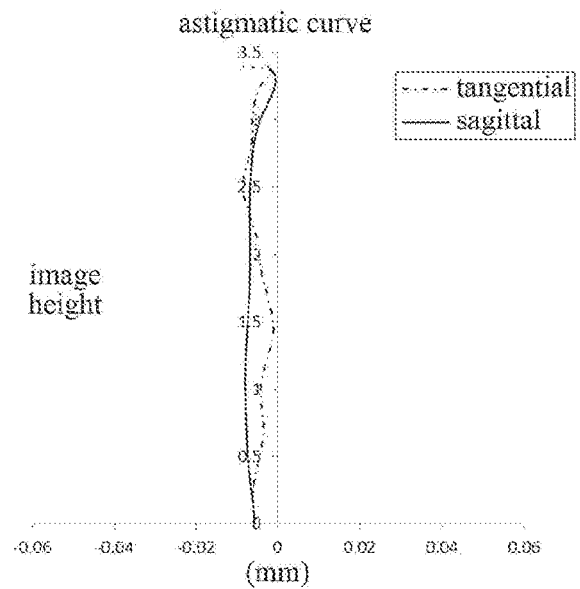
Figure 24C:
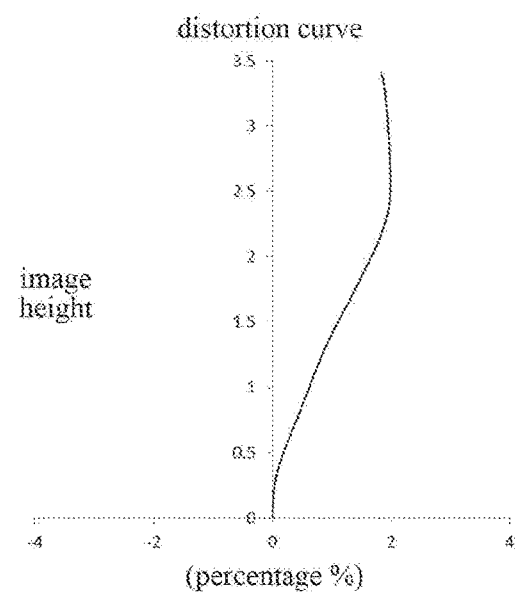
Figure 24D:
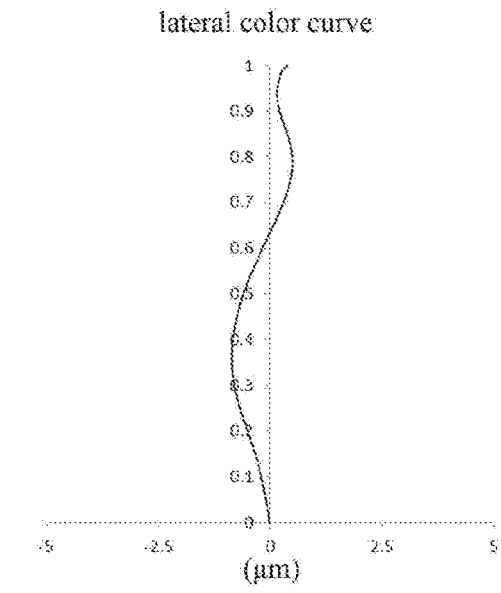

FIG. 24A illustrates the longitudinal aberration curve of the optical imaging lens assembly according to Embodiment 12, representing deviations of focal points of light of different wavelengths converged after passing through the lens assembly. FIG. 24B illustrates the astigmatic curve of the optical imaging lens assembly according to Embodiment 12, representing a curvature of the tangential image plane and a curvature of the sagittal image plane. FIG. 24C illustrates the distortion curve of the optical imaging lens assembly according to Embodiment 12, representing amounts of distortion at different viewing angles. FIG. 24D illustrates the lateral color curve of the optical imaging lens assembly according to Embodiment 12, representing deviations of different image heights on the image plane after light passes through the lens assembly. It can be seen from FIGS. 24A-24D that the optical imaging lens assembly according to Embodiment 12 can achieve a good imaging quality.

Embodiment 13

Figure 25:
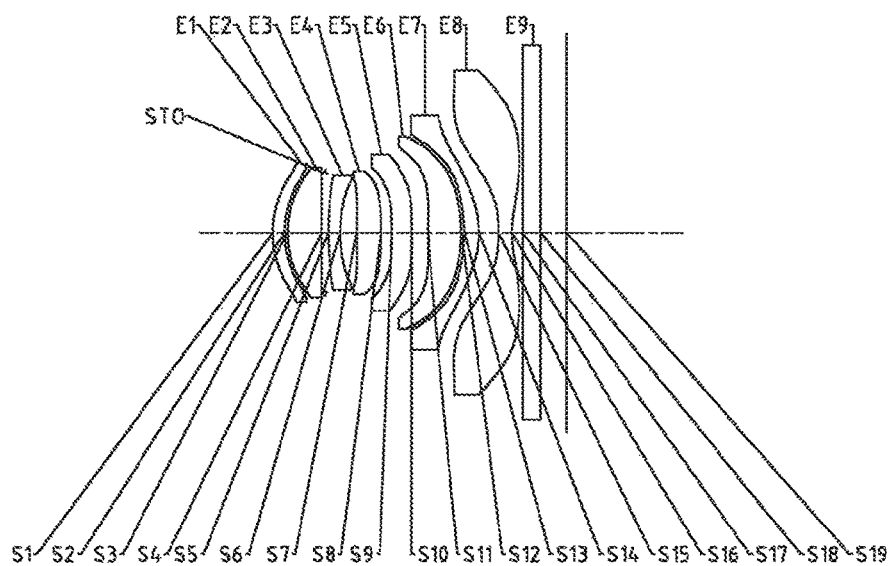
FIG. 25 is a schematic structural diagram illustrating an optical imaging lens assembly according to Embodiment 13 of the present disclosure.

An optical imaging lens assembly according to Embodiment 13 of the present disclosure is described below with reference to FIGS. 25-26D. FIG. 25 is a schematic structural diagram illustrating the optical imaging lens assembly according to Embodiment 13 of the present disclosure.

As shown in FIG. 25, the optical imaging lens assembly according to the exemplary implementations of the present disclosure includes, sequentially along an optical axis from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9, and an image plane S19.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 25 shows the surface type, the radius of curvature, the thickness, the material and the conic coefficient of each lens of the optical imaging lens assembly in Embodiment 13. The radius of curvature and the thickness are both shown in millimeters (mm).

TABLE 25

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7660 | 0.2000 | 1.55 | 64.1 | −0.0802 |
| S2 | aspheric | 1.7604 | 0.0500 | | | −0.0533 |
| S3 | aspheric | 1.7208 | 0.5756 | 1.55 | 64.1 | 0.0168 |
| S4 | aspheric | 17.0557 | 0.0660 | | | 99.0000 |
| STO | spherical | infinite | 0.0500 | | | |
| S5 | aspheric | 4.9844 | 0.2000 | 1.67 | 20.4 | 5.2332 |
| S6 | aspheric | 2.4475 | 0.2789 | | | −0.0023 |
| S7 | aspheric | 15.6257 | 0.4106 | 1.55 | 64.1 | 97.0576 |
| S8 | aspheric | −11.7193 | 0.1881 | | | 93.9649 |
| S9 | aspheric | −9.1787 | 0.3360 | 1.67 | 20.4 | −76.2268 |
| S10 | aspheric | −42.5394 | 0.2695 | | | −99.0000 |
| S11 | aspheric | 19.2499 | 0.5794 | 1.55 | 64.1 | 96.8726 |
| S12 | aspheric | −1.4654 | 0.0500 | | | −52.7824 |
| S13 | aspheric | −1.4745 | 0.2466 | 1.55 | 64.1 | −55.8347 |
| S14 | aspheric | −1.5687 | 0.3348 | | | −8.0901 |
| S15 | aspheric | −2.7556 | 0.2189 | 1.54 | 55.7 | −2.3108 |
| S16 | aspheric | 1.6954 | 0.1887 | | | −11.2703 |
| S17 | spherical | infinite | 0.3000 | 1.52 | 64.2 | |
| S18 | spherical | infinite | 0.4392 | | | |
| S19 | spherical | infinite | | | | |

As may be obtained from Table 25, in Embodiment 13, the object-side surface and the image-side surface of any lens in the first to eighth lenses E1-E8 are both aspheric surfaces. Table 26 shows the high-order coefficients applicable to each aspheric surface in Embodiment 13. The surface type of each aspheric surface may be defined by the formula (1) given in Embodiment 1.

TABLE 26

| surface number | A4 | A6 | A8 | A10 | A12 |
|---|---|---|---|---|---|
| S1 | −7.8066E−03 | −2.1141E−03 | 3.8393E−03 | 3.9466E−02 | −1.4528E−01 |
| S2 | −1.8846E−02 | −6.4153E−02 | 5.2431E−01 | −1.5906E+00 | 2.9727E+00 |
| S3 | −1.7190E−02 | −3.3964E−02 | 3.0989E−01 | −8.8850E−01 | 1.5087E+00 |
| S4 | −6.5180E−02 | 9.0823E−02 | −1.7484E−02 | −4.9064E−01 | 1.6186E+00 |
| S5 | −1.3572E−01 | 2.6759E−01 | −2.5101E−01 | −1.5691E−01 | 1.2542E+00 |
| S6 | −8.8746E−02 | 1.9469E−01 | 6.7277E−02 | −1.4426E+00 | 5.2625E+00 |
| S7 | −7.8660E−02 | 2.1889E−02 | −4.7431E−02 | −5.9082E−01 | 3.0567E+00 |
| S8 | −1.3610E−01 | 1.0760E−01 | −3.8940E−01 | 8.6331E−01 | −1.7062E+00 |
| S9 | −2.4126E−01 | 8.4816E−02 | 3.1965E−01 | −1.4786E+00 | 3.0586E+00 |
| S10 | −2.1168E−01 | −4.9052E−03 | 4.3931E−01 | −1.0187E+00 | 1.3207E+00 |
| S11 | −1.8942E−02 | −4.6406E−01 | 1.2132E+00 | −1.9691E+00 | 2.0923E+00 |
| S12 | −1.0400E−01 | 3.7560E−02 | −1.4959E−01 | 3.0494E−01 | −3.5710E−01 |
| S13 | −9.0431E−02 | 2.9727E−02 | −1.1886E−01 | 2.4994E−01 | −2.9213E−01 |

TABLE 26-continued

| | | | | | |
|---|---|---|---|---|---|
| S14 | −5.8301E−02 | −1.5441E−02 | 5.8846E−02 | −4.2640E−02 | 1.2853E−02 |
| S15 | −2.0666E−01 | 1.6364E−01 | −8.1402E−02 | 3.3148E−02 | −9.9896E−03 |
| S16 | −1.3304E−01 | 1.0446E−01 | −5.7432E−02 | 2.1440E−02 | −5.4704E−03 |

| surface number | A14 | A16 | A18 | A20 |
|---|---|---|---|---|
| S1 | 2.1341E−01 | −1.6814E−01 | 6.6833E−02 | −1.0628E−02 |
| S2 | −3.5705E+00 | 2.6682E+00 | −1.1342E+00 | 2.0724E−01 |
| S3 | −1.5901E+00 | 9.9271E−01 | −3.1757E−01 | 3.2643E−02 |
| S4 | −2.6922E+00 | 2.5626E+00 | −1.3088E+00 | 2.7453E−01 |
| S5 | −2.6091E+00 | 2.9538E+00 | −1.7983E+00 | 4.5429E−01 |
| S6 | −1.0738E+01 | 1.3061E+01 | −8.7431E+00 | 2.4759E+00 |
| S7 | −7.3962E+00 | 9.8095E+00 | −6.8579E+00 | 1.9826E+00 |
| S8 | 2.3568E+00 | −2.0052E+00 | 9.6870E−01 | −2.1404E−01 |
| S9 | −4.0058E+00 | 3.3994E+00 | −1.6468E+00 | 3.3433E−01 |
| S10 | −1.1002E+00 | 5.9349E−01 | −1.8830E−01 | 2.6286E−02 |
| S11 | −1.4507E+00 | 6.2555E−01 | −1.5145E−01 | 1.5708E−02 |
| S12 | 2.5612E−01 | −1.1136E−01 | 2.6779E−02 | −2.7073E−03 |
| S13 | 2.0153E−01 | −8.2787E−02 | 1.8745E−02 | −1.7897E−03 |
| S14 | −3.8281E−04 | −7.0719E−04 | 1.5954E−04 | −1.0923E−05 |
| S15 | 2.0202E−03 | −2.5654E−04 | 1.8499E−05 | −5.7924E−07 |
| S16 | 9.3400E−04 | −1.0186E−04 | 6.4100E−06 | −1.7677E−07 |

In Embodiment 13, the total effective focal length f of the optical imaging lens assembly satisfies: f=4.04 mm. The effective focal length f1 of the first lens E1 satisfies: f1=87.52 mm. The effective focal length f2 of the second lens E2 satisfies: f2=3.46 mm. The effective focal length f3 of the third lens E3 satisfies: f3=−7.45 mm. The effective focal length f4 of the fourth lens E4 satisfies: f4=12.33 mm. The effective focal length f5 of the fifth lens E5 satisfies: f5=−17.62 mm. The effective focal length f6 of the sixth lens E6 satisfies: f6=2.52 mm. The effective focal length f7 of the seventh lens E7 satisfies: f7=−599.99 mm. The effective focal length f8 of the eighth lens E8 satisfies: f8=−1.92 mm. The total track length TTL (i.e., the distance on the optical axis from the center of the object-side surface S1 of the first lens E1 to the image plane S19) of the optical imaging lens assembly satisfies: TTL=4.98 mm. The half of the diagonal length ImgH of the effective pixel area on the image plane S19 of the optical imaging lens assembly satisfies: ImgH=3.41 mm.

Figures 26A, 26B:
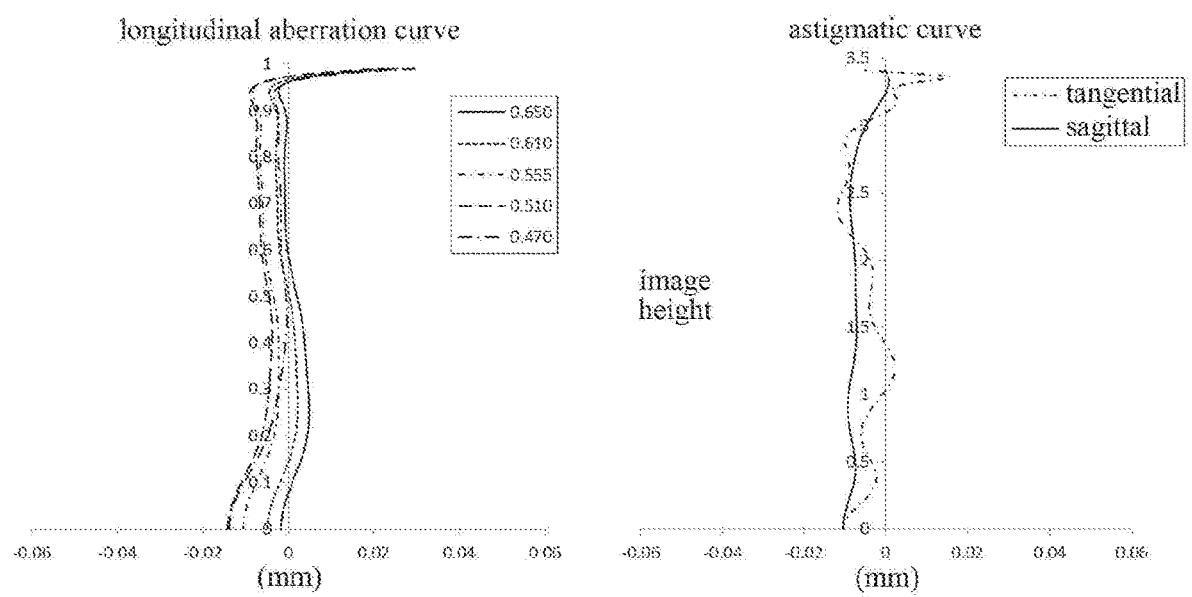
FIGS. 26A-26D respectively illustrate a longitudinal aberration curve, an astigmatic curve, a distortion curve, and a lateral color curve of the optical imaging lens assembly according to Embodiment 13.
Figure 26C:
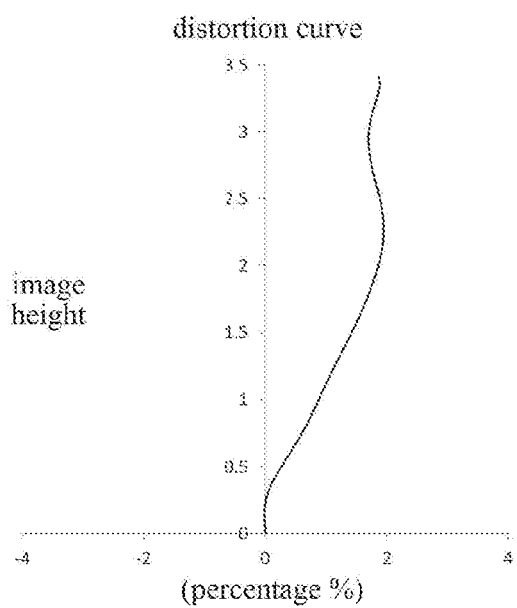
Figure 26D:
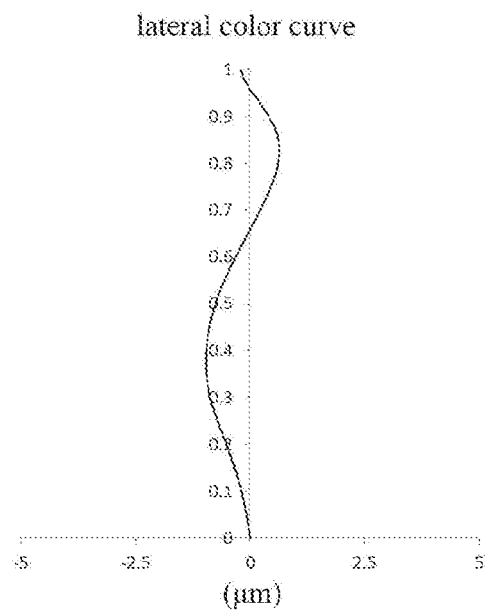

FIG. 26A illustrates the longitudinal aberration curve of the optical imaging lens assembly according to Embodiment 13, representing deviations of focal points of light of different wavelengths converged after passing through the lens assembly. FIG. 26B illustrates the astigmatic curve of the optical imaging lens assembly according to Embodiment 13, representing a curvature of the tangential image plane and a curvature of the sagittal image plane. FIG. 26C illustrates the distortion curve of the optical imaging lens assembly according to Embodiment 13, representing amounts of distortion at different viewing angles. FIG. 26D illustrates the lateral color curve of the optical imaging lens assembly according to Embodiment 13, representing deviations of different image heights on the image plane after light passes through the lens assembly. It can be seen from FIGS. 26A-26D that the optical imaging lens assembly according to Embodiment 13 can achieve a good imaging quality.

To sum up, Embodiments 1-13 respectively satisfy the relationships shown in Table 27 below.

TABLE 27

| | Embodiment | | | | | | |
|---|---|---|---|---|---|---|---|
| Conditional expression | 1 | 2 | 3 | 4 | 5 | 6 | 7 |
| f/EPD | 1.80 | 1.67 | 1.75 | 1.80 | 1.80 | 1.80 | 1.80 |
| TTL/ImgH | 1.44 | 1.50 | 1.50 | 1.49 | 1.46 | 1.49 | 1.50 |
| \|f/f1\| + \|f/f2\| | 1.21 | 1.18 | 1.19 | 1.22 | 1.21 | 1.24 | 1.28 |
| f/f2 | 1.17 | 1.16 | 1.17 | 1.15 | 1.20 | 1.24 | 1.26 |
| f/R16 | 2.40 | 1.72 | 1.73 | 2.39 | 2.44 | 2.44 | 2.52 |
| CT2/CT3 | 2.90 | 3.17 | 3.16 | 2.76 | 2.99 | 2.99 | 2.94 |
| f8/CT8 | −9.55 | −10.11 | −10.13 | −8.54 | −8.12 | −7.90 | −8.59 |
| f/R1 | 2.28 | 2.16 | 2.16 | 2.25 | 2.29 | 2.32 | 2.37 |
| \|R16/R14\| | 1.04 | 1.03 | 1.03 | 1.02 | 1.05 | 1.04 | 1.11 |
| SAG82/CT8 | −2.63 | −2.63 | −2.71 | −1.66 | −2.42 | −1.97 | −2.41 |
| f2/CT2 | 5.87 | 5.54 | 5.51 | 6.44 | 5.61 | 5.55 | 5.68 |
| f2/R3 | 2.02 | 1.95 | 1.95 | 1.99 | 2.01 | 2.00 | 1.99 |
| T45/T67 | 3.71 | 2.41 | 2.43 | 2.56 | 3.64 | 3.87 | 1.03 |
| (R13 + R14)/(R13 − R14) | 0.76 | 0.36 | 0.37 | 0.99 | 0.78 | 0.68 | 0.83 |

| | Embodiment | | | | | |
|---|---|---|---|---|---|---|
| Conditional expression | 8 | 9 | 10 | 11 | 12 | 13 |
| f/EPD | 1.80 | 1.82 | 1.80 | 1.90 | 1.80 | 1.80 |
| TTL/ImgH | 1.49 | 1.49 | 1.50 | 1.47 | 1.50 | 1.46 |
| \|f/f1\| + \|f/f2\| | 1.26 | 1.23 | 1.27 | 1.24 | 1.28 | 1.21 |
| f/f2 | 1.23 | 1.21 | 1.23 | 1.20 | 1.26 | 1.17 |
| f/R16 | 2.39 | 2.46 | 2.42 | 2.33 | 2.27 | 2.38 |

TABLE 27-continued

| | | | | | | |
|---|---|---|---|---|---|---|
| CT2/CT3 | 2.93 | 2.93 | 2.80 | 2.80 | 2.86 | 2.88 |
| f8/CT8 | −7.47 | −8.30 | −7.92 | −7.44 | −7.90 | −8.78 |
| f/R1 | 2.34 | 2.32 | 2.38 | 2.33 | 2.36 | 2.29 |
| \|R16/R14\| | 1.02 | 1.04 | 1.03 | 1.05 | 1.01 | 1.08 |
| SAG82/CT8 | −1.67 | −2.07 | −1.86 | −1.85 | −1.95 | −2.40 |
| f2/CT2 | 5.79 | 5.83 | 6.13 | 6.08 | 5.85 | 6.01 |
| f2/R3 | 1.98 | 2.00 | 2.00 | 2.02 | 1.97 | 2.01 |
| T45/T67 | 1.97 | 3.58 | 3.19 | 3.90 | 4.22 | 3.76 |
| (R13 + R14)/(R13 − R14) | 0.80 | 0.79 | 0.78 | 0.72 | 0.67 | −32.33 |

The present disclosure further provides an imaging device having an electronic photosensitive element which may be a photosensitive charge-coupled device (CCD) or complementary metal-oxide semiconductor (CMOS) element. The imaging device may be an independent imaging device such as a digital camera, or may be an imaging module integrated in a mobile electronic device such as a mobile phone. The imaging device is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but

What is claimed is:

1. An optical imaging lens assembly comprising, sequentially along an optical axis from an object side to an image side,
   a first lens having a refractive power;
   a second lens having a positive refractive power;
   a third lens having a refractive power;
   a fourth lens having a refractive power;
   a fifth lens having a refractive power;
   a sixth lens having a refractive power;
   a seventh lens having a refractive power, wherein an image-side surface of the seventh lens is a convex surface; and
   an eighth lens having a refractive power;
   wherein there is an air spacing between any two adjacent lenses in the first to eighth lenses, and
   a total effective focal length f of the optical imaging lens assembly and an entrance pupil diameter EPD of the optical imaging lens assembly satisfy: f/EPD≥2.0,
   wherein a sagittal height SAG82 of an image-side surface of the eighth lens at a maximum effective semi-diameter, and the center thickness CT8 of the eighth lens on the optical axis satisfy: −3.0<SAG82/CT8<−1.5.

2. The optical imaging lens assembly according to claim 1, wherein the total effective focal length f of the optical imaging lens assembly and an effective focal length f2 of the second lens satisfy: 1.0<f/f2<1.5.

3. The optical imaging lens assembly according to claim 2, wherein the effective focal length f2 of the second lens and a center thickness CT2 of the second lens on the optical axis satisfy: 5.5≤f2/CT2<6.5.

4. The optical imaging lens assembly according to claim 1, wherein an object-side surface of the first lens is a convex surface, and
   the total effective focal length f of the optical imaging lens assembly and a radius of curvature R1 of the object-side surface of the first lens satisfy: 2<f/R1<2.5.

5. The optical imaging lens assembly according to claim 1, wherein an image-side surface of the eighth lens is a concave surface, and
   the total effective focal length f of the optical imaging lens assembly and a radius of curvature R16 of the image-side surface of the eighth lens satisfy: 1.5<f/R16<3.0.

6. The optical imaging lens assembly according to claim 5, wherein the radius of curvature R16 of the image-side surface of the eighth lens and a radius of curvature R14 of the image-side surface of the seventh lens satisfy: 1.0<|R16/R14|<1.5.

7. The optical imaging lens assembly according to claim 1, wherein an effective focal length f8 of the eighth lens and a center thickness CT8 of the eighth lens on the optical axis satisfy: −11<f8/CT8<−7.

8. The optical imaging lens assembly according to claim 1, wherein a total track length TTL of the optical imaging lens assembly and half of a diagonal length ImgH of an effective pixel area on an image plane of the optical imaging lens assembly satisfy: TTL/ImgH<1.50.

9. The optical imaging lens assembly according to claim 8, wherein the center thickness CT2 of the second lens on the optical axis and a center thickness CT3 of the third lens on the optical axis satisfy: 2.5<CT2/CT3<3.5.

10. An optical imaging lens assembly comprising, sequentially along an optical axis from an object side to an image side,
   a first lens having a refractive power, wherein an object-side surface of the first lens is a convex surface;
   a second lens having a positive refractive power, wherein an object-side surface of the second lens is a convex surface;
   a third lens having a refractive power;
   a fourth lens having a refractive power;
   a fifth lens having a refractive power;
   a sixth lens having a refractive power;
   a seventh lens having a refractive power, wherein an image-side surface of the seventh lens is a convex surface; and
   an eighth lens having a refractive power, wherein an image-side surface of the eighth lens is a concave surface;
   wherein a total effective focal length f of the optical imaging lens assembly, an effective focal length f1 of the first lens, and an effective focal length f2 of the second lens satisfy: 1.0<|f/f1|+|f/f2|<1.5,
   wherein a sagittal height SAG82 of the image-side surface of the eighth lens at a maximum effective semi-diameter, and the center thickness CT8 of the eighth lens on the optical axis satisfy: −3.0<SAG82/CT8<−1.5.

11. The optical imaging lens assembly according to claim 10, wherein the effective focal length f2 of the second lens and a center thickness CT2 of the second lens on the optical axis satisfy: $5.5 < f2/CT2 < 6.5$.

12. The optical imaging lens assembly according to claim 10, wherein the total effective focal length f of the optical imaging lens assembly and the effective focal length f2 of the second lens satisfy: $1.0 < f/f2 < 1.5$.

13. The optical imaging lens assembly according to claim 10, wherein an effective focal length f8 of the eighth lens and a center thickness CT8 of the eighth lens on the optical axis satisfy: $-11 < f8/CT8 < -7$.

14. The optical imaging lens assembly according to claim 10, wherein the total effective focal length f of the optical imaging lens assembly and a radius of curvature R1 of the object-side surface of the first lens satisfy: $2 < f/R1 < 2.5$.

15. The optical imaging lens assembly according to claim 10, wherein the total effective focal length f of the optical imaging lens assembly and a radius of curvature R16 of the image-side surface of the eighth lens satisfy: $1.5 < f/R16 < 3.0$.

16. The optical imaging lens assembly according to claim 10, wherein a radius of curvature R16 of the image-side surface of the eighth lens and a radius of curvature R14 of the image-side surface of the seventh lens satisfy: $1.0 < |R16/R14| < 1.5$.

17. The optical imaging lens assembly according to claim 10, wherein a center thickness CT2 of the second lens on the optical axis and a center thickness CT3 of the third lens on the optical axis satisfy: $2.5 < CT2/CT3 < 3.5$.

18. The optical imaging lens assembly according to claim 14, wherein a total track length TTL of the optical imaging lens assembly and half of a diagonal length ImgH of an effective pixel area on an image plane of the optical imaging lens assembly satisfy: $TTL/ImgH \leq 1.50$.

* * * * *

UNITED STATES PATENT AND TRADEMARK OFFICE
CERTIFICATE OF CORRECTION

PATENT NO. : 10,962,742 B2
APPLICATION NO. : 16/226954
DATED : March 30, 2021
INVENTOR(S) : Xin Zhou, Jian Yang and Jianke Wenren Page 1 of 1

It is certified that error appears in the above-identified patent and that said Letters Patent is hereby corrected as shown below:

In the Claims

In Column 57; Claim 1 the expression f/EPD≥2.0 should be f/EPD≤2.0

In Column 60; Claim 16 the expression 1.0<IR16/R141<1.5 should be 1.0<|R16/R14|<1.5

Signed and Sealed this
Eighteenth Day of April, 2023

Katherine Kelly Vidal
*Director of the United States Patent and Trademark Office*